US007870986B2

(12) United States Patent
Kuroda

(10) Patent No.: US 7,870,986 B2
(45) Date of Patent: Jan. 18, 2011

(54) METHOD AND DEVICE FOR CLEARANCE ADJUSTMENT FOR LEAD-IN ROLLER CLEARANCE ADJUSTMENT MECHANISM

(75) Inventor: Hideaki Kuroda, Noda (JP)

(73) Assignee: Komori Corporation, Tokyo (JP)

( * ) Notice: Subject to any disclaimer, the term of this patent is extended or adjusted under 35 U.S.C. 154(b) by 769 days.

(21) Appl. No.: 11/591,476

(22) Filed: Nov. 2, 2006

(65) Prior Publication Data

US 2007/0107613 A1 May 17, 2007

(30) Foreign Application Priority Data

Nov. 4, 2005 (JP) ............................ 2005-320488

(51) Int. Cl.
*B23Q 15/00* (2006.01)
*B65H 20/00* (2006.01)

(52) U.S. Cl. ............................ 226/24; 226/2; 226/176; 226/181

(58) Field of Classification Search ..................... 226/2, 226/24, 27, 176, 181, 186, 187
See application file for complete search history.

(56) References Cited

U.S. PATENT DOCUMENTS

| | | | | |
|---|---|---|---|---|
| 4,046,372 | A * | 9/1977 | Ebner | 271/273 |
| 5,727,724 | A * | 3/1998 | Dowling | 226/181 |
| 5,904,094 | A * | 5/1999 | Bredenberg | 101/216 |
| 5,967,512 | A * | 10/1999 | Irsik | 271/273 |
| 6,092,466 | A * | 7/2000 | Koch et al. | 101/485 |
| 6,350,340 | B1 * | 2/2002 | Johnson | 156/252 |
| 6,352,257 | B1 * | 3/2002 | Todaro et al. | 271/268 |
| 6,433,499 | B1 * | 8/2002 | Cote et al. | 318/432 |
| 6,829,992 | B2 * | 12/2004 | Kobayashi et al. | 101/228 |
| 2002/0124704 | A1 * | 9/2002 | Roth | 83/436.5 |
| 2003/0000360 | A1 * | 1/2003 | Sanda | 83/495 |

FOREIGN PATENT DOCUMENTS

| | | | |
|---|---|---|---|
| DE | 10151905 | A1 | 5/2003 |
| EP | 0835836 | A2 | 4/1998 |
| JP | 1-103647 | U | 7/1989 |
| JP | 4-9853 | U | 1/1992 |
| JP | 7-237812 | A | 9/1995 |
| JP | 9-175730 | | 7/1997 |
| JP | 2002-46936 | A | 2/2002 |

* cited by examiner

*Primary Examiner*—Evan H Langdon
(74) *Attorney, Agent, or Firm*—Birch, Stewart, Kolasch & Birch, LLP

(57) ABSTRACT

A lead-in roller clearance adjustment mechanism includes a pair of lead-in rollers for guiding a web with a clearance therebetween and a clearance adjustment mechanism for adjusting an amount of clearance. The lead-in roller clearance adjustment mechanism further includes motors for driving the clearance adjustment mechanism and potentiometers for detecting output positions of these motors, and adjusts the amount of clearance automatically. A clearance adjustment device includes a control device for an automated paper threading device and for clearance adjustment between the lead-in rollers, a web thickness of the web being inputted in the control device, the control device controlling the motors to set the amount of clearance at a predetermined value before threading the web into a lead-in roller unit, and to set the amount of clearance at a value corresponding to the inputted web thickness of the web after threading the web into the lead-in roller unit.

24 Claims, 44 Drawing Sheets

METHOD AND DEVICE FOR CLEARANCE ADJUSTMENT FOR LEAD-IN ROLLER CLEARANCE ADJUSTMENT MECHANISM

BACKGROUND OF THE INVENTION

1. Field of the Invention

The present invention relates to a method and a device for clearance adjustment for a lead-in roller clearance adjustment mechanism which is suitably applied to a web processing machine for processing web members such as paper, films, woven fabrics or non-woven fabrics.

2. Description of the Related Art

In the following description of the related art, paper is used as an example of the web members, and a web rotary printing press is used as an example of the web process machine, for the purpose of facilitating understanding of explanations. In this context, a web thickness will be described as a paper thickness, and an automated web threading device configured to thread the web member automatically into a web transport path in the web processing machine prior to starting web processing will be described as an automated paper threading device in the following description of the related art.

In the web rotary printing press, paper threading is executed when a task is changed due to printing specifications and the like or when the paper runs out in the course of machine operation. Here, it is a well-known technique to provide the automated paper threading device for the purpose of speeding up and saving labor of this operation (see Japanese Publication of Unexamined Utility Model Application No. Hei-1(1989)-103647).

Moreover, in terms of a lead-in roller clearance adjustment mechanism provided downstream of a former of the web rotary printing press, a clearance between a pair of lead-in rollers is widely opened so as to pass that lead (adopter) or the like smoothly when the automated paper threading device executes paper threading into that lead-in roller unit. Meanwhile, after completion of the paper threading, a clearance is adjusted to correspond to a paper thickness of the web passed therethrough so as to effectuate favorable former fold (see Japanese Publication of Unexamined Utility Model Application No. Hei-4(1992)-9853).

However, in the conventional lead-in roller clearance adjustment mechanism, all the above-mentioned clearance adjustment operations have been executed manually. As a consequence, there are problems of a burden on an operator and of time consumption. Moreover, since adjustment accuracy is poor and there is no reproducibility because of the manual adjustment, the operator is often required to visually check a condition of the web at the lead-in roller unit and to perform fine adjustment at the time of starting printing; or the operator is often required to visually check the condition of the web at the lead-in roller unit and to perform fine adjustment during the operation. Hence there are also problems of a burden on the operator and of occurrence of wasted printing materials.

SUMMARY OF THE INVENTION

Accordingly, it is an object of the present invention to achieve reduction in a burden on an operator and reduction in wasted paper, and also to achieve reduction in clearance adjustment time by means of automating a lead-in roller clearance adjustment mechanism.

To attain the object, a clearance adjustment method for a lead-in roller clearance adjustment mechanism includes a pair of lead-in rollers for guiding a web with a clearance therebetween and a clearance adjustment mechanism for adjusting an amount of clearance between the pair of lead-in rollers, the lead-in roller clearance adjustment mechanism further including a drive source for driving the clearance adjustment mechanism and a first detector for detecting any one of a corresponding one of output position of the drive source and the amount of clearance, and the lead-in roller clearance adjustment mechanism being configured to adjust the amount of clearance automatically, the method including the steps of: inputting a web thickness of the web; setting the amount of clearance at a predetermined value before threading the web into a lead-in roller unit; and setting the amount of clearance at a value corresponding to the inputted web thickness of the web after threading the web into the lead-in roller unit.

Moreover, the mechanism may further include an automated web threading device, and the method may further include the step of setting the amount of clearance at the predetermined value by turning on a start button of the automated web threading device.

Moreover, the mechanism may further include an automated web threading device and a second detector for detecting completion of threading the web into the lead-in roller unit by the automated web threading device, and the method may further include the step of setting the amount of clearance at the value corresponding to the inputted web thickness of the web in response to the detection of the completion of threading the web into the lead-in roller unit by the second detector.

Moreover, the second detector may detect any one of a lead and a chain tip of the automated web threading device.

Moreover, the second detector may generate a pulse synchronously with a movement of the automated web threading device.

Moreover, the mechanism may further include an automated web threading device, and the method may further include the step of setting the amount of clearance at the value corresponding to the inputted web thickness of the web after completion of threading the web by the automated web threading device.

Moreover, the mechanism may further include a third detector for detecting completion of threading the web by the automated web threading device, and the method may further include the step of setting the amount of clearance at the value corresponding to the inputted web thickness of the web in response to the detection of the completion of threading the web by the third detector.

Moreover, the third detector may detect any one of a lead and a chain tip of the automated web threading device.

Moreover, the third detector may generate a pulse synchronously with a movement of the automated web threading device.

Moreover, the mechanism may further include an automated web threading device and a fourth detector for detecting arrival of the automated web threading device upstream of the lead-in roller unit, and the method may be such that when the fourth detector detects the automated web threading device, the automated web threading device is stopped in a case where the amount of clearance between the pair of lead-in rollers is not equal to the predetermined value.

Moreover, the fourth detector may detect any one of a lead and a chain tip of the automated web threading device.

Furthermore, the fourth detector may generate a pulse synchronously with a movement of the automated web threading device.

To attain the object, a clearance adjustment device for a lead-in roller clearance adjustment mechanism in the case of the present invention includes a pair of lead-in rollers for guiding a web with a clearance therebetween and a clearance adjustment mechanism for adjusting an amount of clearance between the pair of lead-in rollers, further includes a drive source for driving the clearance adjustment mechanism and a first detector for detecting any one of a corresponding one of output position of the drive source and the amount of clearance. The clearance adjustment device for the lead-in roller clearance adjustment mechanism for automatically adjusting the amount of clearance also includes a control device for controlling the drive source, based on an input of a web thickness of the web, such that the amount of clearance can be set at a predetermined value before threading the web into a lead-in roller unit, and that the amount of clearance can be set at a value corresponding to the inputted web thickness of the web after threading the web into the lead-in roller unit.

Moreover, the device may further include an automated web threading device, and the control device may control the drive source, such that the amount of clearance can be set at the predetermined value by turning on a start button of the automated web threading device.

Moreover, the device may further include an automated web threading device and a second detector for detecting completion of threading the web into the lead-in roller unit by the automated web threading device, and the control device may control the drive source, such that the amount of clearance can be set at the value corresponding to the inputted web thickness of the web in response to the detection of the completion of threading the web into the lead-in roller unit by the second detector.

Moreover, the second detector may be a detector for detecting any one of a lead and a chain tip of the automated web threading device.

Moreover, the second detector may be a pulse generator for generating a pulse synchronously with a movement of the automated web threading device.

Moreover, the device may further include an automated web threading device, and the control device may control the drive source, such that the amount of clearance can be set at the value corresponding to the inputted web thickness of the web after completion of threading the web by the automated web threading device.

Moreover, the device may further include a third detector for detecting completion of threading the web by the automated web threading device, and the control device may control the drive source, such that the amount of clearance can be set at the value corresponding to the inputted web thickness of the web in response to the detection of the completion of threading the web by the third detector.

Moreover, the third detector may be a detector for detecting any one of a lead and a chain tip of the automated web threading device.

Moreover, the third detector may be a pulse generator for generating a pulse synchronously with a movement of the automated web threading device.

Moreover, the device may further include an automated web threading device and a fourth detector for detecting arrival of the automated web threading device upstream of the lead-in roller unit. Here, when the fourth detector detects the automated web threading device, the control device may output a stop signal to the automated web threading device in a case where the amount of clearance between the pair of lead-in rollers is not equal to the predetermined value.

Moreover, the fourth detector may be a detector for detecting any one of a lead and a chain tip of the automated web threading device.

Furthermore, the fourth detector may be a pulse generator for generating a pulse synchronously with a movement of the automated web threading device.

In the case of the present invention having the above-described configurations, the drive sources for driving the lead-in roller clearance adjustment mechanism are provided, and the detectors for detecting the clearance between the pair of lead-in rollers are provided. Moreover, the control device (the driving sources) for controlling the amount of clearance in response to the inputted web thickness of the web is provided. The amount of clearance between the pair of lead-in rollers is automatically set at the predetermined large value when starting the automated web threading device, and the amount of clearance between the pair of lead-in rollers is automatically set at the value corresponding to the inputted web thickness of the web upon completion of threading the web into the lead-in roller unit. In this way, it is possible to achieve reduction in a burden on an operator and reduction in wasted paper, and also to achieve reduction in clearance adjustment time.

BRIEF DESCRIPTION OF THE DRAWINGS

The present invention will become more fully understood from the detailed description given hereinbelow and the accompanying drawings which are given by way of illustration only, and thus are not limitation of the present invention, and wherein.

DETAILED DESCRIPTION OF THE PRESENT INVENTION

Hereinafter, a method and a device for clearance adjustment for a lead-in roller clearance adjustment mechanism in the case of the present invention will be described in detail based on embodiments by using the accompanying drawings.

In the following description of the embodiments, paper is used as an example of a web member, and a web rotary printing press is used as an example of a web process machine, for the purpose of facilitating understanding. In this context, a web thickness will be described as a paper thickness, and an automated web threading device configured to thread the web member automatically into a web transport path in the web processing machine prior to starting web processing will be described as an automated paper threading device in the following description of the embodiments.

First Embodiment

Figure 5:
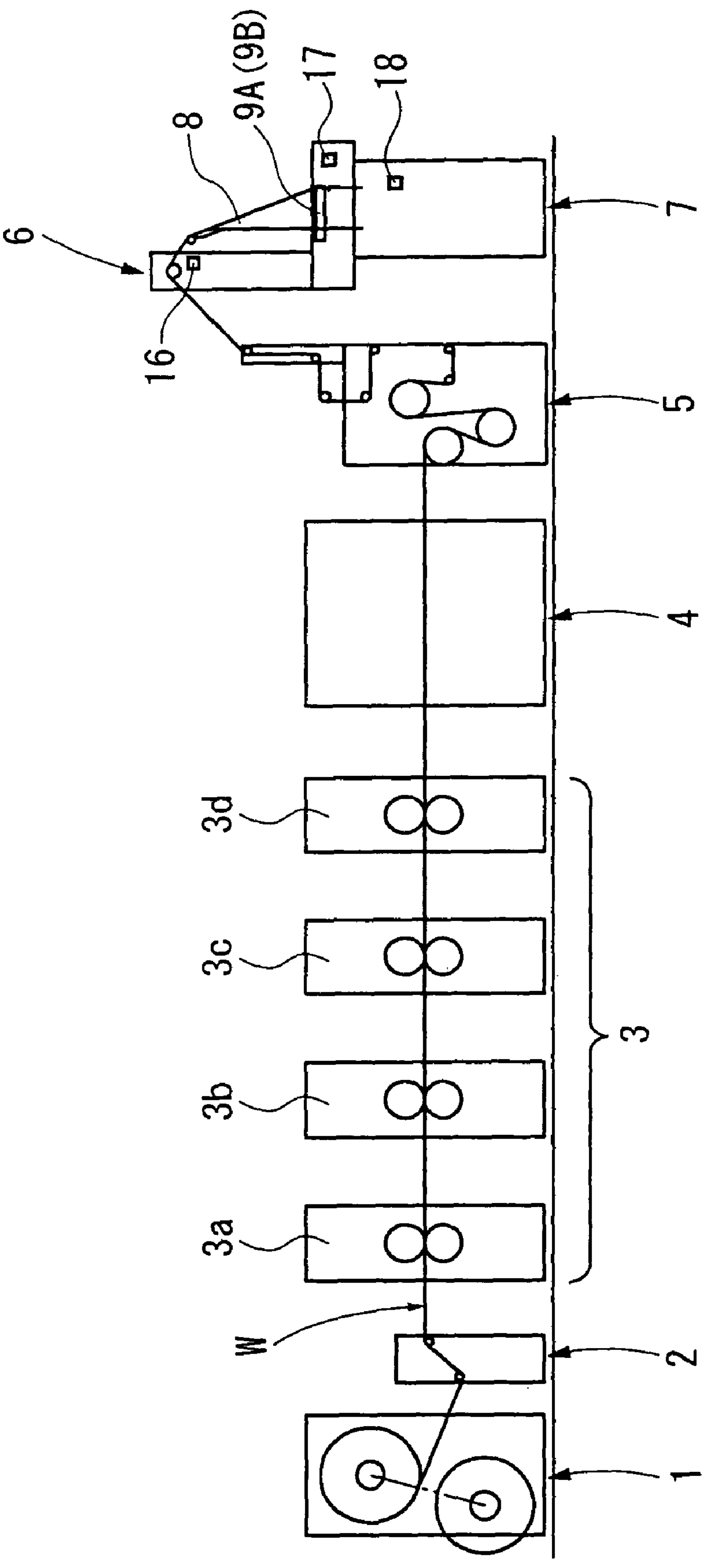
FIG. 5 is an overall side view of a web rotary printing press.

As shown in FIG. 5, in a web rotary printing press, a web (a roll of paper) W that is continuously supplied from a feeder 1 and an infeed unit 2 is firstly subjected to a variety of printing by printing units 3 when passing through first to fourth printing units 3*a* to 3*d*, then to heating and drying when passing through a drying unit 4, subsequently to cooling when passing through a cooling unit 5, thereafter to tension control or a direction change when passing through a web path unit 6, and then to cutting and folding into a given shape by a folding unit 7.

Figure 1:
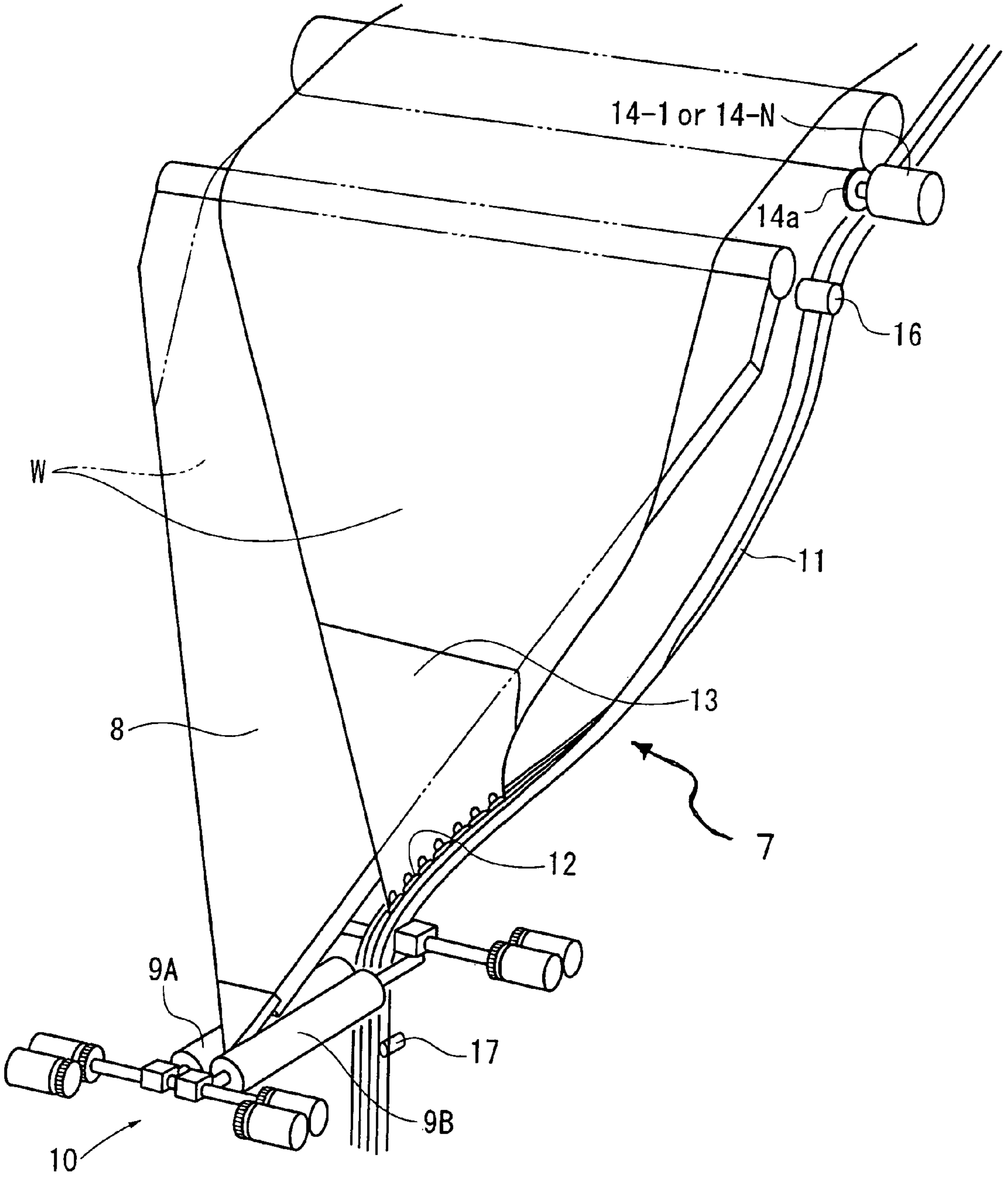
FIG. 1 is a perspective view of a lead-in roller clearance adjustment mechanism representing a first embodiment of the present invention.

As shown in FIG. 1, the folding unit 7 is provided with a lead-in roller clearance adjustment mechanism 10 which is located downstream of a triangle former 8, and which is configured to adjust an amount of clearance between a pair of lead-in rollers 9A and 9B. Moreover, a chain guide 11 of the automated paper threading device penetrates this lead-in roller clearance adjustment mechanism 10 in a direction of a paper flow. When threading the paper, a tip (an automated paper threading tow portion) of the web W, which is joined to a tip of a chain 12 via a lead (a towing member) 13, is allowed to pass therethrough. In FIG. 1, any one of reference numeral 14-1 or 14-N represents one of first to N-th automated paper threading tow portion drive motors which are disposed along the chain guide 11 at predetermined intervals, and a sprocket 14*a* thereof is engaged with the chain 12 traveling inside the chain guide 11. Moreover, the first to N-th automated paper threading tow portion drive motors 14-1 to 14-N incorporate rotary encoders 15-1 to 15-N, respectively (see FIG. 6*b*).

Moreover, along the chain guide 11, a detector 16 for detecting arrival of the automated paper threading tow portion upstream of the lead-in roller unit is disposed in a vicinity of an upstream side of the triangle former 8, and a detector 17 (a second detector) for detecting completion of paper threading of the automated paper threading tow portion into the lead-in roller unit is disposed immediately downstream of the lead-in rollers 9A and 9B. Moreover, a detector 18 (a third detector) for detecting completion of paper threading of the automated paper threading tow portion is disposed in a vicinity of a paper threading completed position (see FIG. 5). As for these detectors 16, 17 and 18, it is preferable to use detectors configured to detect either the lead 13 or the tip of the chain 12 of the automated paper threading device, or to use pulse generators configured to generate pulses synchronously with the movement of the automated paper threading device.

Figure 2:
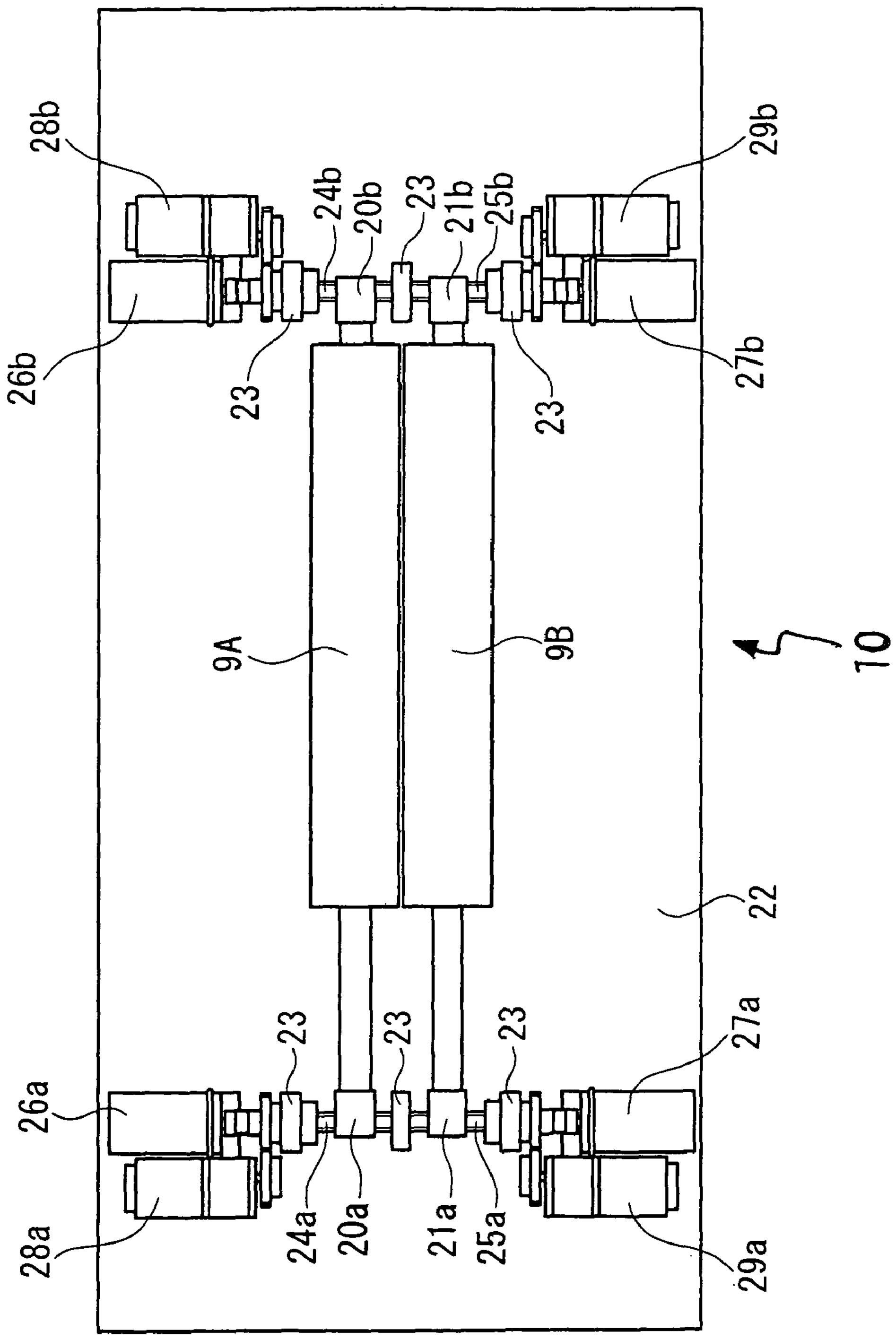
FIG. 2 is a plan view of the clearance adjustment mechanism.
Figure 3:
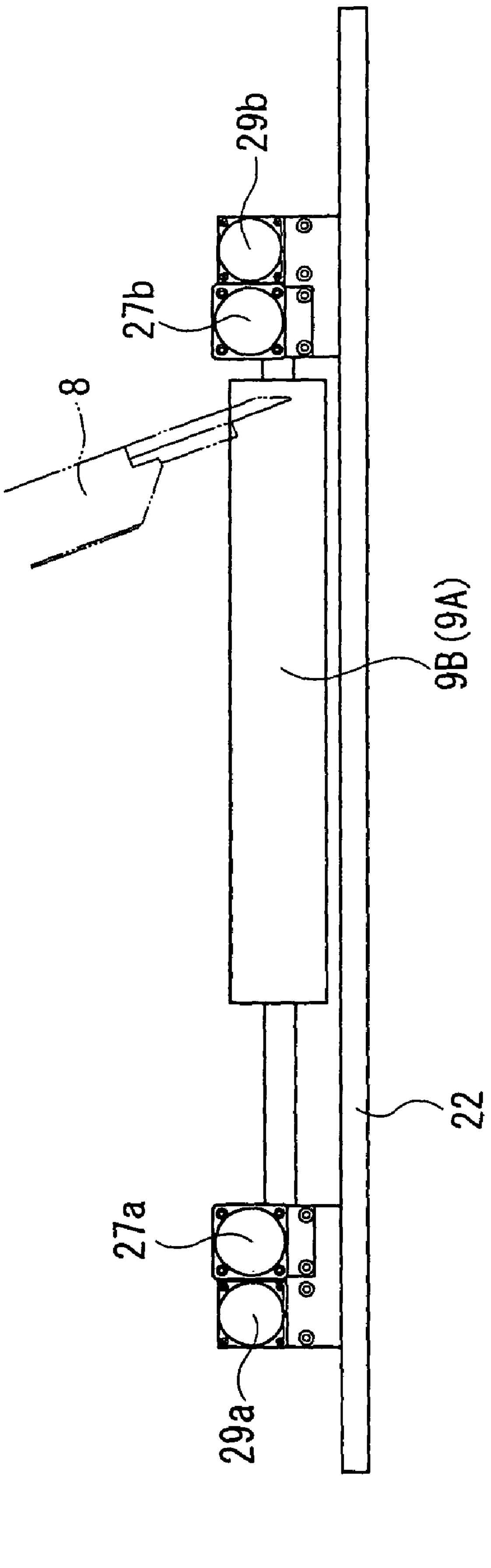
FIG. 3 is a side view of the clearance adjustment mechanism.
Figure 4:
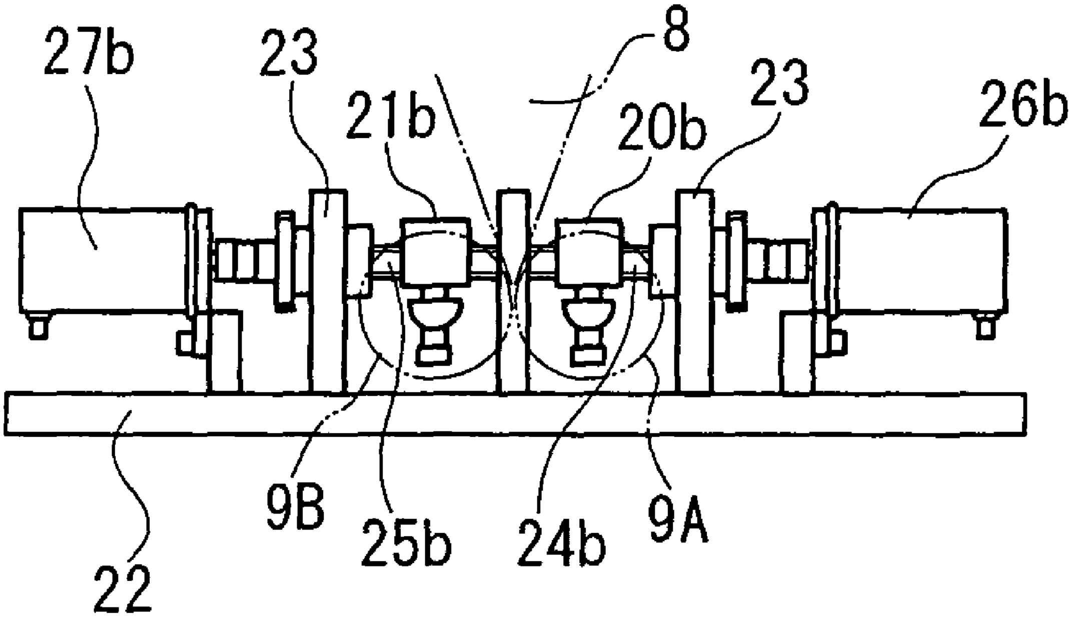
FIG. 4 is a front view of the clearance adjustment mechanism.

As shown in FIG. 2 to FIG. 4, in the lead-in roller clearance adjustment mechanism 10, supports 20*a*, 20*b*, 21*a* and 21*b* for respectively supporting shaft ends of the left and right lead-in rollers 9A and 9B are movably supported on screw shafts 24*a*, 24*b*, 25*a* and 25*b* that are laterally laid on a base 22 in the front-back direction by use of brackets 23. Specifically, internal threads penetrating the supports 20*a*, 20*b*, 21*a* and 21*b* are engaged with external threads formed on outer peripheries of the screw shafts 24*a*, 24*b*, 25*a* and 25*b*. The left and right lead-in rollers 9A and 9B move closer to, or move away from, each other by way of normal rotation or reverse rotation of these screw shafts 24*a*, 24*b*, 25*a* and 25*b*, thereby adjusting the amount of clearance therebetween. Accordingly, the supports 20*a*, 20*b*, 21*a* and 21*b* and the screw shafts 24*a*, 24*b*, 25*a* and 25*b* collectively constitute the clearance adjustment mechanism.

It should be noted that the external threads of the screw shafts 24*a*, 24*b*, 25*a* and 25*b* may be configured to establish relations of left-hands threads and right-hand threads on the left and right, and that the pairs of left and right screw shafts 24*a* and 25*a* as well as 24*b* and 25*b* may be integrated together depending on necessity. Hence the left and right lead-in rollers 9A and 9B may be moved in the same direction at the same time by way of the rotation of the pair of the screw shafts 24*a* and 24*b* or 25*a* and 25*b* on the right and left (a specific configuration has been publicly known as shown in Patent Document 2 and the like). In this way, it is possible to align the center of the clearance between the left and right lead-in rollers 9A and 9B with the center of the triangle former 8 promptly and easily.

Moreover, the screw shaft 24*a* is rotatably driven by a first left lead-in roller clearance adjustment motor (a drive source) 26*a*, and the screw shaft 24*b* is rotatably driven by a second left lead-in roller clearance adjustment motor (a drive source) 26*b*, respectively, while the screw shaft 25*a* is rotatably driven by a first right lead-in roller clearance adjustment motor (a drive source) 27*a*, and the screw shaft 25*b* is rotatably driven by a second right lead-in roller clearance adjustment motor (a drive source) 27*b*, respectively. Moreover, a first left lead-in roller potentiometer (a first detector) 28*a*, a second left lead-in roller potentiometer (a first detector) 28*b*, a first right lead-in roller potentiometer (a first detector) 29*a*, and a second right lead-in roller potentiometer (a first detector) 29*b* are respectively provided corresponding to these motors 26*a*, 26*b*, 27*a* and 27*b*. This makes it possible to detect output positions of the respective motors 26*a*, 26*b*, 27*a* and 27*b* or the amount of clearance between the left and right lead-in rollers 9A and 9B.

Figure 6A:
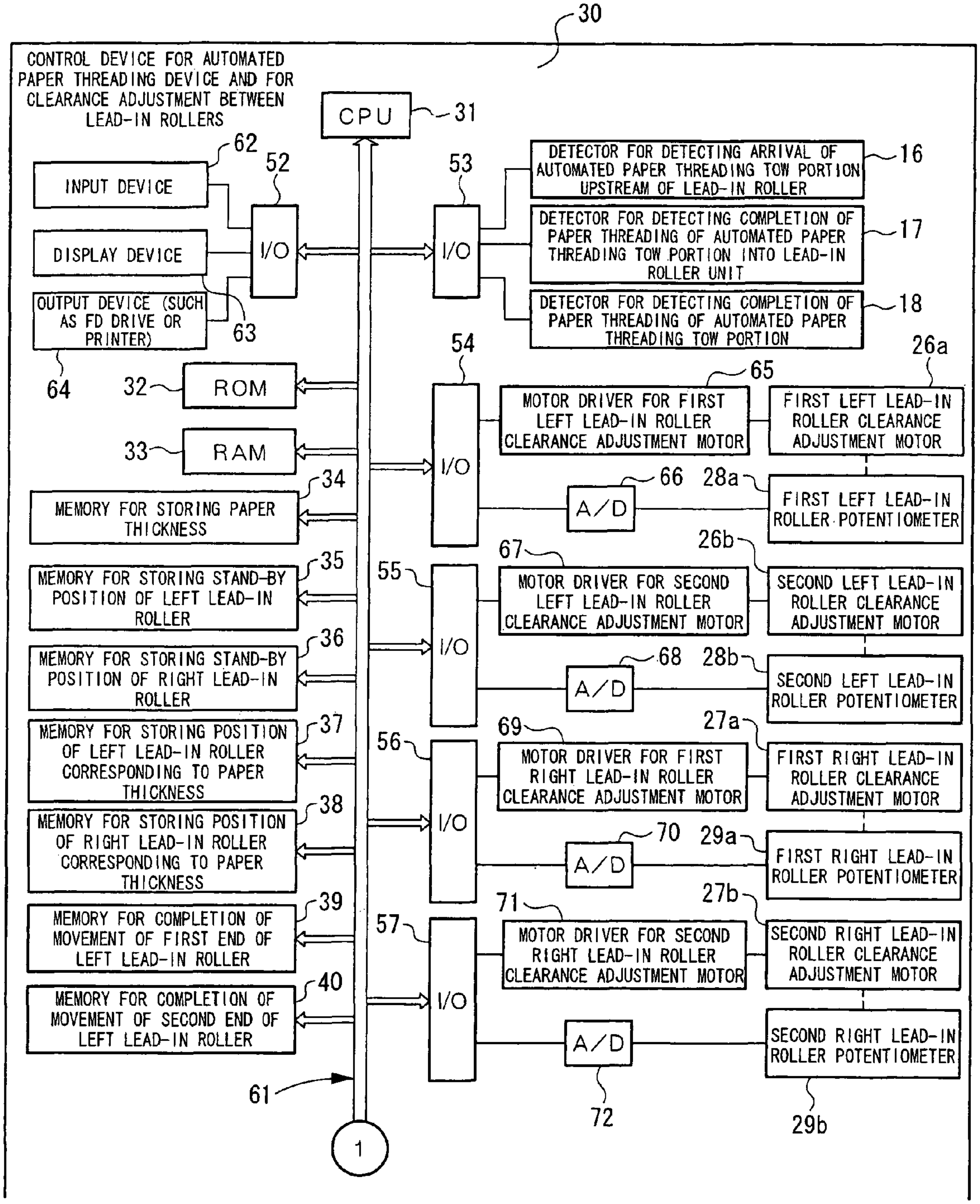
FIG. 6*a* is a block diagram of a control device for an automated paper threading device and for a lead-in roller clearance adjustment mechanism.
Figure 6B:
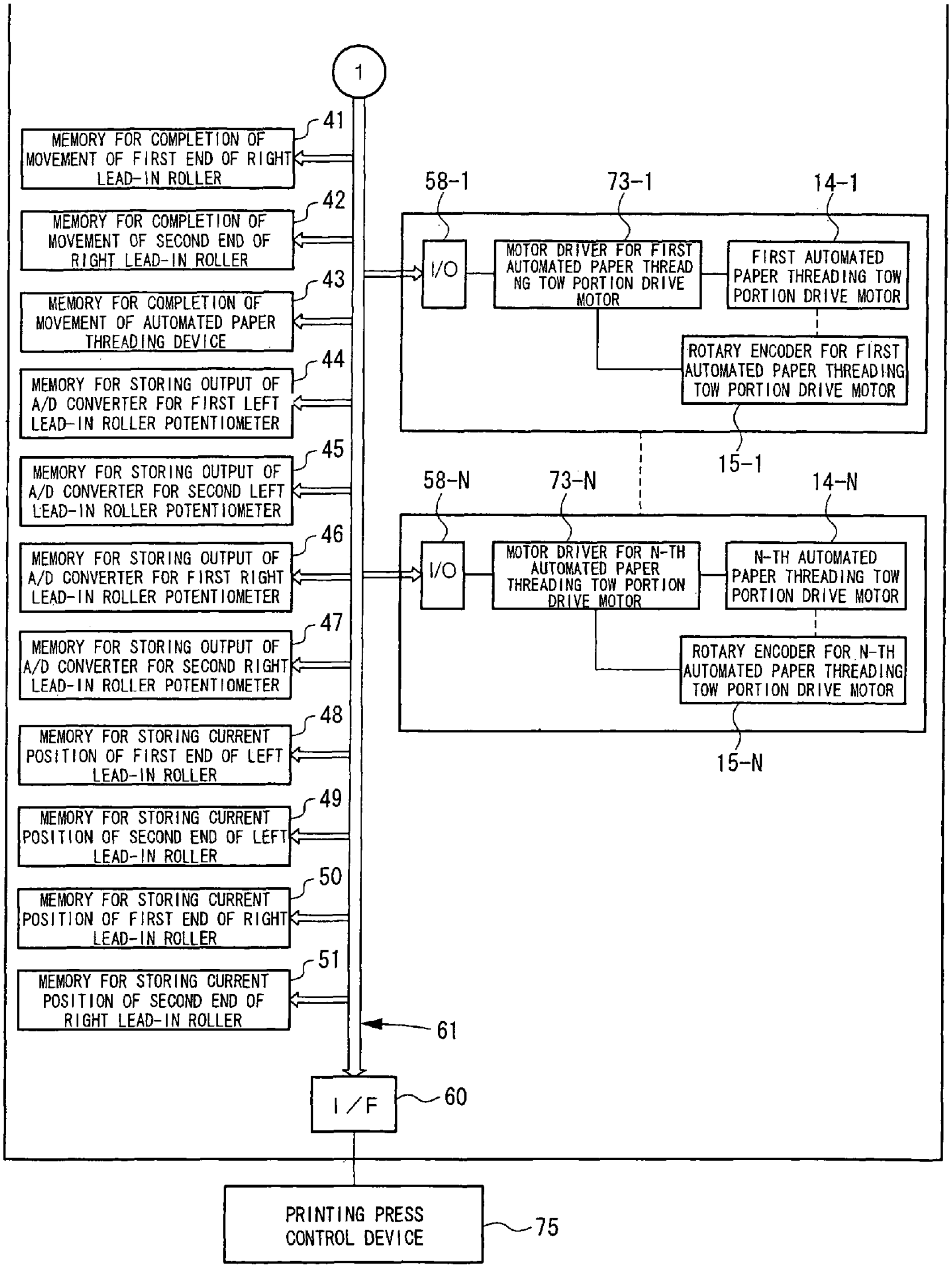
FIG. 6*b* is another block diagram of the control device for the automated paper threading device and for the lead-in roller clearance adjustment mechanism.
Figure 7:
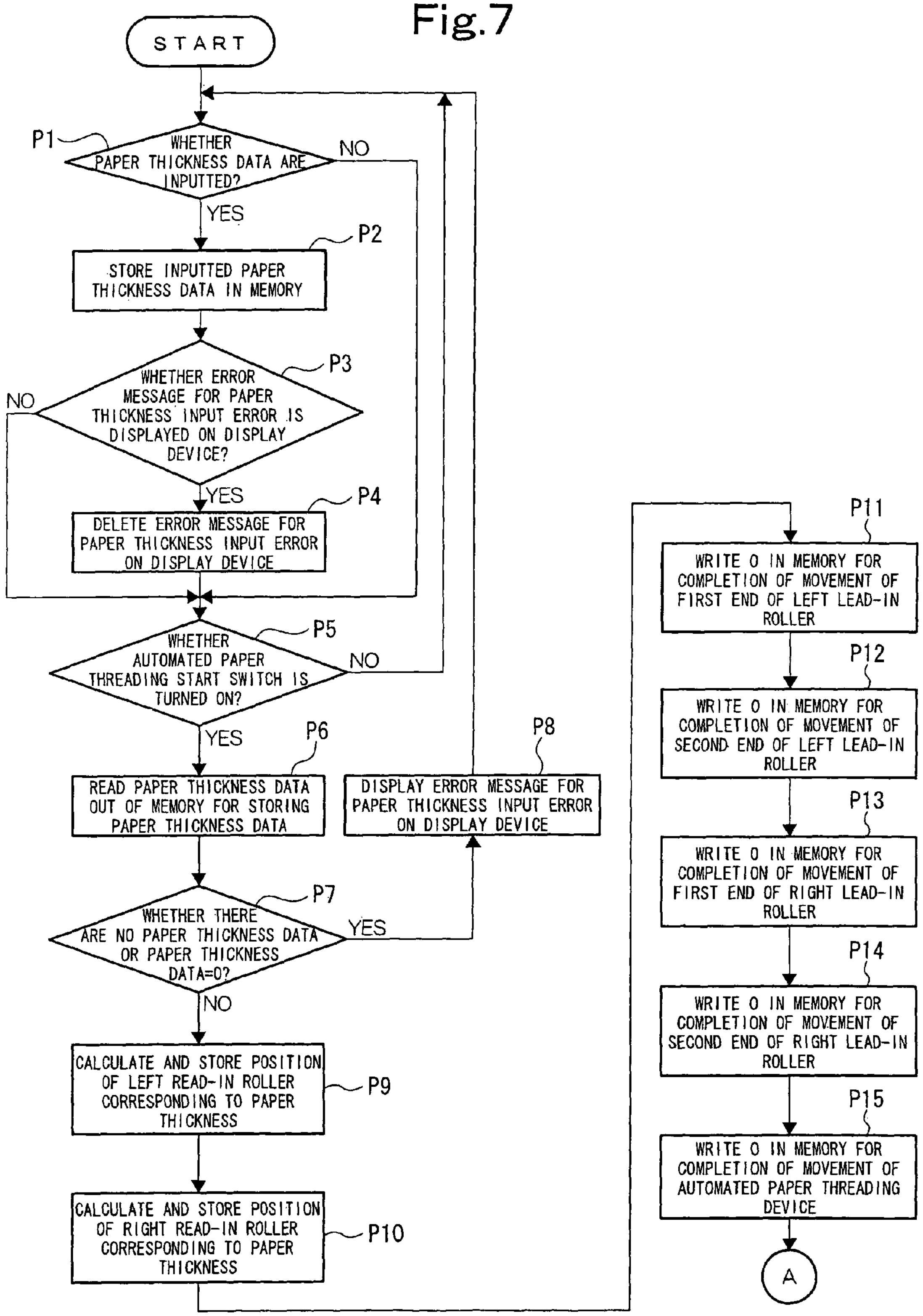
FIG. 7 is an operation flowchart of the control device for the automated paper threading device and for the lead-in roller clearance adjustment mechanism.
Figure 8A:
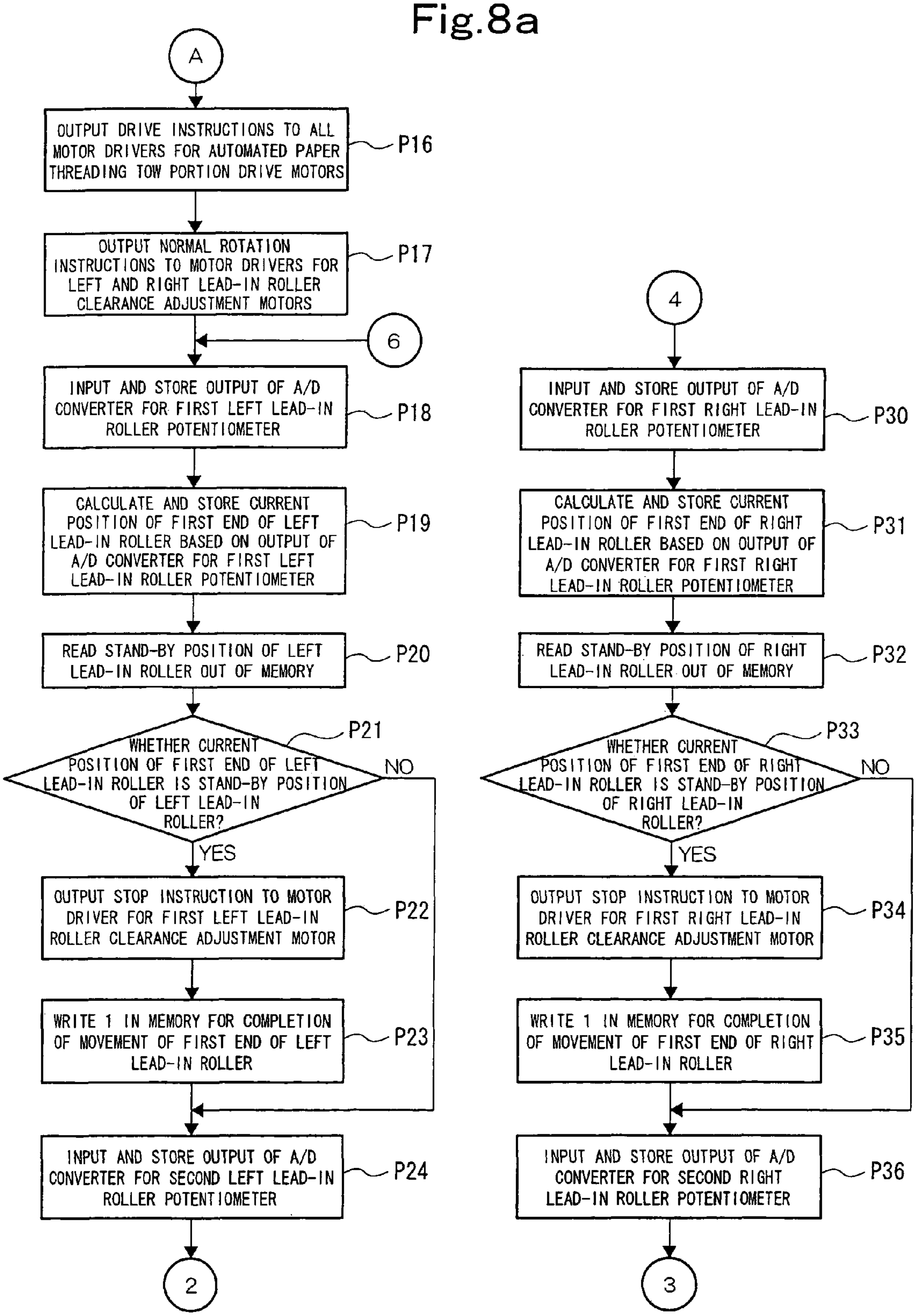
FIG. 8*a* is another operation flowchart of the control device for the automated paper threading device and for the lead-in roller clearance adjustment mechanism.
Figure 8B:
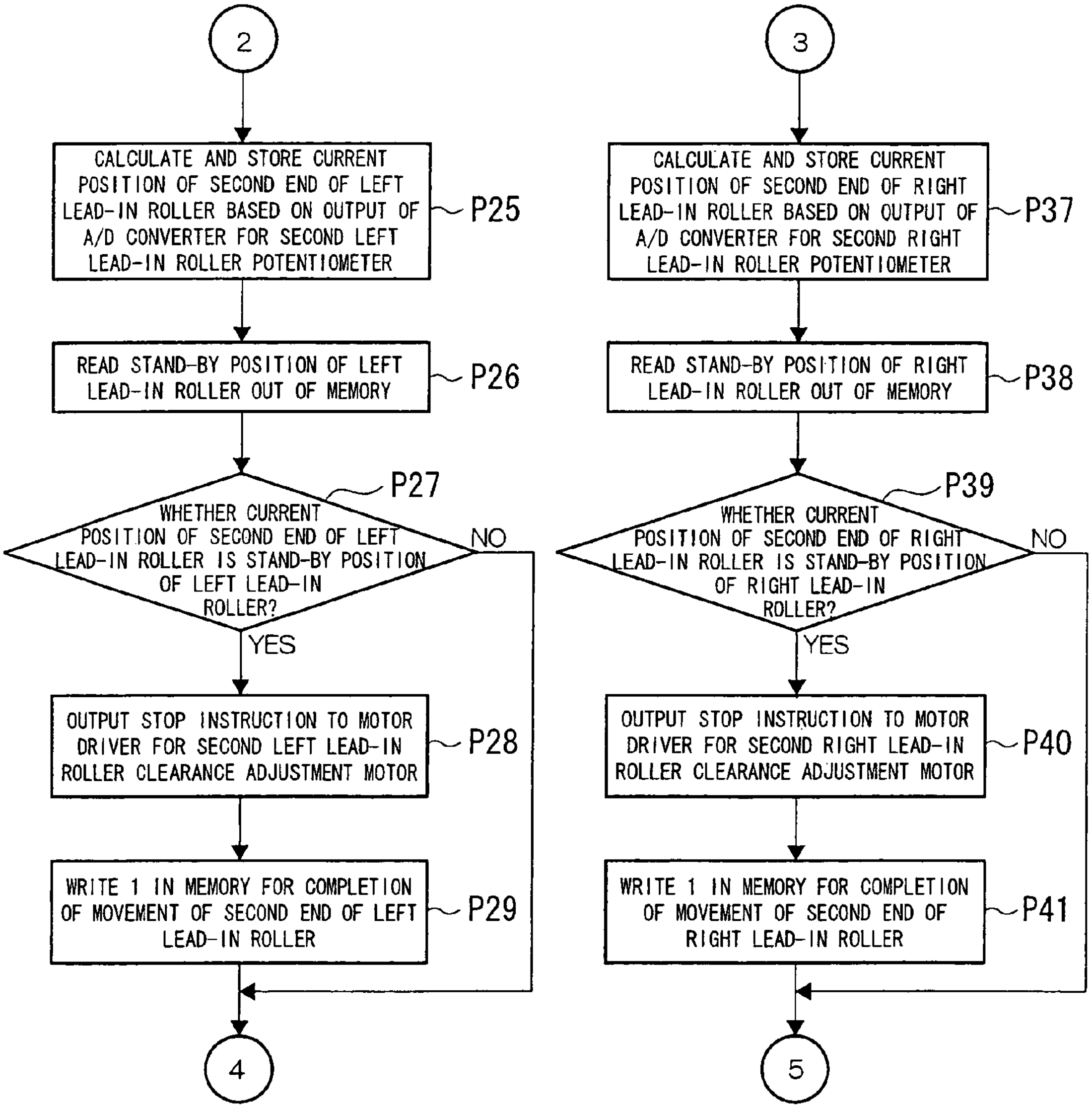
FIG. 8*b* is still another operation flowchart of the control device for the automated paper threading device and for the lead-in roller clearance adjustment mechanism.
Figure 8C:
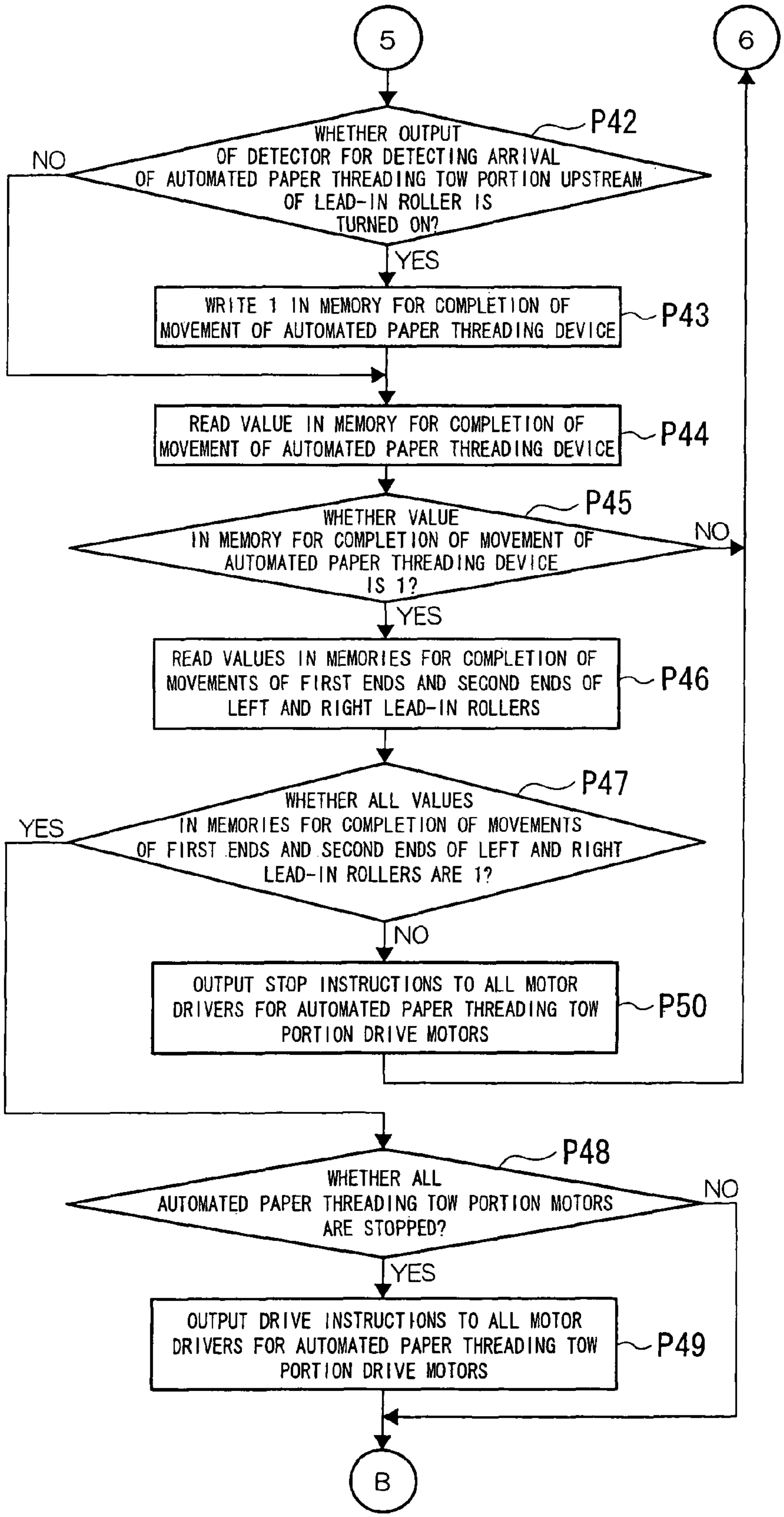
FIG. 8*c* is still another operation flowchart of the control device for the automated paper threading device and for the lead-in roller clearance adjustment mechanism.
Figure 9A:
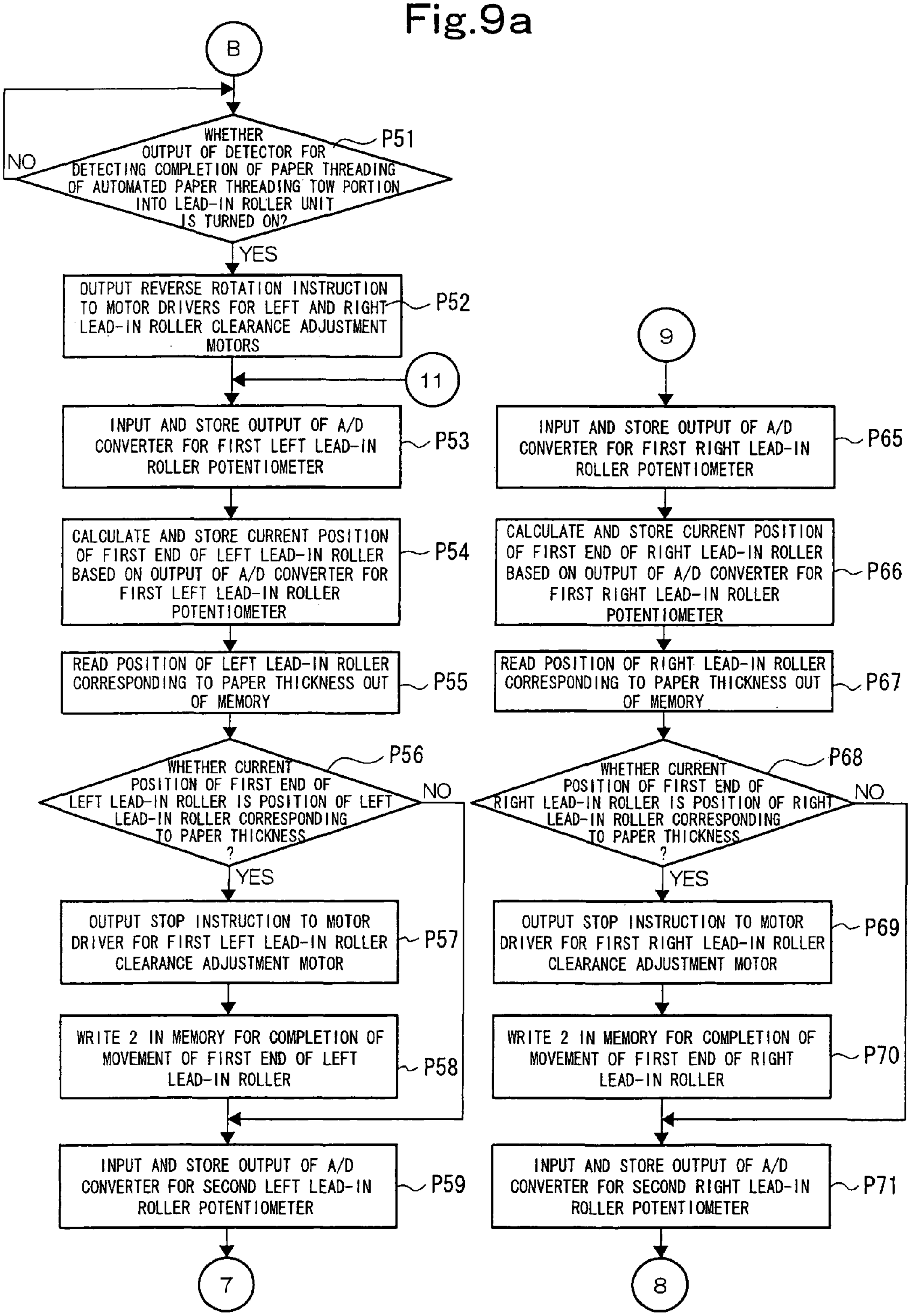
FIG. 9*a* is still another operation flowchart of the control device for the automated paper threading device and for the lead-in roller clearance adjustment mechanism.
Figure 9B:
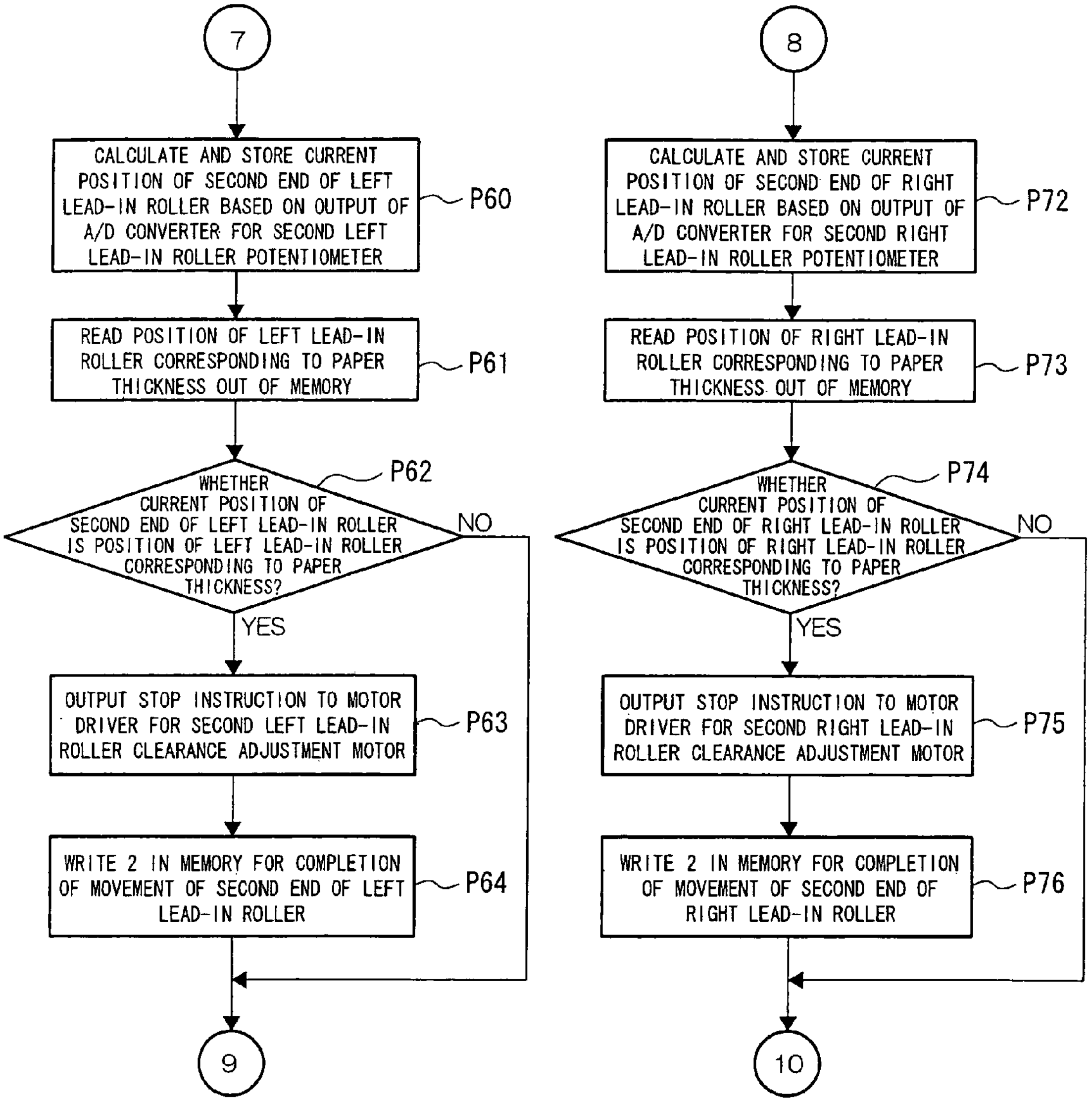
FIG. 9*b* is still another operation flowchart of the control device for the automated paper threading device and for the lead-in roller clearance adjustment mechanism.
Figure 9C:
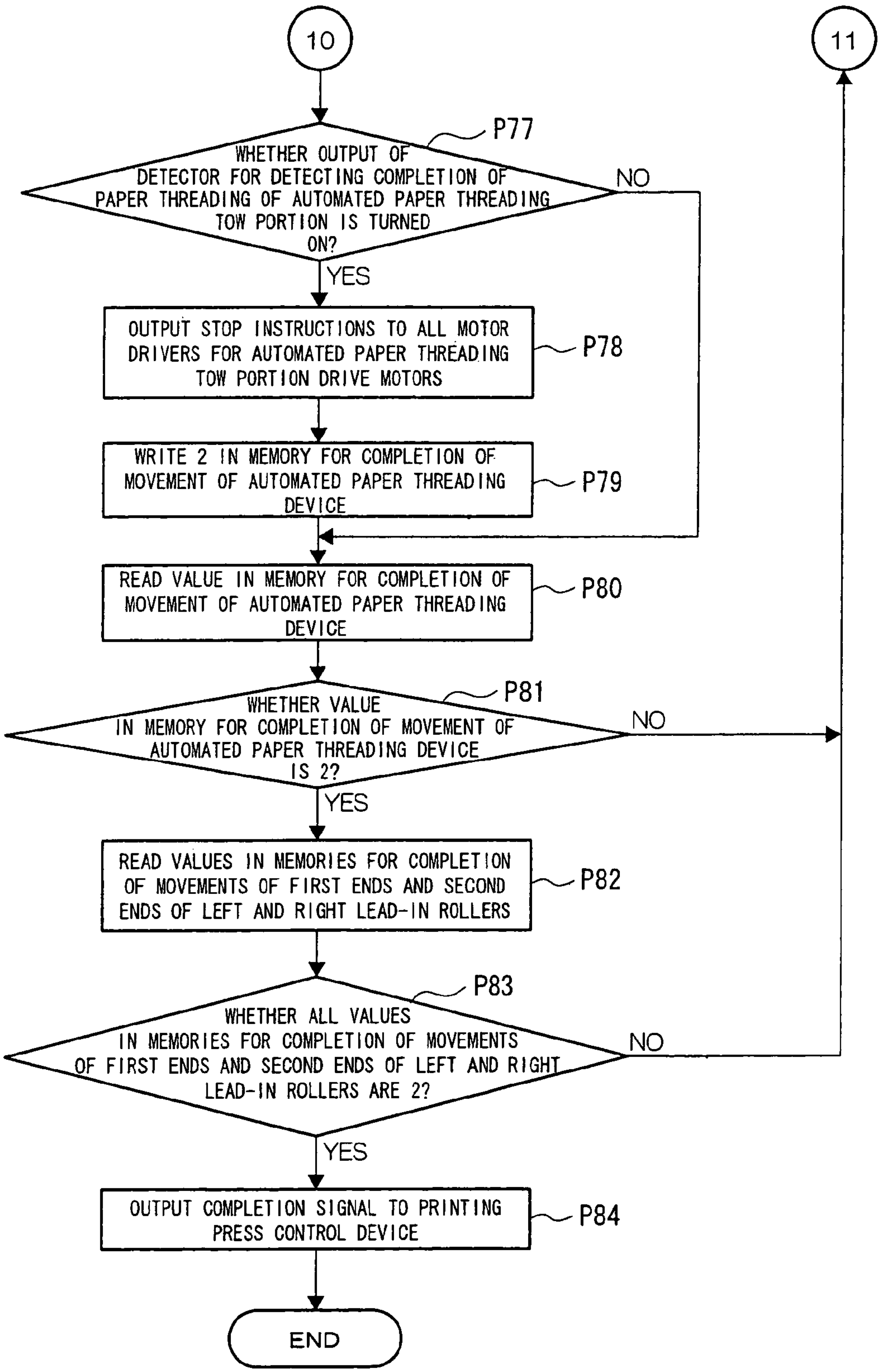
FIG. 9*c* is still another operation flowchart of the control device for the automated paper threading device and for the lead-in roller clearance adjustment mechanism.

Detection signals from the rotary encoders 15-1 to 15-N for the first to N-th automated paper threading tow portion drive motors, the detector 16 for detecting arrival of the automated paper threading tow portion upstream of the lead-in roller unit, the detector 17 for detecting completion of paper threading of the automated paper threading tow portion into the lead-in roller unit, the detector 18 for detecting completion of paper threading of the automated paper threading tow portion, the first left lead-in roller potentiometer 28*a*, the second left lead-in roller potentiometer 28*b*, the first right lead-in roller potentiometer 29*a*, and the second right lead-in roller potentiometer 29*b* are inputted to a control device 30 for an automated paper threading device and for a lead-in roller clearance adjustment mechanism as shown in FIG. 6*a* and FIG. 6*b*.

Moreover, the control device 30 for the automated paper threading device and for the clearance adjustment between the lead-in rollers are configured to control drives of the first to N-th automated paper threading tow portion drive motors 14-1 to 14-N, the first left lead-in roller clearance adjustment motor 26*a*, the second left lead-in roller clearance adjustment motor 26*b*, the first right lead-in roller clearance adjustment motor 27*a*, and the second right lead-in roller clearance adjustment motor 27*b*, based on the respective detection signals. That is, the amount of clearance between the left and right lead-in rollers 9A and 9B is appropriately adjusted in response to a paper thickness of the web W without damaging a function of the automated paper threading device.

As shown in FIG. 6*a* and FIG. 6*b*, in addition to a CPU 31, a ROM 32 and a RAM 33, the control device 30 for the automated paper threading device and for the clearance adjustment between the lead-in rollers include a memory 34 for storing paper thickness data, a memory 35 for storing a stand-by position of the left lead-in roller, a memory 36 for storing a stand-by position of the right lead-in roller, a memory 37 for storing a position of the left lead-in roller corresponding to the paper thickness, a memory 38 for storing a position of the right lead-in roller corresponding to the paper thickness, a memory 39 for completion of a movement of a first end of the left lead-in roller, a memory 40 for completion of a movement of a second end of the left lead-in roller, a memory 41 for completion of a movement of a first end of the right lead-in roller, a memory 42 for completion of a movement of a second end of the right lead-in roller, a memory 43 for completion of a movement of the automated paper threading device, a memory 44 for storing an output of an A/D converter for the first left lead-in roller potentiometer, a memory 45 for storing an output of an A/D converter for the second left lead-in roller potentiometer, a memory 46 for storing an output of an A/D converter for the first right lead-in roller potentiometer, a memory 47 for storing an output of an A/D converter for the second right lead-in roller potentiometer, a memory 48 for storing a current position of the first end of the left lead-in roller, a memory 49 for storing a current position of the second end of the left lead-in roller, a memory 50 for storing a current position of the first end of the right lead-in roller, and a memory 51 for storing a current position of the second end of the right lead-in roller, which are connected to one another by use of a bus (BUS) 61 together with each of input-output devices 52 to 57 and 58-1 to 58-N, and an interface 60.

Input devices 62 such as a keyboard, various switches and buttons, display devices 63 such as a CRT and lamps, and output devices 64 such as a printer and an FD drive are connected to the input-output device 52. The detector 16 for detecting arrival of the automated paper threading tow portion upstream of the lead-in roller unit, the detector 17 for detecting completion of paper threading of the automated paper threading tow portion into the lead-in roller unit, and the detector 18 for detecting completion of paper threading of the automated paper threading tow portion are connected to the input-output device 53. The first left lead-in roller clearance adjustment motor 26*a* is connected to the input-output device 54 via a motor driver 65 for the first left lead-in roller clearance adjustment motor, and the first left lead-in roller potentiometer 28*a* is connected to the input-output device 54 via an A/D converter 66. The second left lead-in roller clearance adjustment motor 26*b* is connected to the input-output device 55 via a motor driver 67 for the second left lead-in roller clearance adjustment motor, and the second left lead-in roller potentiometer 28*b* is connected to the input-output device 55 via an A/D converter 68. The first right lead-in roller clearance adjustment motor 27*a* is connected to the input-output device 56 via a motor driver 69 for the first right lead-in roller clearance adjustment motor, and the first right lead-in roller potentiometer 29*a* is connected to the input-output device 56 via an A/D converter 70. The second right lead-in roller clearance adjustment motor 27*b* is connected to the input-output device 57 via a motor driver 71 for the second right lead-in roller clearance adjustment motor, and the second right lead-in roller potentiometer 29*b* is connected to the input-output device 57 via an A/D converter 72.

Furthermore, the first automated paper threading tow portion drive motor 14-1 and the first rotary encoders 15-1 for the first automated paper threading tow portion drive motor are connected to the input-output device 58-1 via a motor driver 73-1 for the first automated paper threading tow portion drive motor, and the N-th automated paper threading tow portion drive motor 14-N and the rotary encoder 15-N for the N-th automated paper threading tow portion drive motor are connected to the input-output device 58-N via a motor driver 73-N for the N-th automated paper threading tow portion drive motor. Moreover, a printing press control device 75 is connected to the interface 60.

Being configured in this way, the control device 30 for the automated paper threading device and for the clearance adjustment between the lead-in rollers are operated in accordance with operation flows shown in FIG. 7, FIG. 8*a* to FIG. 8*c*, and FIG. 9*a* to FIG. 9*c*.

Specifically, a judgment is made in Step P1 as to whether or not the paper thickness data for the web W are inputted. If yes, the inputted paper thickness data are stored in the memory 34 in Step P2. If no, the operation proceeds to Step P5 to be described later. Next, if an error message for a paper thickness input error is displayed on the display device 63 in Step P3, the error message for the paper thickness input error on the display device 63 is deleted in Step P4, and the operation proceeds to Step P5.

Next, a judgment is made in Step P5 as to whether or not an automated paper threading start switch is turned on. If yes, the paper thickness data are read out of the memory 34 for storing paper thickness data in Step P6. If no, the operation returns to Step P1. Next, a judgment is made in Step P7 whether or not there are no paper thickness data or the paper thickness data=0. If yes, an error message for a paper thickness input error is displayed on the display device 63 in Step P8 and the operation returns to Step P1. If no, a position of the left lead-in roller 9A corresponding to the paper thickness is calculated based on the paper thickness data, and is stored in the memory 37 in Step P9.

Accordingly, in a case where the automated paper threading start switch is turned on without inputting the paper thickness data, the error message is displayed and informed to an operator, and the automated paper threading device is not driven. Therefore, the tow portion of the automated paper threading device is prevented from erroneously clashing with the lead-in roller 9 and being damaged. At the same time, it is explicitly instructed to the user that the paper thickness data input is required.

Next, a position of the right lead-in roller 9B corresponding to the paper thickness is calculated based on the paper thickness data, and is stored in the memory 38 in Step P10. Then, 0 is written in the memory 39 for completion of a movement of the first end of the left lead-in roller 9A in Step P11, and 0 is written in the memory 40 for completion of a movement of the second end of the left lead-in roller 9A in Step P12. Next, 0 is written in the memory 41 for completion of a movement of the first end of the right lead-in roller 9B in Step P13, and 0 is written in the memory 42 for completion of a movement of the second end of the right lead-in roller 9B in Step P14. Thereafter, 0 is written in the memory 43 for completion of a movement of the automated paper threading device in Step P15.

Next, drive instructions are outputted to all the motor drivers 73-1 to 73-N for the automated paper threading tow portion drive motors in Step P16. Thereafter, normal rotation instructions are outputted to the motor drivers 65, 67, 69 and 71 for the left and right lead-in roller clearance adjustment motors in Step P17. Next, in Step P18, an output of the A/D converter 66 for the first left lead-in roller potentiometer 28*a* is inputted and stored in the memory 44. Then, in Step P19, the current position of the first end of the left lead-in roller 9A is calculated based on the output of the A/D converter 66 for the first left lead-in roller potentiometer 28*a*, and is stored in the memory 48.

Next, the stand-by position of the left lead-in roller 9A is read out of the memory 35 in Step P20. Then, a judgment is made in Step P21 as to whether or not the current position of the first end of the left lead-in roller 9A is equal to the stand-by position of the left lead-in roller 9A. If yes, a stop instruction is outputted to the motor driver 65 for the first left lead-in roller clearance adjustment motor. If no, the operation proceeds to Step P24 to be described later. Thereafter, a determination is made in Step P23 that the movement of the first end of the left lead-in roller 9A to the stand-by position is completed, and 1 is written in the memory 39 for completion of the movement of the first end of the left lead-in roller.

Next, in Step P24, an output of the A/D converter 68 for the second left lead-in roller potentiometer 28*b* is inputted and stored in the memory 45. Then, in Step P25, the current position of the second end of the left lead-in roller 9A is calculated based on the output of the A/D converter 68 for the second left lead-in roller potentiometer 28*b*, and is stored in the memory 49.

Next, the stand-by position of the left lead-in roller 9A is read out of the memory 35 in Step P26. Then, a judgment is made in Step P27 as to whether or not the current position of the second end of the left lead-in roller 9A is equal to the stand-by position of the left lead-in roller 9A. If yes, a stop instruction is outputted to the motor driver 67 for the second left lead-in roller clearance adjustment motor in Step P28. If no, the operation proceeds to Step P30 to be described later.

Thereafter, a determination is made in Step P29 that the movement of the second end of the left lead-in roller 9A to the stand-by position is completed, and 1 is written in the memory 40 for completion of the movement of the second end of the left lead-in roller.

Next, in Step P30, an output of the A/D converter 70 for the first right lead-in roller potentiometer 29*a* is inputted and stored in the memory 46. Then, in Step P31, the current position of the first end of the right lead-in roller 9B is calculated based on the output of the A/D converter 70 for the first right lead-in roller potentiometer 29*a*, and is stored in the memory 50. Thereafter, the stand-by position of the right lead-in roller 9B is read out of the memory 36 in Step P32.

Next, a judgment is made in Step P33 as to whether or not the current position of the first end of the right lead-in roller 9B is equal to the stand-by position of the right lead-in roller 9B. If yes, a stop instruction is outputted to the motor driver 69 for the first right lead-in roller clearance adjustment motor in step P34. If no, the operation proceeds to Step P36 to be described later. Thereafter, a determination is made in Step P35 that the movement of the first end of the right lead-in roller 9B to the stand-by position is completed, and 1 is written in the memory 41 for completion of the movement of the first end of the right lead-in roller.

Next, in Step P36, an output of the A/D converter 72 for the second right lead-in roller potentiometer 29*b* is inputted and stored in the memory 47. Then, in Step P37, the current position of the second end of the right lead-in roller 9B is calculated based on the output of the A/D converter 72 for the second right lead-in roller potentiometer 29*b*, and is stored in the memory 51.

Next, the stand-by position of the right lead-in roller 9B is read out of the memory 36 in Step P38. Then, a judgment is made in Step P39 as to whether or not the current position of the second end of the right lead-in roller 9B is equal to the stand-by position of the right lead-in roller 9B. If yes, a stop instruction is outputted to the motor driver 71 for the second right lead-in roller clearance adjustment motor in Step P40. If no, the operation proceeds to Step P42 to be described later. Thereafter, a determination is made in Step P41 that the movement of the second end of the right lead-in roller 9B to the stand-by position is completed, and 1 is written in the memory 42 for completion of the movement of the second end of the right lead-in roller.

Next, if an output of the detector 16 for detecting arrival of the automated paper threading tow portion upstream of the lead-in roller unit is turned on in Step P42, a determination is made in Step P43 that the automated paper threading tow portion has arrived upstream of the lead-in roller unit, and 1 is written in the memory 43 for completion of the movement of the automated paper threading device. Then, the operation proceeds to Step P44. Next, after reading a value in the memory 43 for completion of the movement of the automated paper threading device in Step P44, a judgment is made in Step P45 as to whether or not the value in the memory for completion of the movement of the automated paper threading device is equal to 1. If yes, values in the memories 39 to 42 for completion of the movements of the first ends and the second ends of the left and right lead-in rollers 9A and 9B are read out in Step P46. If no, the operation returns to Step P18.

Next, a judgment is made in Step P47 as to whether or not all the values in the memories 39 to 42 for completion of the movements of the first ends and the second ends of the left and right lead-in rollers 9A and 9B are equal to 1. If yes, a determination is made that the movements of both of the left and right lead-in rollers 9A and 9B to the stand-by positions have been completed, and the operation proceeds to Step P48. If no, a determination is made that the movements of both of the left and right lead-in rollers 9A and 9B to the stand-by positions have not been completed, and stop instructions are outputted to all the motor drivers 73-1 to 73-N for the automated paper threading tow portion drive motors in Step P50. Then, the operation returns to Step P18.

Next, if all the automated paper threading tow portion drive motors 14-1 to 14-N are stopped in Step P48, drive instructions are outputted to all the motor drivers 73-1 to 73-N for the automated paper threading tow portion drive motors in Step P49. Then, the operation proceeds to Step P51. Next, if an output of the detector 17 for detecting completion of paper threading of the automated paper threading tow portion into the lead-in roller unit is turned on in Step P51, reverse rotation instructions are outputted to the motor drivers 65, 67, 69 and 71 for the left and right lead-in roller clearance adjustment motors 26*a*, 26*b*, 27*a* and 27*b* in Step P52.

Next, in Step P53, the output of the A/D converter 66 for the first left lead-in roller potentiometer 28*a* is inputted and stored in the memory 44. Then, in Step P54, the current position of the first end of the left lead-in roller 9A is calculated based on the output of the A/D converter 66 for the first left lead-in roller potentiometer 28*a*, and is stored in the memory 48. Thereafter, the position of the left lead-in roller 9A corresponding to the paper thickness is read out of the memory 37 in Step P55.

Next, a judgment is made in Step P56 as to whether or not the current position of the first end of the left lead-in roller 9A is equal to the position of the left lead-in roller 9A corresponding to the paper thickness. If yes, a stop instruction is outputted to the motor driver 65 for the first left lead-in roller clearance adjustment motor in Step P57. If no, the operation proceeds to Step P59 to be described later. Next, a determination is made in Step P58 that the movement of the first end of the left lead-in roller 9A to the position corresponding to the paper thickness is completed, and 2 is written in the memory 39 for completion of the movement of the first end of the left lead-in roller. Then, in Step P59, the output of the A/D converter 66 for the second left lead-in roller potentiometer 28*b* is inputted and stored in the memory 45.

Next, in Step P60, the current position of the second end of the left lead-in roller 9A is calculated based on the output of the A/D converter 68 for the second left lead-in roller potentiometer 28*b*, and is stored in the memory 49. Thereafter, the position of the left lead-in roller 9A corresponding to the paper thickness is read out of the memory 37 in Step P61. Next, a judgment is made in Step P62 as to whether or not the current position of the second end of the left lead-in roller 9A is equal to the position of the left lead-in roller 9A corresponding to the paper thickness. If yes, a stop instruction is outputted to the motor driver 67 for the second left lead-in roller clearance adjustment motor in Step P63. If no, the operation proceeds to Step P65 to be described later.

Next, a determination is made in Step P64 that the movement of the second end of the left lead-in roller 9A to the position corresponding to the paper thickness is completed, and 2 is written in the memory 40 for completion of the movement of the second end of the left lead-in roller. Then, in Step P65, the output of the A/D converter 70 for the first right lead-in roller potentiometer 29*a* is inputted and stored in the memory 46. Next, in Step P66, the current position of the first end of the right lead-in roller 9B is calculated based on the output of the A/D converter 70 for the first right lead-in roller potentiometer 29*a*, and is stored in the memory 50.

Next, the position of the right lead-in roller 9B corresponding to the paper thickness is read out of the memory 38 in Step P67. Then, a judgment is made in Step P68 as to whether or not the current position of the first end of the right lead-in roller 9B is equal to the position of the right lead-in roller 9B corresponding to the paper thickness. If yes, a stop instruction is outputted to the motor driver 69 for the first right lead-in roller 9B clearance adjustment motor in Step P69. If no, the operation proceeds to Step P71 to be described later.

Next, a determination is made in Step P70 that the movement of the first end of the right lead-in roller 9B to the position corresponding to the paper thickness is completed, and 2 is written in the memory 41 for completion of the movement of the first end of the right lead-in roller. Thereafter, in Step P71, the output of the A/D converter 72 for the second right lead-in roller potentiometer 29*b* is inputted and stored in the memory 47. Next, in Step P72, the current position of the second end of the right lead-in roller 9B is calculated based on the output of the A/D converter 72 for the second right lead-in roller potentiometer 29*b*, and is stored in the memory 51. Then, the position of the right lead-in roller 9B corresponding to the paper thickness is read out of the memory 38 in Step P73.

Next, a judgment is made in Step P74 as to whether or not the current position of the second end of the right lead-in roller 9B is equal to the position of the right lead-in roller 9B corresponding to the paper thickness. If yes, a stop instruction is outputted to the motor driver 71 for the second right lead-in roller 9B clearance adjustment motor in Step P75. If no, the operation proceeds to Step P77 to be described later.

Next, a determination is made in Step P76 that the movement of the second end of the right lead-in roller 9B to the position corresponding to the paper thickness is completed, and 2 is written in the memory 42 for completion of the movement of the second end of the right lead-in roller. Thereafter, a judgment is made in Step P77 as to whether or not an output of the detector 18 for detecting completion of paper threading of the automated paper threading tow portion is turned on. If yes, stop instructions are outputted to all the motor drivers 73-1 to 73-N for the automated paper threading tow portion drive motors in Step P78. If no, the operation proceeds to Step P80 to be described later.

Next, a determination is made in Step P79 that the automated paper threading is completed, and 2 is written in the memory 43 for completion of the movement of the automated paper threading device. Then, a value in the memory 43 for completion of the movement of the automated paper threading device is read out in Step P80. Next, a judgment is made in Step P81 as to whether or not the value in the memory 43 for completion of the movement of the automated paper threading device is equal to 2. If yes, the values in the memories 39 to 42 for completion of the movements of the first ends and the second ends of the left and right lead-in rollers 9A and 9B are read out in Step P82. If no, a determination is made that the automated paper threading has not been completed, and the operation returns to Step P53.

Next, a judgment is made in Step P83 as to whether or not all the values in the memories 39 to 42 for completion of the movements of the first ends and the second ends of the left and right lead-in rollers 9A and 9B are equal to 2. If yes, a determination is made that the movements of both of the left and right lead-in rollers to the positions corresponding to the paper thickness have been completed, and a completion signal is outputted to the printing press control device 75 to set the web rotary printing press as a normal printable state in Step P84. If no, a determination is made that the movements of both of the left and right lead-in rollers to the positions corresponding to the paper thickness have not been completed, and the operation returns to Step P53.

As described above, in this embodiment, the motors 26*a*, 26*b*, 27*a* and 27*b* for adjusting the amount of clearance between the left and right lead-in rollers 9A and 9B as well as the automated paper threading tow portion drive motors 14-1 to 14-N are driven at the same time, and are sequentially stopped when the left and right lead-in rollers 9A and 9B as well as the automated paper threading tow portion arrive at respectively predetermined positions. It should be noted that, if the automated paper threading tow portion reaches the lead-in roller unit before the left and right lead-in rollers 9A and 9B are moved to the stand-by positions, the automated paper threading tow portion drive motors 14-1 to 14-N are temporarily stopped, and restarted when the left and right lead-in rollers 9A and 9B are moved to the stand-by positions.

In this way, it is possible to set the amount of clearance between the left and right lead-in rollers 9A and 9B automatically at the predetermined large value when starting the automated web threading device, and to set the amount of clearance between the left and right lead-in rollers 9A and 9B automatically at the optimal value corresponding to the inputted paper thickness of the web W in response to completion of paper threading into the lead-in roller unit. This makes it possible to achieve reduction in a burden on an operator and reduction in wasted paper, and also to achieve reduction in clearance adjustment time.

Moreover, if the movements of the left and right lead-in rollers to the stand-by positions are not completed when the detector 16 for detecting arrival of the automated paper threading tow portion upstream of the lead-in roller unit detects the tow portion of the automated paper threading device, the drives of the automated paper threading tow portion drive motors 14-1 to 14-N are stopped, and a clash of the tow portion of the automated paper threading device with the lead-in rollers is automatically prevented. Accordingly, it is possible to prevent damage on the tow portion of the automated paper threading device or on the lead-in rollers.

Second Embodiment

Figure 10A:
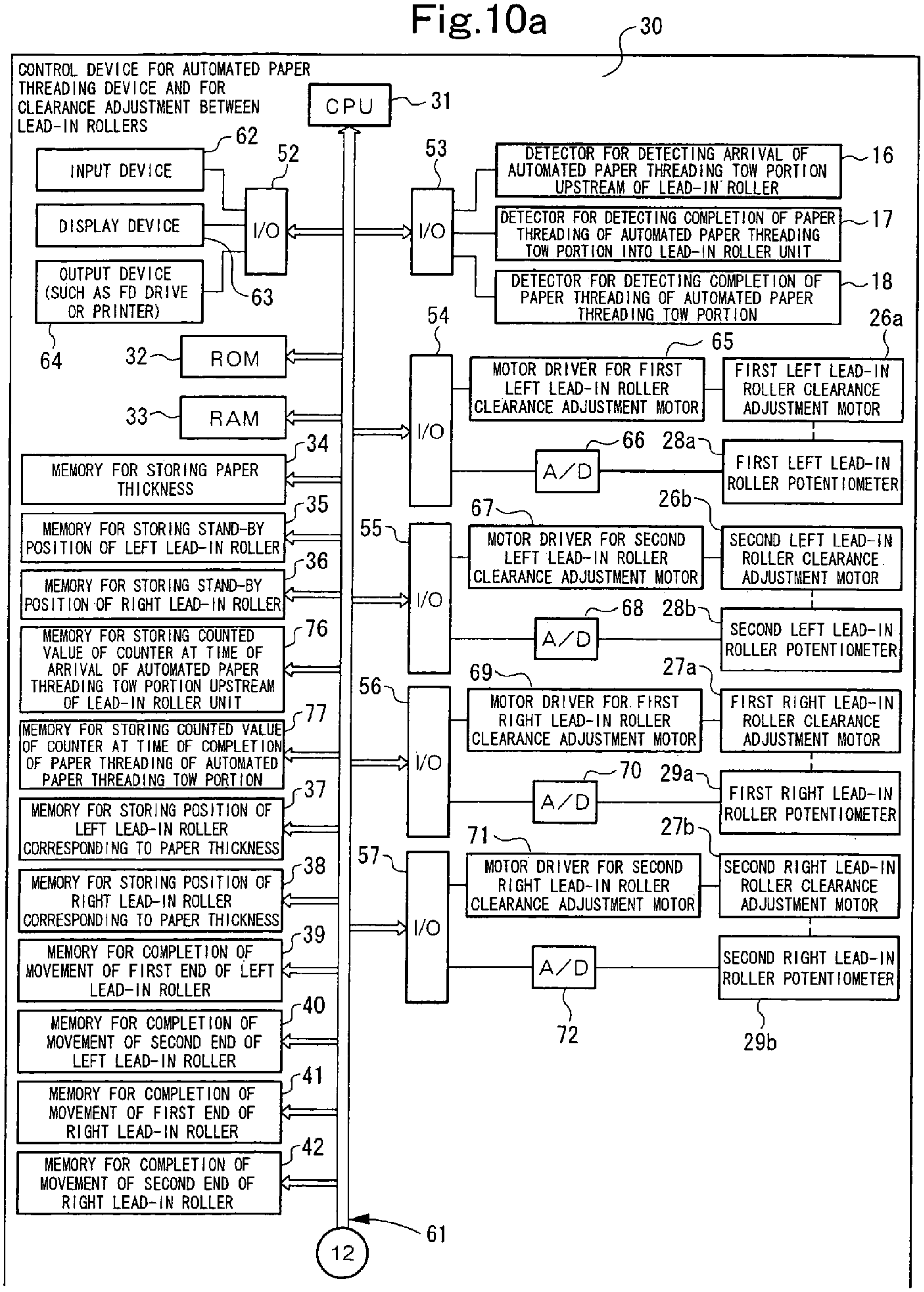
FIG. 10*a* is a block diagram of a control device for an automated paper threading device and for a lead-in roller clearance adjustment mechanism representing a second embodiment of the present invention.
Figure 10B:
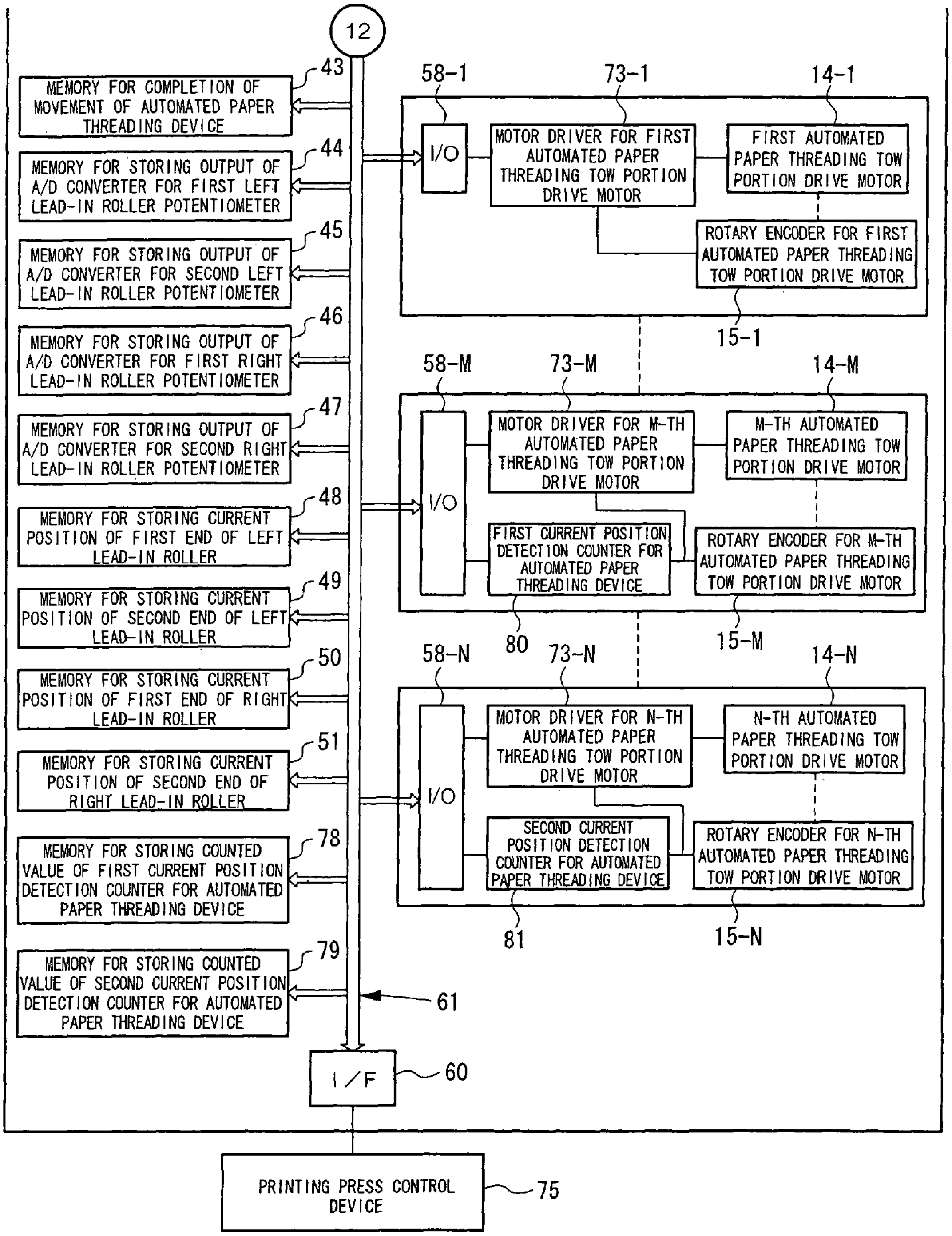
FIG. 10*b* is another block diagram of the control device for the automated paper threading device and for the lead-in roller clearance adjustment mechanism representing the second embodiment of the present invention.
Figure 11:
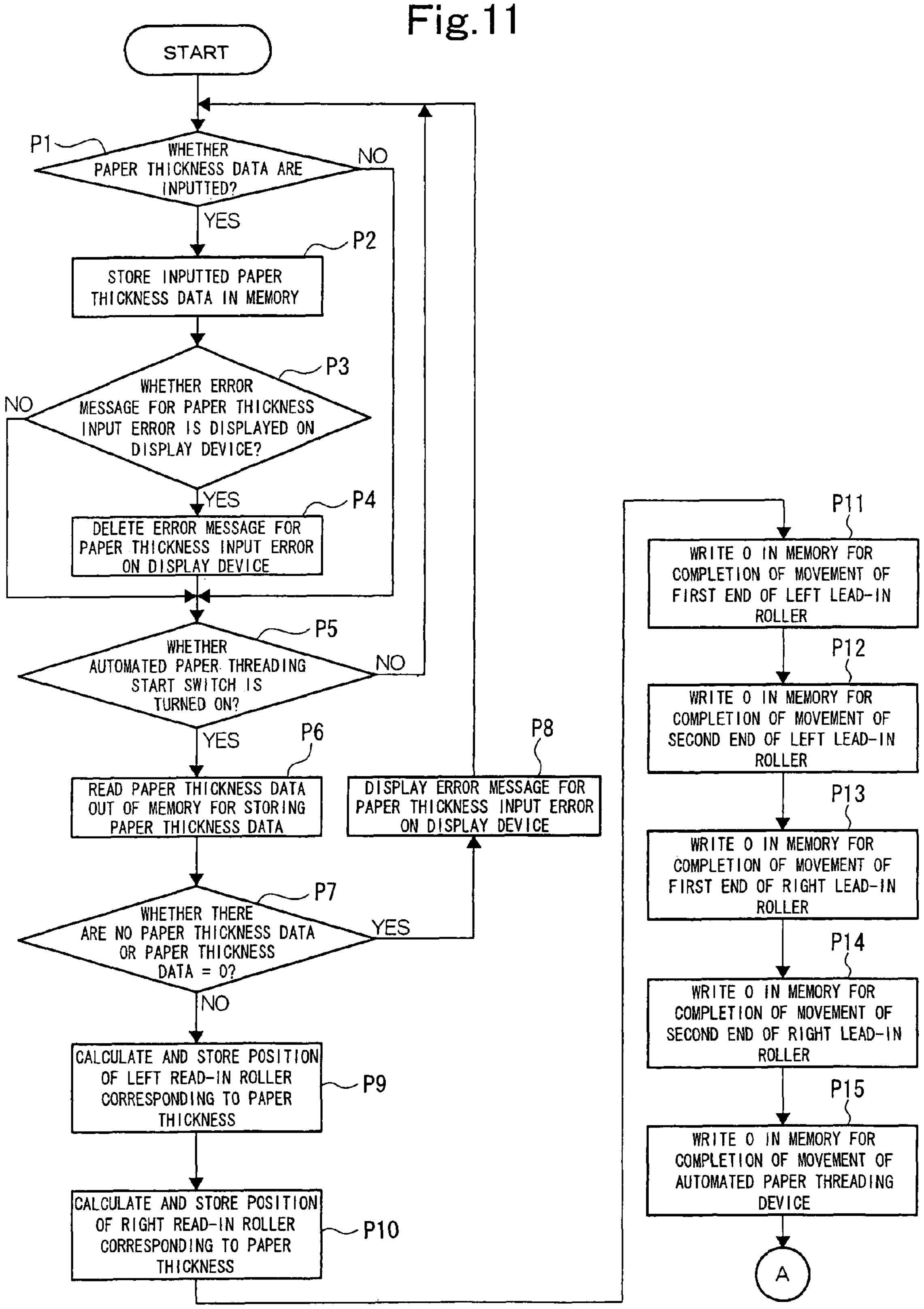
FIG. 11 is an operation flowchart of the control device for the automated paper threading device and for the lead-in roller clearance adjustment mechanism.
Figure 12A:
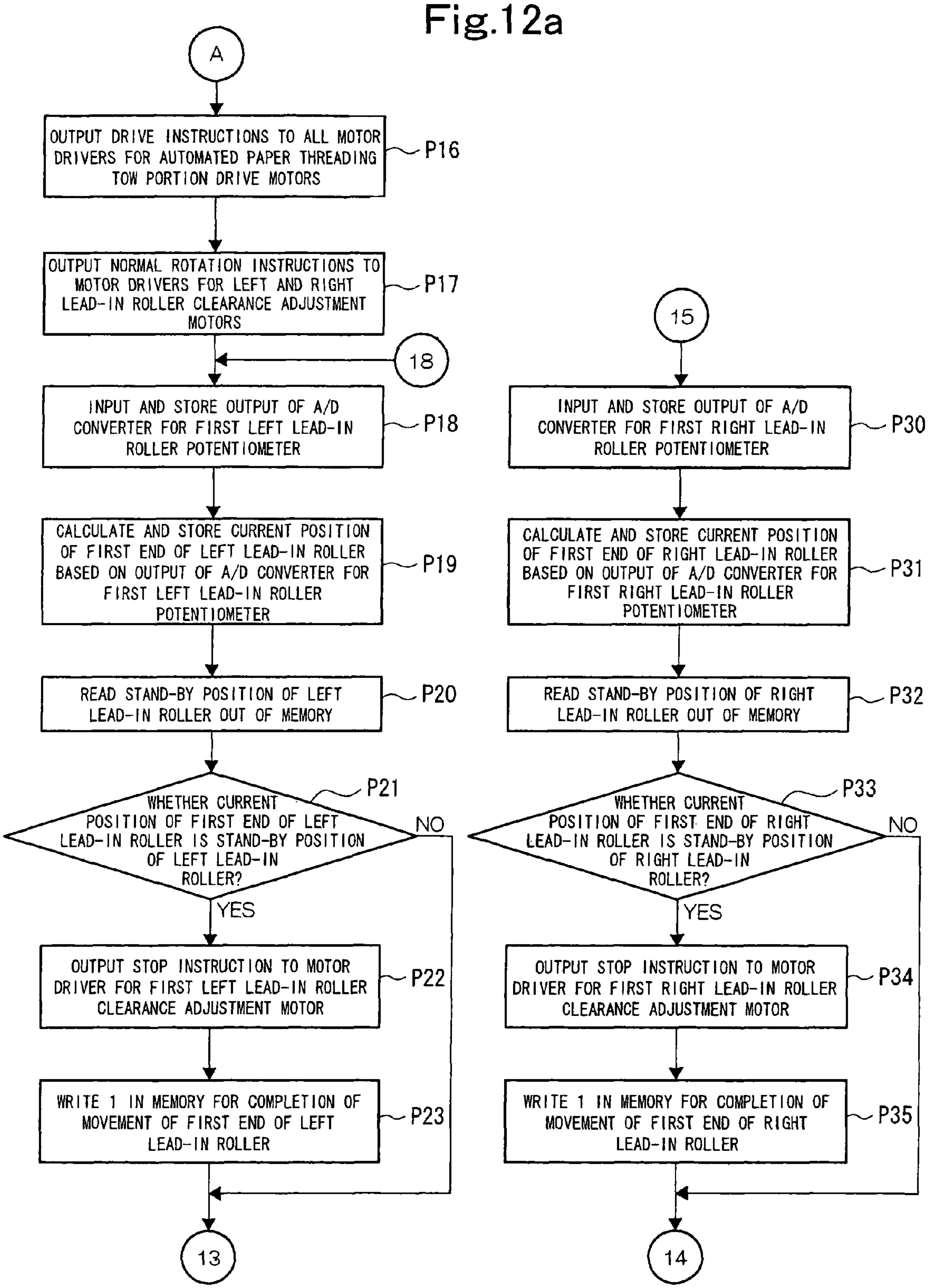
FIG. 12*a* is another operation flowchart of the control device for the automated paper threading device and for the lead-in roller clearance adjustment mechanism.
Figure 12B:
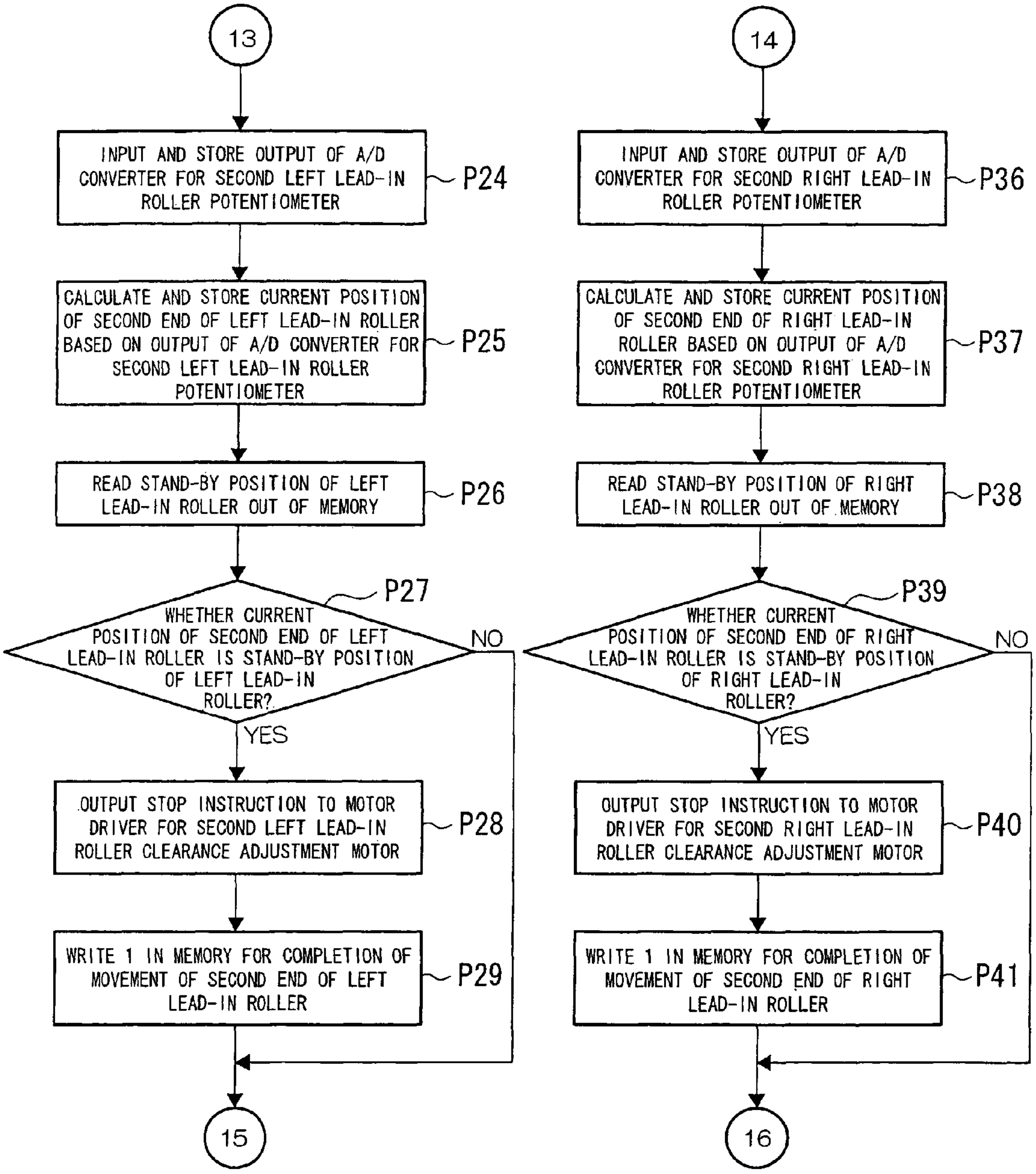
FIG. 12*b* is still another operation flowchart of the control device for the automated paper threading device and for the lead-in roller clearance adjustment mechanism.
Figure 12C:
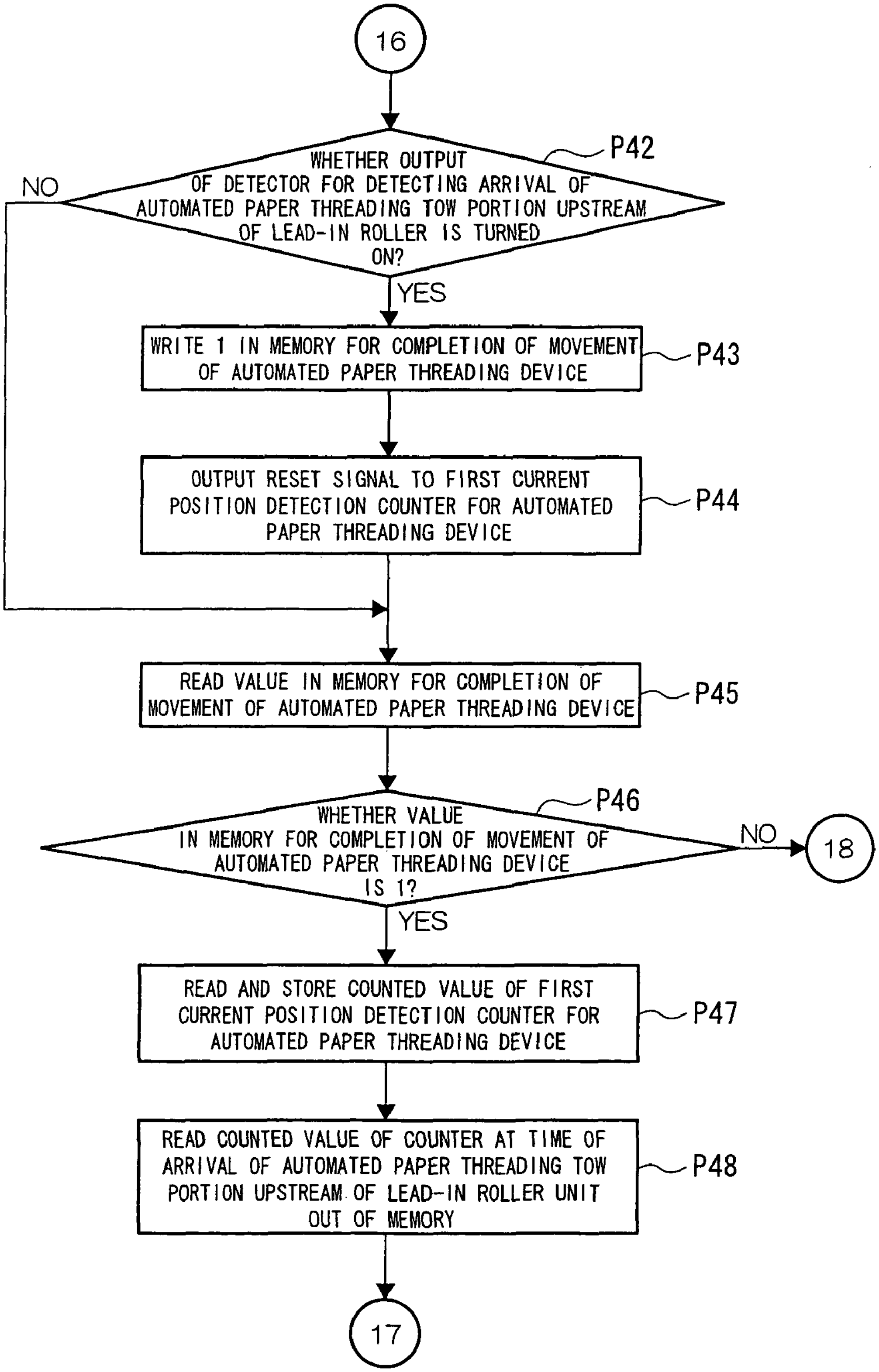
FIG. 12*c* is still another operation flowchart of the control device for the automated paper threading device and for the lead-in roller clearance adjustment mechanism.
Figure 12D:
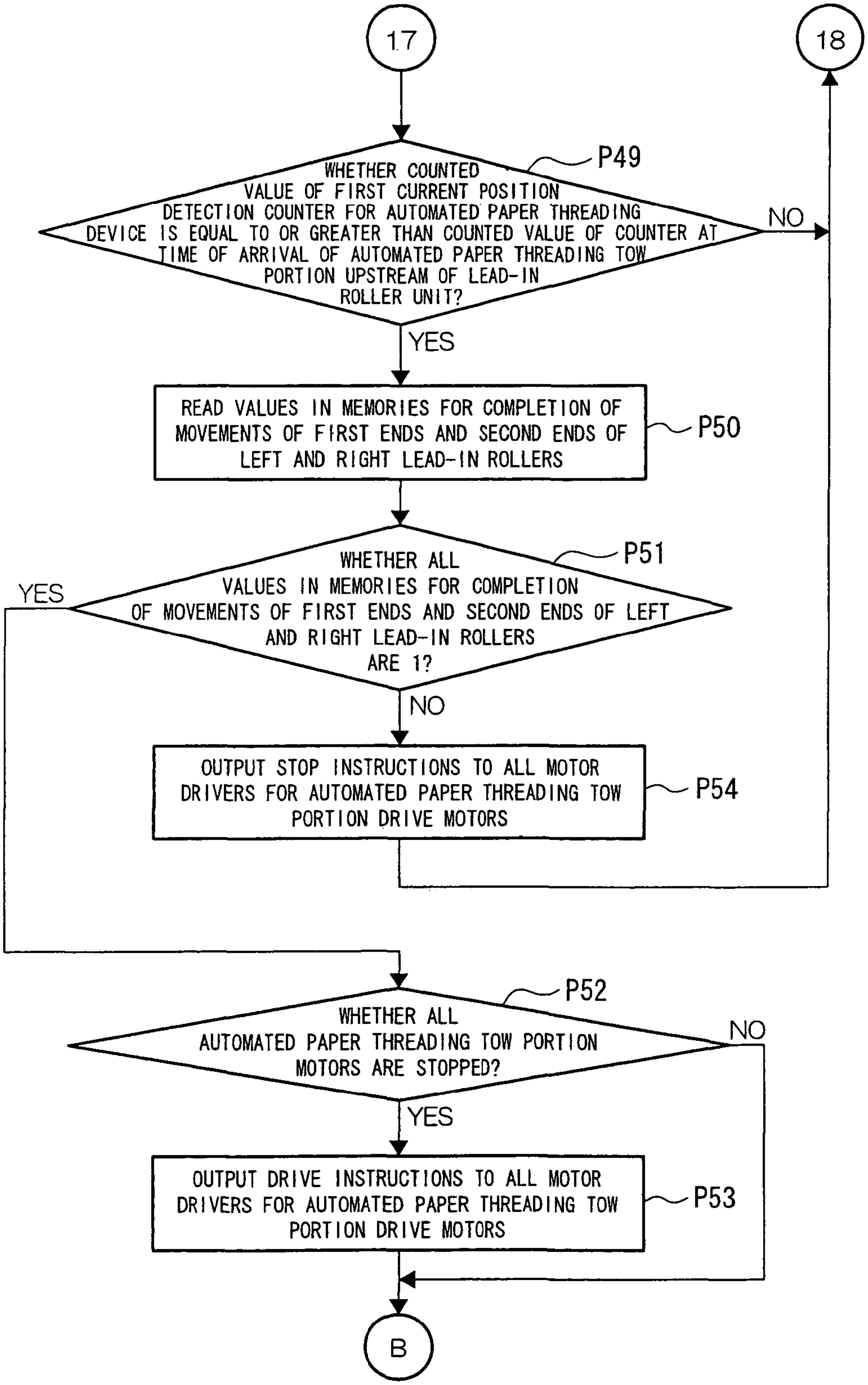
FIG. 12*d* is still another operation flowchart of the control device for the automated paper threading device and for the lead-in roller clearance adjustment mechanism.
Figure 13A:
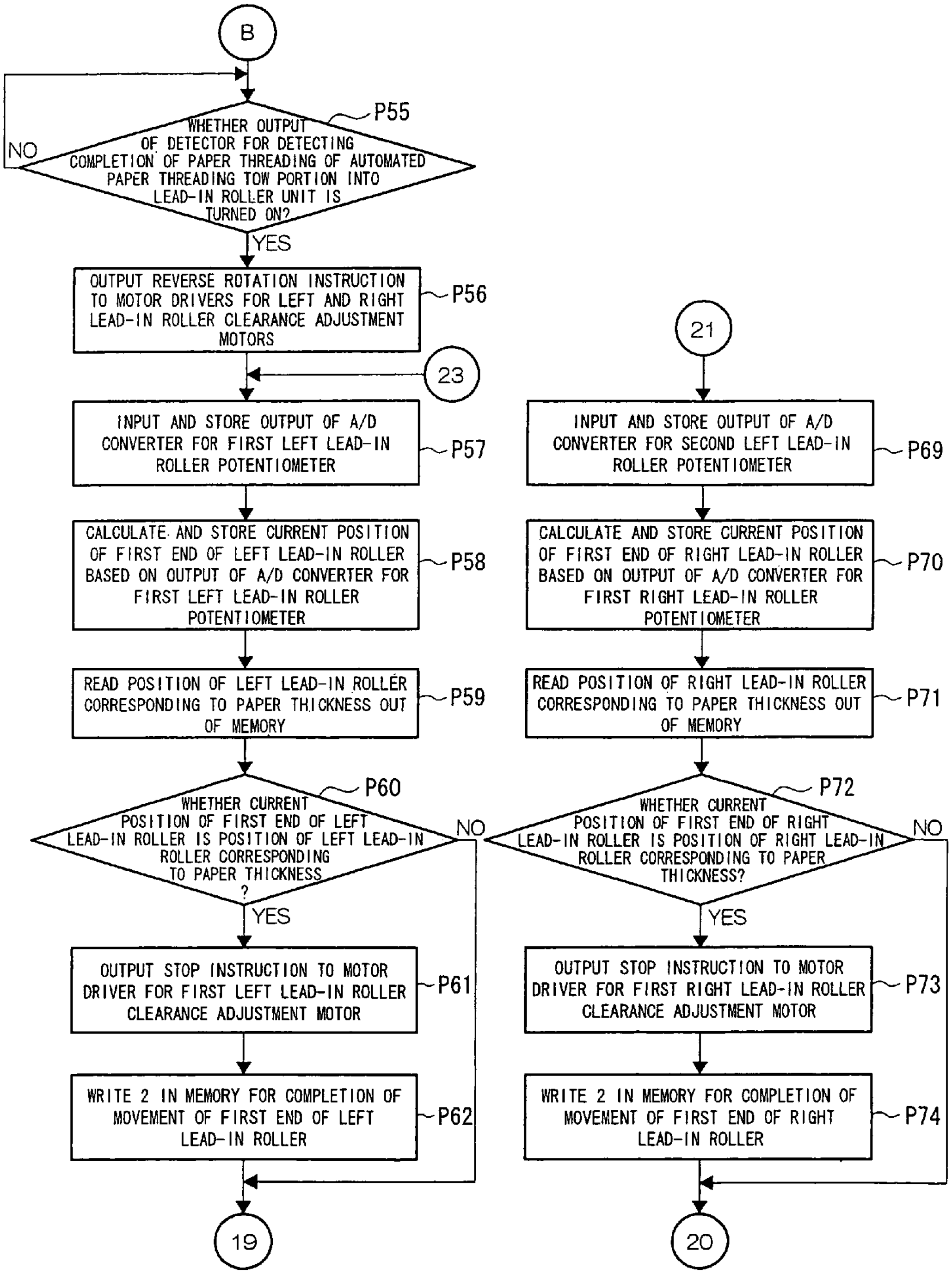
FIG. 13*a* is still another operation flowchart of the control device for the automated paper threading device and for the lead-in roller clearance adjustment mechanism.
Figure 13B:
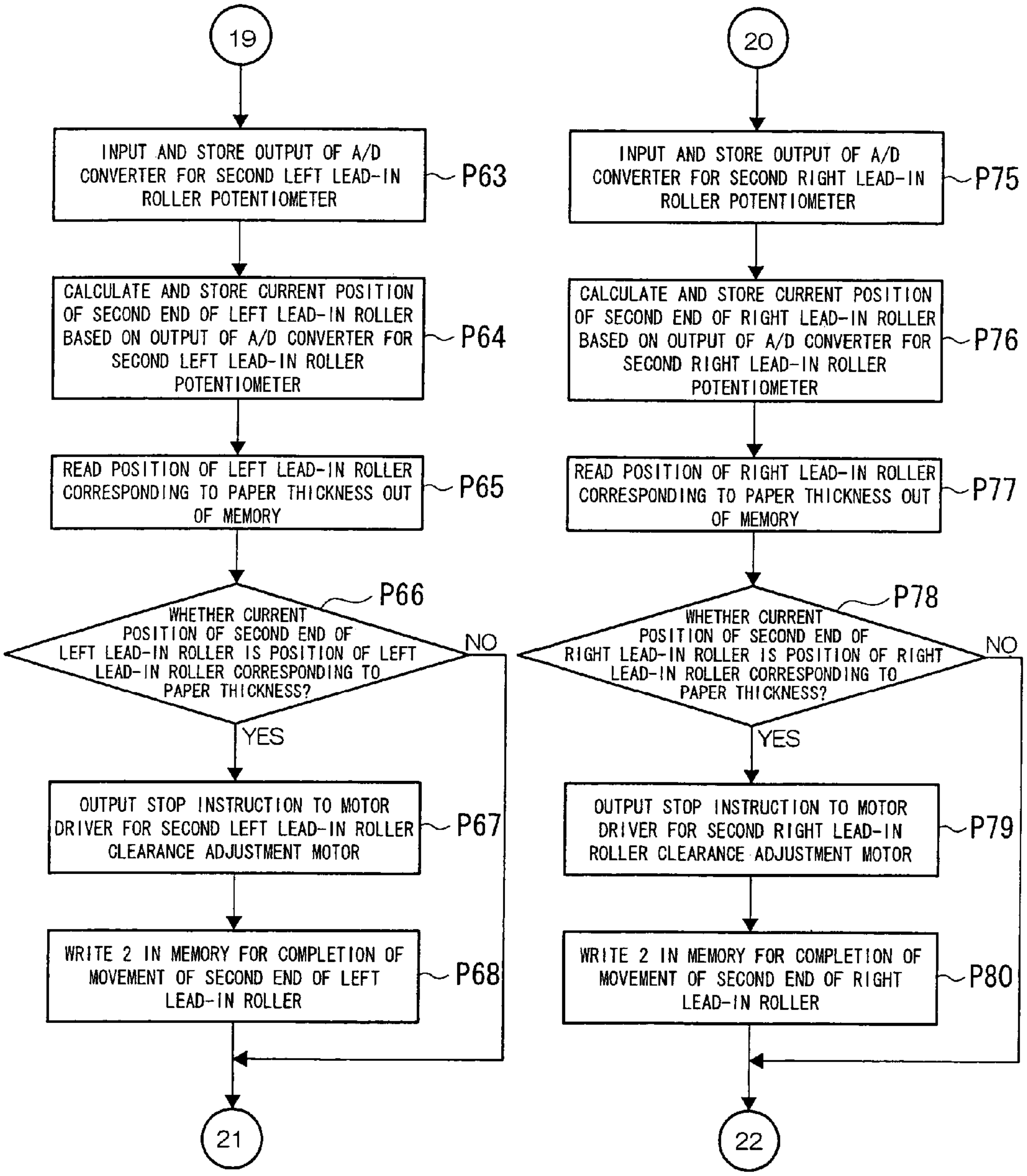
FIG. 13*b* is still another operation flowchart of the control device for the automated paper threading device and for the lead-in roller clearance adjustment mechanism.
Figure 13C:
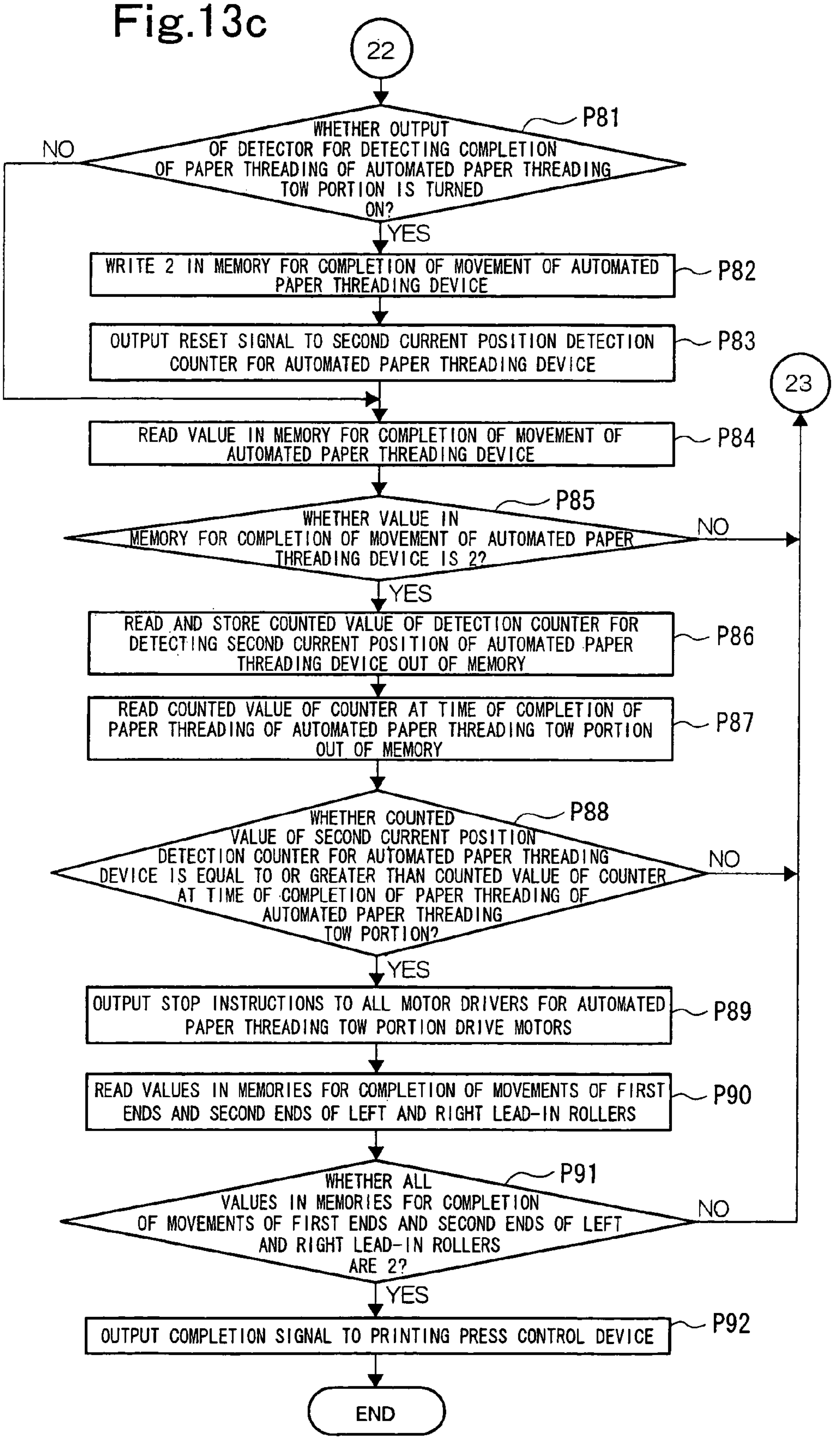
FIG. 13*c* is still another operation flowchart of the control device for the automated paper threading device and for the lead-in roller clearance adjustment mechanism.

As shown in FIG. 10*a* and FIG. 10*b*, in addition to a CPU 31, a ROM 32 and a RAM 33, a control device 30 for an automated paper threading device and for the clearance adjustment between the lead-in rollers of this embodiment include a memory 34 for storing paper thickness data, a memory 35 for storing a stand-by position of a left lead-in roller, a memory 36 for storing a stand-by position of a right lead-in roller, a memory 37 for storing a position of the left lead-in roller corresponding to a paper thickness, a memory 38 for storing a position of the right lead-in roller corresponding to the paper thickness, a memory 39 for completion of a movement of a first end of the left lead-in roller, a memory 40 for completion of a movement of a second end of the left lead-in roller, a memory 41 for completion of a movement of a first end of the right lead-in roller, a memory 42 for completion of a movement of a second end of the right lead-in roller, a memory 43 for completion of a movement of the automated paper threading device, a memory 44 for storing an output of an A/D converter for a first left lead-in roller potentiometer, a memory 45 for storing an output of an A/D converter for a second left lead-in roller potentiometer, a memory 46 for storing an output of an A/D converter for a first right lead-in roller potentiometer, a memory 47 for storing an output of an A/D converter for a second right lead-in roller potentiometer, a memory 48 for storing a current position of the first end of the left lead-in roller, a memory 49 for storing a current position of the second end of the left lead-in roller, a memory 50 for storing a current position of the first end of the right lead-in roller, a memory 51 for storing a current position of the second end of the right lead-in roller, a memory 76 for storing a counted value of a counter at the time of arrival of an automated paper threading tow portion upstream of a lead-in roller unit, a memory 77 for storing a counted value of the counter at the time of completion of paper threading by the automated paper threading tow portion, a memory 78 for storing a counted value of a first current position detection counter for the automated paper threading device, and a memory 79 for storing a counted value by a second current position detection counter for the automated paper threading device, which are connected to one another by use of a bus (BUS) 61 together with each of input-output devices 52 to 57 and 58-1 to 58-N, and an interface 60.

Input devices 62 such as a keyboard, various switches and buttons, display devices 63 such as a CRT and lamps, and output devices 64 such as a printer and an FD drive are connected to the input-output device 52. A detector 16 for detecting arrival of the automated paper threading tow portion upstream of a lead-in roller unit, a detector 17 for detecting completion of paper threading of the automated paper threading tow portion into the lead-in roller unit, and a detector 18 for detecting completion of paper threading of the automated paper threading tow portion are connected to the input-output device 53. A first left lead-in roller clearance adjustment motor 26*a* is connected to the input-output device 54 via a motor driver 65 for the first left lead-in roller clearance adjustment motor, and a first left lead-in roller potentiometer 28*a* is connected to the input-output device 54 via an A/D converter 66. A second left lead-in roller clearance adjustment motor 26*b* is connected to the input-output device 55 via a motor driver 67 for the second left lead-in roller clearance adjustment motor, and a second left lead-in roller potentiometer 28*b* is connected to the input-output device 55 via an A/D converter 68. A first right lead-in roller clearance adjustment motor 27*a* is connected to the input-output device 56 via a motor driver 69 for the first right lead-in roller clearance adjustment motor, and a first right lead-in roller potentiometer 29*a* is connected to the input-output device 56 via an A/D converter 70. A second right lead-in roller clearance adjustment motor 27*b* is connected to the input-output device 57 via a motor driver 71 for the second right lead-in roller clearance adjustment motor, and a second right lead-in roller potentiometer 29*b* is connected to the input-output device 57 via an A/D converter 72.

Furthermore, a first automated paper threading tow portion drive motor 14-1 and a rotary encoder 15-1 for the first automated paper threading tow portion drive motor are connected to the input-output device 58-1 via a motor driver 73-1 for the first automated paper threading tow portion drive motor. An M-th automated paper threading tow portion drive motor 14-M and a rotary encoder 15-M for the M-th automated paper threading tow portion drive motor are connected to the input-output device 58-M via a motor driver 73-M for the M-th automated paper threading tow portion drive motor. Moreover, a first current position detection counter 80 for the automated paper threading device is connected to the input-output device 58-M, and this counter 80 is connected to the rotary encoder 15-M for the M-th automated paper threading tow portion drive motor. An N-th automated paper threading tow portion drive motor 14-N and a rotary encoder 15-N for the N-th automated paper threading tow portion drive motor are connected to the input-output device 58-N via a motor driver 73-N for the N-th automated paper threading tow portion drive motor. Moreover, a second current position detection counter 81 for the automated paper threading device is connected to the input-output device 58-N, and this counter 81 is connected to the rotary encoder 15-N for the N-th automated paper threading tow portion drive motor. Moreover, a printing press control device 75 is connected to the interface 60.

Being configured in this way, the control device 30 for the automated paper threading device and for the clearance adjustment between the lead-in rollers are operated in accordance with operation flows shown in FIG. 11, FIG. 12*a* to FIG. 12*d*, and FIG. 13*a* to FIG. 13*c*.

Specifically, a judgment is made in Step P1 as to whether or not paper thickness data for a web W are inputted. If yes, the inputted paper thickness data are stored in the memory 34 in Step P2. If no, the operation proceeds to Step P5 to be described later. Next, if an error message for a paper thickness input error is displayed on the display device 63 in Step P3, the error message for the paper thickness input error on the display device 63 is deleted in Step P4, and the operation proceeds to Step P5.

Next, a judgment is made in Step P5 as to whether or not an automated paper threading start switch is turned on. If yes, the paper thickness data are read out of the memory 34 for storing paper thickness data in Step P6. If no, the operation returns to Step P1. Next, a judgment is made in Step P7 whether or not there are no paper thickness data or the paper thickness data=0. If yes, an error message for a paper thickness input error is displayed on the display device 63 in Step P8, and the operation returns to Step P1. If no, a position of the left lead-in roller 9A corresponding to the paper thickness is calculated based on the paper thickness data, and is stored in the memory 37 in Step P9.

Accordingly, in a case where the automated paper threading start switch is turned on without inputting the paper thickness data, the error message is displayed and informed to an operator, and the automated paper threading device is not driven. Therefore, the tow portion of the automated paper threading device is prevented from erroneously clashing with the lead-in roller 9 and being damaged. At the same time, it is explicitly instructed to the user that the paper thickness data input is required.

Next, a position of the right lead-in roller 9B corresponding to the paper thickness is calculated based on the paper thickness data, and is stored in the memory 38 in Step P10. Then, 0 is written in the memory 39 for completion of a movement of the first end of the left lead-in roller 9A in Step P11, and 0 is written in the memory 40 for completion of a movement of the second end of the left lead-in roller 9A in Step P12. Next, 0 is written in the memory 41 for completion of a movement of the first end of the right lead-in roller 9B in Step P13, and 0 is written in the memory 42 for completion of a movement of the second end of the right lead-in roller 9B in Step P14. Thereafter, 0 is written in the memory 43 for completion of a movement of the automated paper threading device in Step P15.

Next, drive instructions are outputted to all the motor drivers 73-1 to 73-N for the automated paper threading tow portion drive motors in Step P16. Thereafter, normal rotation instructions are outputted to the motor drivers 65, 67, 69 and 71 for the left and right lead-in roller clearance adjustment motors in Step P17. Next, in Step P18, an output of the A/D converter 66 for the first left lead-in roller potentiometer 28*a* is inputted and stored in the memory 44. Then, in Step P19, the current position of the first end of the left lead-in roller 9A is calculated based on the output of the A/D converter 66 for the first left lead-in roller potentiometer 28*a*, and is stored in the memory 48.

Next, the stand-by position of the left lead-in roller 9A is read out of the memory 35 in Step P20. Then, a judgment is made in Step P21 as to whether or not the current position of the first end of the left lead-in roller 9A is equal to the stand-by position of the left lead-in roller 9A. If yes, a stop instruction is outputted to the motor driver 65 for the first left lead-in roller clearance adjustment motor in Step P22. If no, the operation proceeds to Step P24 to be described later. Thereafter, a determination is made in Step P23 that the movement of the first end of the left lead-in roller 9A to the stand-by position is completed, and 1 is written in the memory 39 for completion of the movement of the first end of the left lead-in roller.

Next, in Step P24, an output of the A/D converter 68 for the second left lead-in roller potentiometer 28*b* is inputted and stored in the memory 45. Then, in Step P25, the current position of the second end of the left lead-in roller 9A is calculated based on the output of the A/D converter 68 for the second left lead-in roller potentiometer 28*b*, and is stored in the memory 49.

Next, the stand-by position of the left lead-in roller 9A is read out of the memory 35 in Step P26. Then, a judgment is made in Step P27 as to whether or not the current position of the second end of the left lead-in roller 9A is equal to the stand-by position of the left lead-in roller 9A. If yes, a stop instruction is outputted to the motor driver 67 for the second left lead-in roller clearance adjustment motor in Step P28. If no, the operation proceeds to Step P30 to be described later. Thereafter, a determination is made in Step P29 that the movement of the second end of the left lead-in roller 9A to the stand-by position is completed, and 1 is written in the memory 40 for completion of the movement of the second end of the left lead-in roller.

Next, in Step P30, an output of the A/D converter 70 for the first right lead-in roller potentiometer 29*a* is inputted and stored in the memory 46. Then, in Step P31, the current position of the first end of the right lead-in roller 9B is calculated based on the output of the A/D converter 70 for the first right lead-in roller potentiometer 29*a*, and is stored in the memory 50. Thereafter, the stand-by position of the right lead-in roller 9B is read out of the memory 36 in Step P32.

Next, a judgment is made in Step P33 as to whether or not the current position of the first end of the right lead-in roller 9B is equal to the stand-by position of the right lead-in roller 9B. If yes, a stop instruction is outputted to the motor driver 69 for the first right lead-in roller clearance adjustment motor in Step P34. If no, the operation proceeds to Step P36 to be described later. Thereafter, a determination is made in Step P35 that the movement of the first end of the right lead-in roller 9B to the stand-by position is completed, and 1 is written in the memory 41 for completion of the movement of the first end of the right lead-in roller.

Next, in Step P36, an output of the A/D converter 72 for the second right lead-in roller potentiometer 29*b* is inputted and stored in the memory 47. Then, in Step P37, the current position of the second end of the right lead-in roller 9B is calculated based on the output of the A/D converter 72 for the second right lead-in roller potentiometer 29*b*, and is stored in the memory 51.

Next, the stand-by position of the right lead-in roller 9B is read out of the memory 36 in Step P38. Then, a judgment is made in Step P39 as to whether or not the current position of the second end of the right lead-in roller 9B is equal to the stand-by position of the right lead-in roller 9B. If yes, a stop instruction is outputted to the motor driver 71 for the second right lead-in roller clearance adjustment motor in Step P40. If no, the operation proceeds to Step P42 to be described later. Thereafter, a determination is made in Step P41 that the movement of the second end of the right lead-in roller 9B to the stand-by position is completed, and 1 is written in the memory 42 for completion of the second end of the right lead-in roller.

Next, a judgment is made in Step P42 as to whether or not an output of the detector 16 for detecting arrival of the automated paper threading tow portion upstream of the lead-in roller unit is turned on. If yes, a determination is made in Step P43 that the automated paper threading tow portion has arrived upstream of the lead-in roller unit, and 1 is written in the memory 43 for completion of the movement of the automated paper threading device. If no, the operation proceeds to Step P45 to be described later. Next, a reset signal is outputted to the first current position detection counter 80 for the automated paper threading device in Step P44. Thereafter, a value in the memory 43 for completion of the movement of the automated paper threading device is read out in Step P45. Next, a judgment is made in Step P46 as to whether or not the value in the memory for completion of the movement of the automated paper threading device is equal to 1. If yes, a counted value by the first current position detection counter 80 for the automated paper threading device is read out, and stored in the memory 78 in Step P47. If no, a determination is made that the automated paper threading tow portion has not arrived at the position of the detector 16 for detecting arrival of the automated paper threading tow portion upstream of the lead-in roller unit, and the operation returns to Step P18.

Next, the counted value by the counter at the time of arrival of the automated paper threading tow portion upstream of the lead-in roller unit is read out of the memory 76 in Step P48. Thereafter, a judgment is made in Step P49 as to whether or not the counted value by the first current position detection counter 80 for the automated paper threading device is equal to or greater than the counted value by the counter at the time of arrival of the automated paper threading tow portion upstream of the lead-in roller unit. If yes, a determination is made that the automated paper threading tow portion has arrived upstream of the lead-in roller unit, and the values in the memories 39 to 42 for completion of the movements of the first ends and the second ends of the left and right lead-in rollers 9A and 9B are read out in Step P50. If no, a determination is made that the automated paper threading tow portion has not arrived upstream of the lead-in roller unit, and the operation returns to Step P18.

Next, a judgment is made in Step P51 as to whether or not all the values in the memories 39 to 42 for completion of the movements of the first ends and the second ends of the left and right lead-in rollers 9A and 9B are equal to 1. If yes, a determination is made that the movements of both of the left and right lead-in rollers 9A and 9B to the stand-by positions have been completed, and the operation proceeds to Step P52. If no, a determination is made that the movements of both of the left and right lead-in rollers 9A and 9B to the stand-by positions have not been completed, and stop instructions are outputted to all the motor drivers 73-1 to 73-M and 73-N for the automated paper threading tow portion drive motors in Step P54. Then, the operation returns to Step P18.

Next, if it is determined in step P52 that all the automated paper threading tow portion drive motors 14-1 to 14-M and 14-N are stopped, drive instructions are outputted to all the motor drivers 73-1 to 73M and 73-N for the automated paper threading tow portion drive motors in Step P53. Then, the operation returns to Step P55. Next, if an output of the detector 17 for detecting completion of paper threading of the automated paper threading tow portion into the lead-in roller unit is turned on in Step P55, reverse rotation instructions are outputted to the motor drivers 65, 67, 69 and 71 for the left and right lead-in roller clearance adjustment motors 26*a*, 26*b*, 27*a* and 27*b* in Step P56.

Next, in Step P57, the output of the A/D converter 66 for the first left lead-in roller potentiometer 28*a* is inputted and stored in the memory 44. Then, in Step P58, the current position of the first end of the left lead-in roller 9A is calculated based on the output of the A/D converter 66 for the first left lead-in roller potentiometer 28*a*, and is stored in the memory 48. Thereafter, the position of the left lead-in roller 9A corresponding to the paper thickness is read out of the memory 37 in Step P59.

Next, a judgment is made in Step P60 as to whether or not the current position of the first end of the left lead-in roller 9A is equal to the position of the left lead-in roller 9A corresponding to the paper thickness. If yes, a stop instruction is outputted to the motor driver 65 for the first left lead-in roller clearance adjustment motor in Step P61. If no, the operation proceeds to Step P63 to be described later. Next, a determination is made in Step P62 that the movement of the first end of the left lead-in roller 9A to the position corresponding to the paper thickness is completed, and 2 is written in the memory 39 for completion of the movement of the first end of the left lead-in roller. Then, in Step P63, the output of the A/D converter 68 for the second left lead-in roller potentiometer 28*b* is inputted and stored in the memory 45.

Next, in Step P64, the current position of the second end of the left lead-in roller 9A is calculated based on the output of the A/D converter 68 for the second left lead-in roller potentiometer 28*b*, and is stored in the memory 49. Thereafter, the position of the left lead-in roller 9A corresponding to the paper thickness is read out of the memory 37 in Step P65. Next, a judgment is made in Step P66 as to whether or not the current position of the second end of the left lead-in roller 9A is equal to the position of the left lead-in roller 9A corresponding to the paper thickness. If yes, a stop instruction is outputted to the motor driver 67 for the second left lead-in roller clearance adjustment motor in Step P67. If no, the operation proceeds to Step P69 to be described later.

Next, a determination is made in Step P68 that the movement of the second end of the left lead-in roller 9A to the position corresponding to the paper thickness is completed, and 2 is written in the memory 40 for completion of the movement of the second end of the left lead-in roller. Then, in Step P69, the output of the A/D converter 70 for the first right lead-in roller potentiometer 29*a* is inputted and stored in the memory 46. Next, in Step P70, the current position of the first end of the right lead-in roller 9B is calculated based on the output of the A/D converter 70 for the first right lead-in roller potentiometer 29*a*, and is stored in the memory 50.

Next, the position of the right lead-in roller 9B corresponding to the paper thickness is read out of the memory 38 in Step P71. Then, a judgment is made in Step P72 as to whether or not the current position of the first end of the right lead-in roller 9B is equal to the position of the right lead-in roller 9B corresponding to the paper thickness. If yes, a stop instruction is outputted to the motor driver 69 for the first right lead-in roller 9B clearance adjustment motor in Step P73. If no, the operation proceeds to Step P75 to be described later.

Next, a determination is made in Step P74 that the movement of the first end of the right lead-in roller 9B to the position corresponding to the paper thickness is completed, and 2 is written in the memory 41 for completion of the movement of the first end of the right lead-in roller. Thereafter, in Step P75, the output of the A/D converter 72 for the second right lead-in roller potentiometer 29*b* is inputted and stored in the memory 47. Next, in Step P76, the current position of the second end of the right lead-in roller 9B is calculated based on the output of the A/D converter 72 for the second right lead-in roller potentiometer 29*b*, and is stored in the memory 51. Then, the position of the right lead-in roller 9B corresponding to the paper thickness is read out of the memory 38 in Step P77.

Next, a judgment is made in Step P78 as to whether or not the current position of the second end of the right lead-in roller 9B is equal to the position of the right lead-in roller 9B corresponding to the paper thickness. If yes, a stop instruction is outputted to the motor driver 71 for the second right lead-in roller clearance adjustment motor in Step P79. If no, the operation proceeds to Step P81 to be described later.

Next, a determination is made in Step P80 that the movement of the second end of the right lead-in roller 9B to the position corresponding to the paper thickness is completed, and 2 is written in the memory 42 for completion of the movement of the second end of the right lead-in roller. Thereafter, a judgment is made in Step P81 as to whether or not an output of the detector 18 for detecting completion of paper threading of the automated paper threading tow portion is turned on. If yes, a determination is made in Step P82 that the automated paper threading tow portion has arrived at the position of the detector 18 for detecting completion of paper threading of the automated paper threading tow portion, and 2 is written in the memory 43 for completion of the movement of the automated paper threading device. If no, the operation proceeds to Step P84 to be described later. Next, a reset signal is outputted to the second current position detection counter 81 for the automated paper threading device in Step P83. Thereafter, the value in the memory 43 for completion of the movement of the automated paper threading device is read out in Step P84. Next, a judgment is made in Step P85 as to whether or not the value in the memory for completion of the movement of the automated paper threading device is equal to 2. If yes, a counted value by the second current position detection counter 81 for the automated paper threading device is read out, and stored in the memory 79 in Step P86. If no, a determination is made that the automated paper threading tow portion has not arrived at the position of the detector 18 for detecting completion of paper threading of the automated paper threading tow portion, and the operation returns to Step P57.

Next, the counted value by the counter at the time of arrival of the automated paper threading tow portion upstream of the lead-in roller unit is read out of the memory 77 in Step P87. Thereafter, a judgment is made in Step P88 as to whether or not the counted value by the second current position detection counter 81 for the automated paper threading device is equal to or greater than the counted value by the counter at the time of completion of paper threading of the automated paper threading tow portion. If yes, a determination is made that the automated paper threading is completed, and stop instructions are outputted to all the motor drivers 73-1 to 73-M and 73-N for the automated paper threading tow portion drive motors in Step P89. If no, a determination is made that the automated paper threading has not been completed, and the operation returns to Step P57.

Next, after reading all the values in the memories 39 to 42 for completion of the movements of the first ends and the second ends of the left and right lead-in rollers 9A and 9B in Step P90, a judgment is made in Step P91 as to whether or not all the values in the memories 39 to 42 for completion of the movements of the first ends and the second ends of the left and right lead-in rollers 9A and 9B are equal to 2. If yes, a determination is made that the movements of both of the left and right lead-in rollers to the positions corresponding to the paper thickness have been completed, and a completion signal is outputted to the printing press control device 75 to set a web rotary printing press as a normal printable state in Step 92. If no, a determination is made that the movements of both of the left and right lead-in rollers to the positions corresponding to the paper thickness have not been completed, and the operation returns to Step P57.

As described above, in this embodiment, as in the case of the first embodiment, the motors 26*a*, 26*b*, 27*a* and 27*b* for adjusting the amount of clearance between the left and right lead-in rollers 9A and 9B as well as the automated paper threading tow portion drive motors 14-1 to 14-M and 14-N are driven at the same time. Moreover, the automated paper threading tow portion drive motors 14-1 to 14-M and 14-N are temporarily stopped if the automated paper threading tow portion reaches the lead-in roller unit before the left and right lead-in rollers 9A and 9B are moved to the stand-by positions. Then, the automated paper threading tow portion drive motors 14-1 to 14-M and 14-N are restarted when the left and right lead-in rollers 9A and 9B are moved to the stand-by positions. Moreover, in this embodiment, the detector 16 for detecting arrival of the automated paper threading tow portion upstream of the lead-in roller unit and the detector 18 for detecting completion of paper threading of the automated paper threading tow portion are disposed upstream of the actual positions, in order to actually stop the automated paper threading tow portion drive motors 14-1 to 14-M and 14-N when the counted values after detection by these detectors 16 and 18 reached predetermined counted values.

In this embodiment, only the detector 16 for detecting arrival of the automated paper threading tow portion upstream of the lead-in roller unit and the detector 18 for detecting completion of paper threading of the automated paper threading tow portion are disposed upstream of the actual positions, in order to actually stop the automated paper threading tow portion drive motors 14-1 to 14-M and 14-N when the counted values after detection by these detectors 16 and 18 reached predetermined counted values. However, needless to say, it also serves the purpose that the detector 17 for detecting completion of paper threading of the automated paper threading tow portion into the lead-in roller unit is disposed upstream of the actual position, in order to actually output reverse rotation instructions to the motor drivers 65, 67, 69 and 71 for the left and right lead-in roller clearance adjustment motors 26*a*, 26*b*, 27*a* and 27*b* when the counted value after detection by the detector 17 reached a predetermined counted value.

In this way, as in the case of the first embodiment, it is possible to set the amount of clearance between the left and right lead-in rollers 9A and 9B automatically at the predetermined large value when starting the automated web threading device, and to set the amount of clearance between the left and right lead-in rollers 9A and 9B automatically at the optimal value corresponding to the inputted paper thickness of the web W in response to completion of paper threading into the lead-in roller unit. This makes it possible to achieve reduction in a burden on an operator and reduction in wasted paper, and also to achieve reduction in clearance adjustment time. Moreover, in the case of the present invention, the detectors can be disposed more freely.

Moreover, in a case where the movements of the left and right lead-in rollers to the stand-by positions are not completed, when the detector 16 for detecting arrival of the automated paper threading tow portion upstream of the lead-in roller unit detects the tow portion of the automated paper threading device, the drives of the automated paper threading tow portion drive motors 14-1 to 14-N are stopped, and a clash of the tow portion of the automated paper threading device with the lead-in rollers is automatically prevented. Accordingly, it is possible to prevent damage on the tow portion of the automated paper threading device or on the lead-in rollers.

Third Embodiment

Figure 14A:
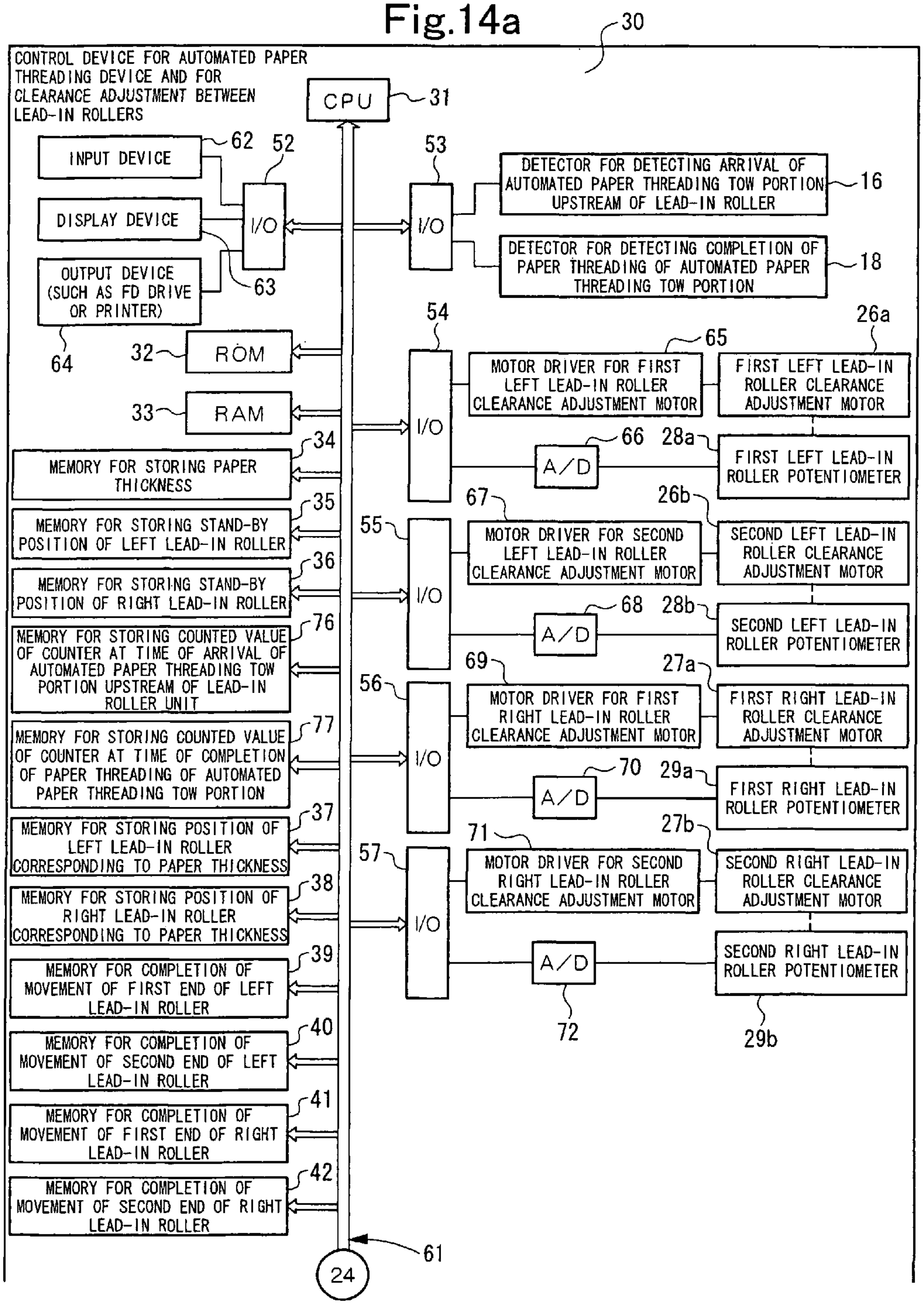
FIG. 14*a* is a block diagram of a control device for an automated paper threading device and for a lead-in roller clearance adjustment mechanism representing a third embodiment of the present invention.
Figure 14B:
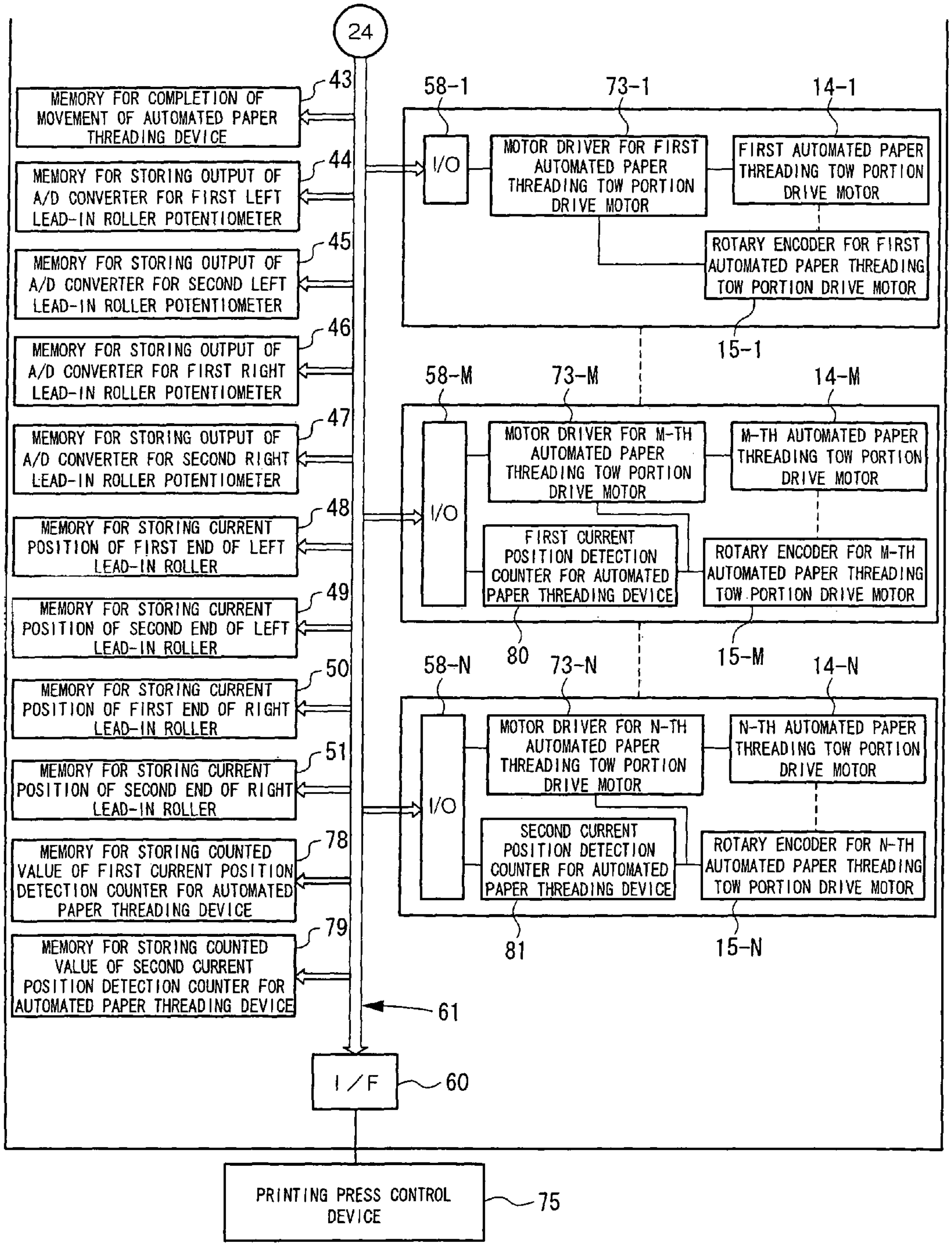
FIG. 14*b* is another block diagram of the control device for the automated paper threading device and for the lead-in roller clearance adjustment mechanism representing the third embodiment of the present invention.
Figure 15:
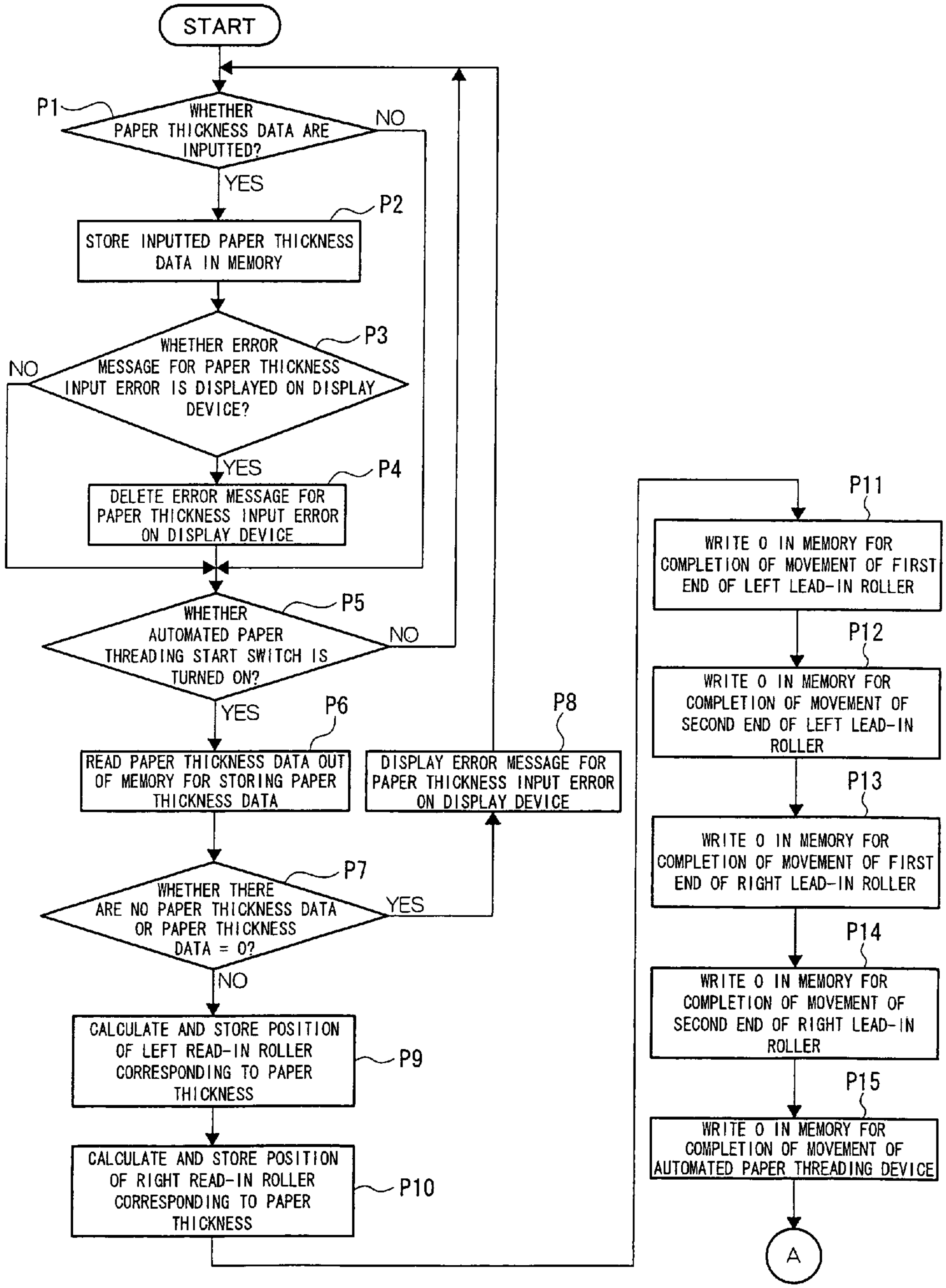
FIG. 15 is an operation flowchart of the control device for the automated paper threading device and for the lead-in roller clearance adjustment mechanism.
Figure 16A:
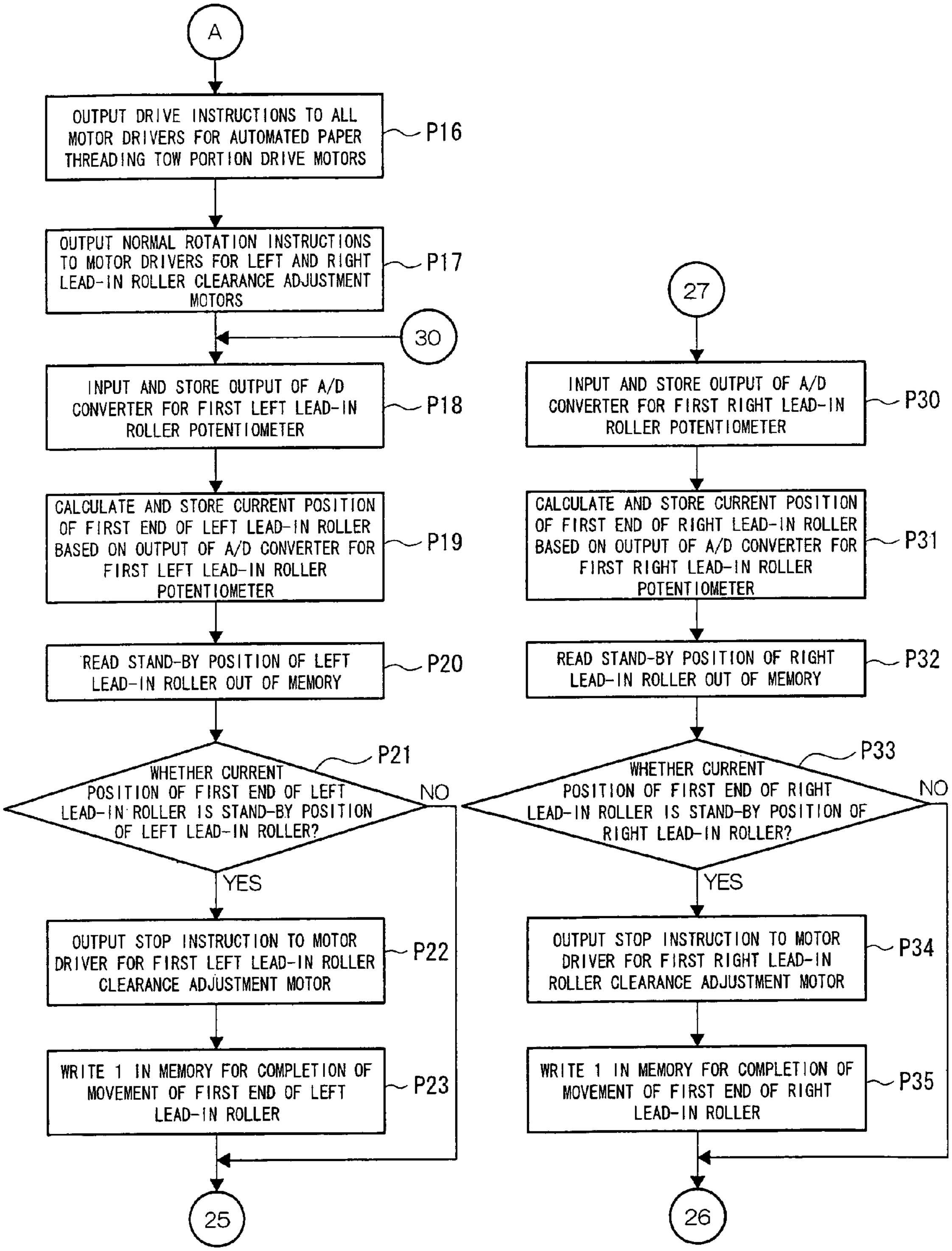
FIG. 16*a* is another operation flowchart of the control device for the automated paper threading device and for the lead-in roller clearance adjustment mechanism.
Figure 16B:
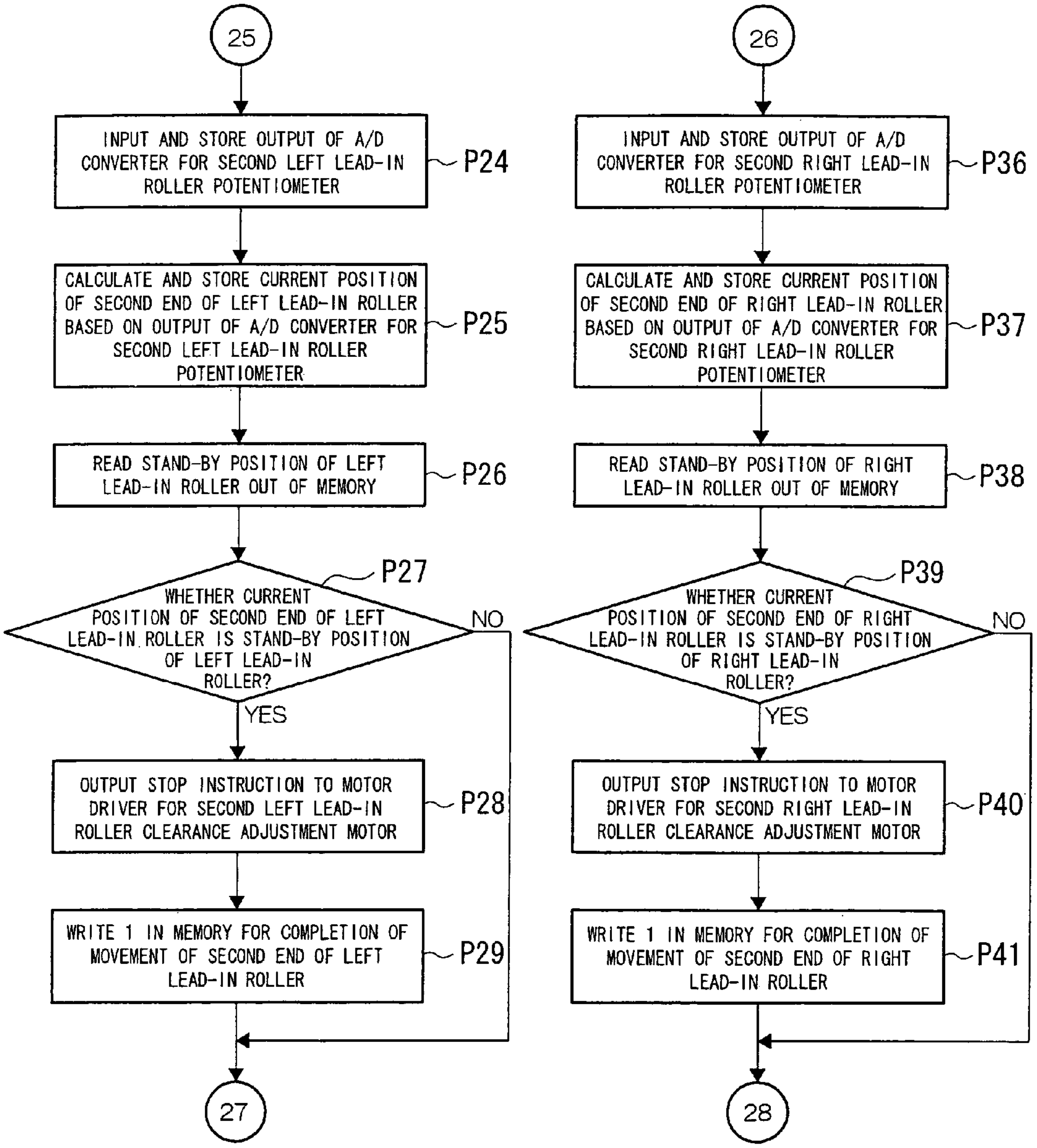
FIG. 16*b* is still another operation flowchart of the control device for the automated paper threading device and for the lead-in roller clearance adjustment mechanism.
Figure 16C:
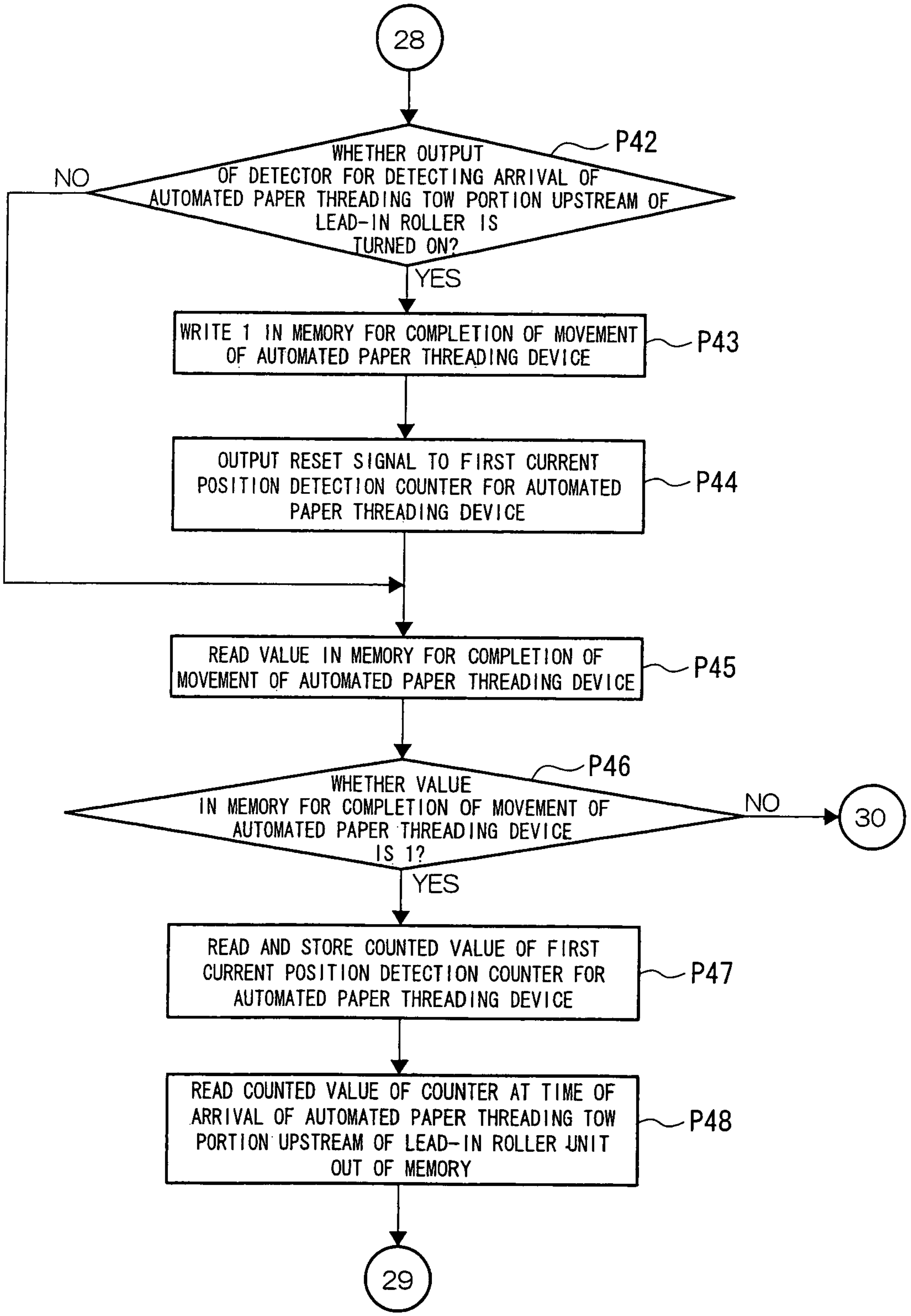
FIG. 16*c* is still another operation flowchart of the control device for the automated paper threading device and for the lead-in roller clearance adjustment mechanism.
Figure 16D:
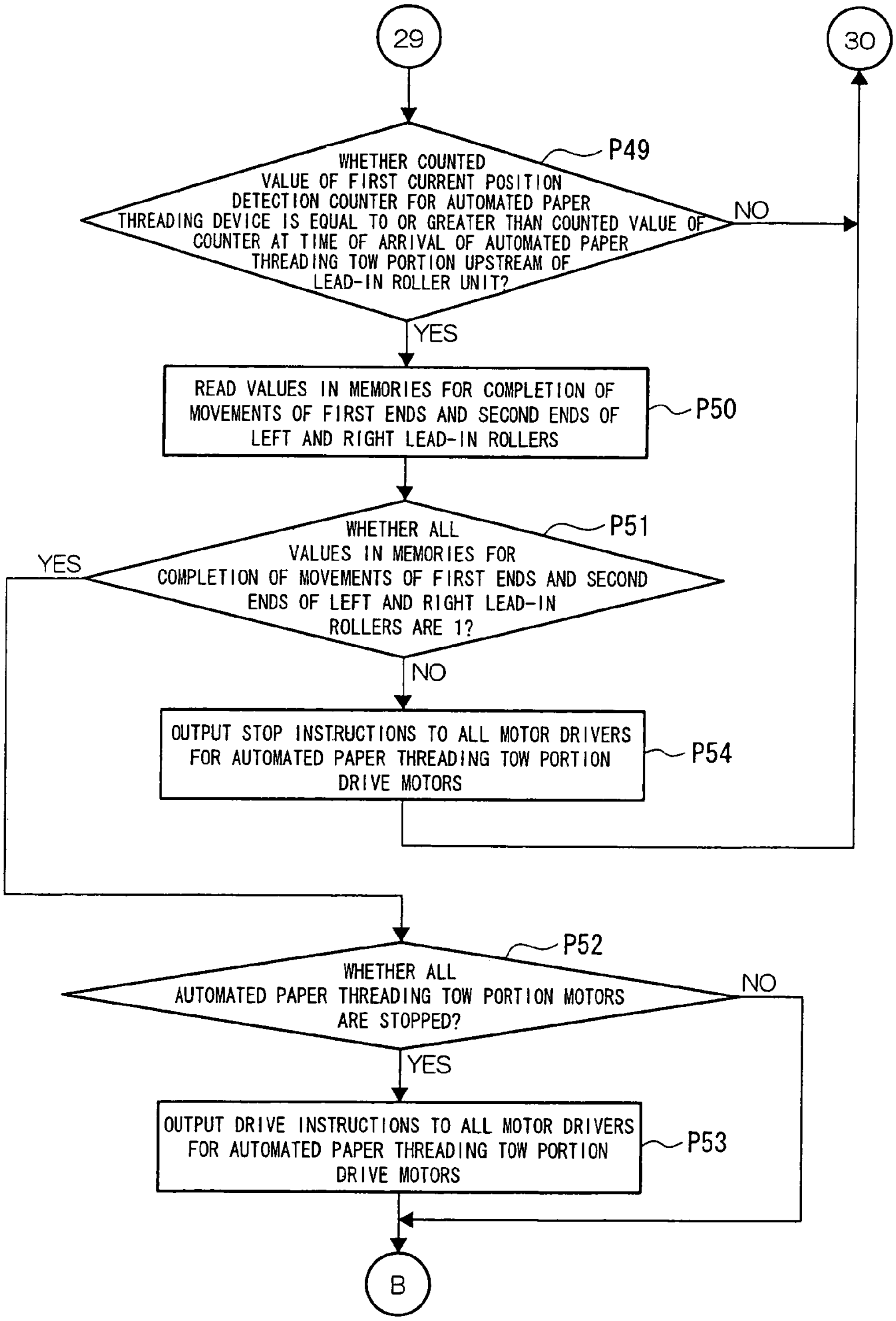
FIG. 16*d* is still another operation flowchart of the control device for the automated paper threading device and for the lead-in roller clearance adjustment mechanism.
Figure 17A:
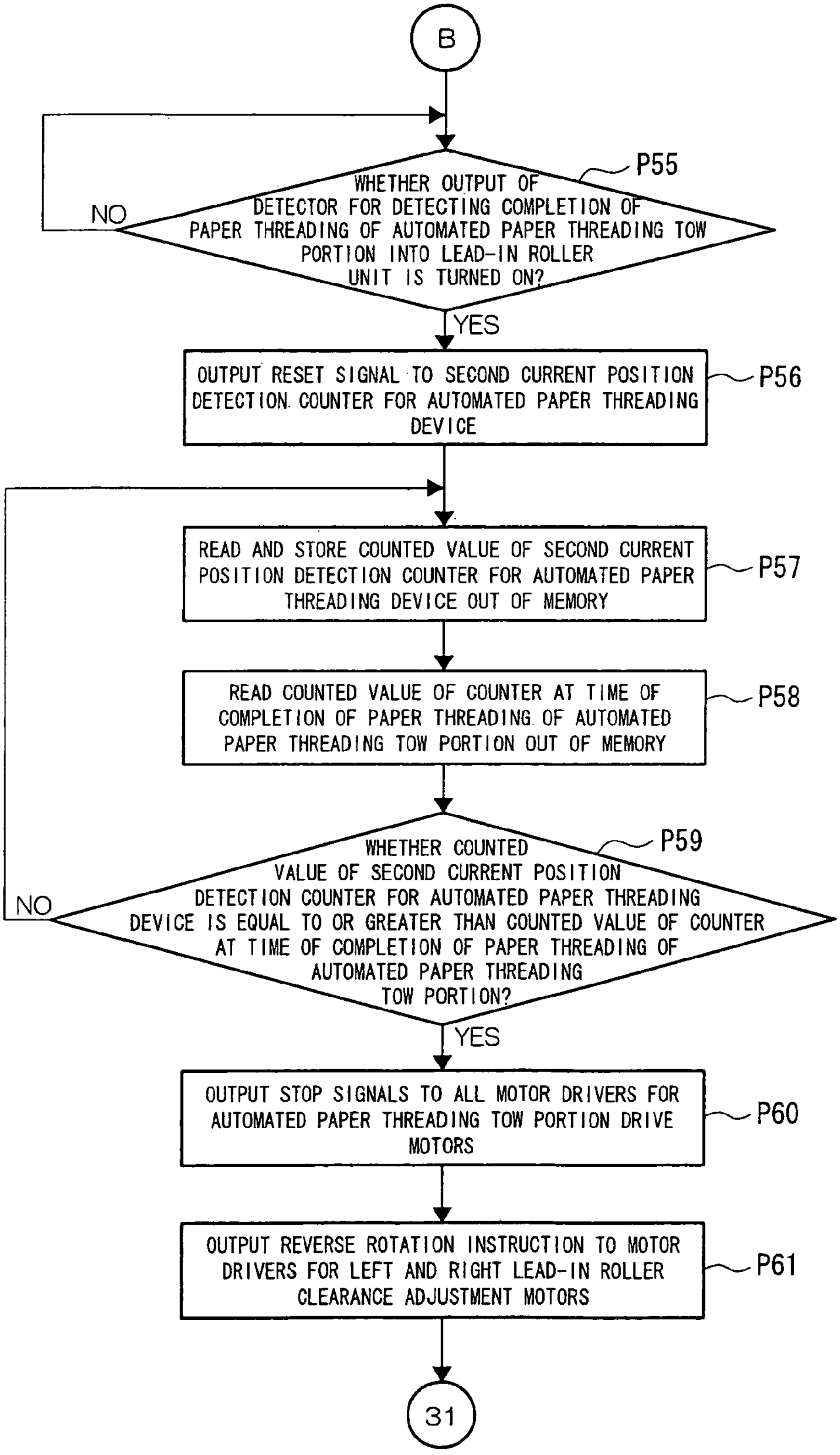
FIG. 17*a* is still another operation flowchart of the control device for the automated paper threading device and for the lead-in roller clearance adjustment mechanism.
Figure 17B:
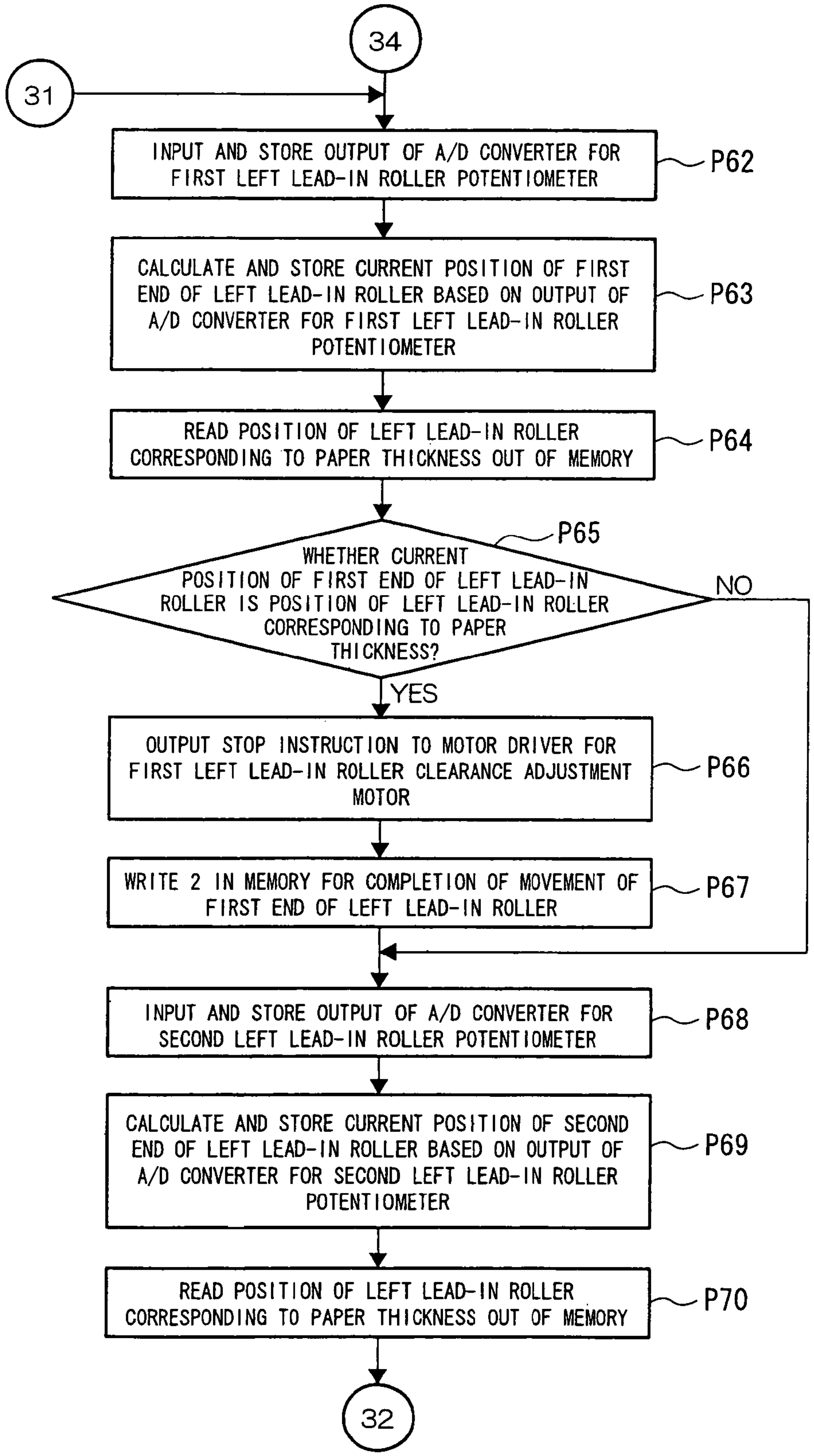
FIG. 17*b* is still another operation flowchart of the control device for the automated paper threading device and for the lead-in roller clearance adjustment mechanism.
Figure 17C:
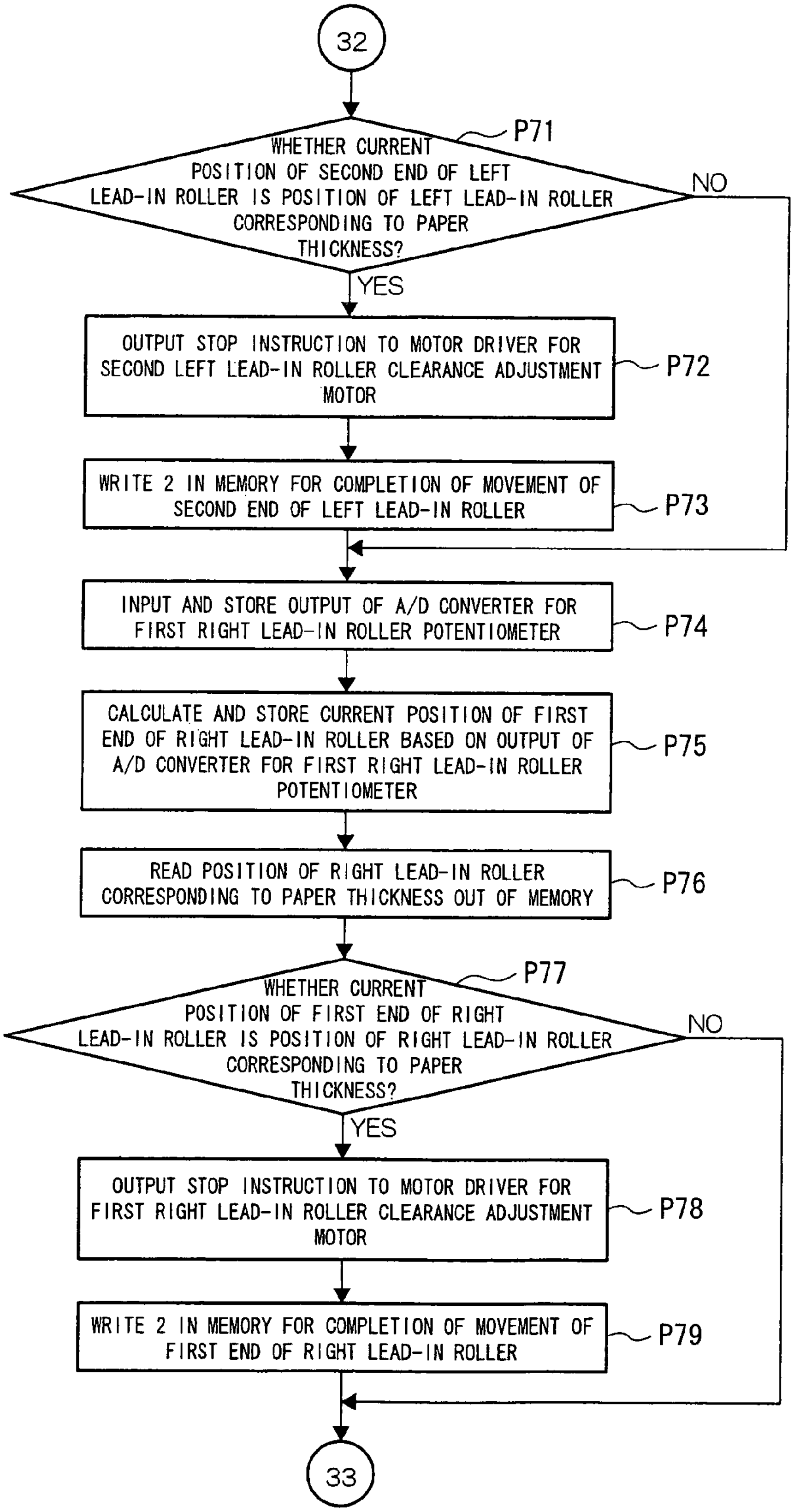
FIG. 17*c* is still another operation flowchart of the control device for the automated paper threading device and for the lead-in roller clearance adjustment mechanism.
Figure 17D:
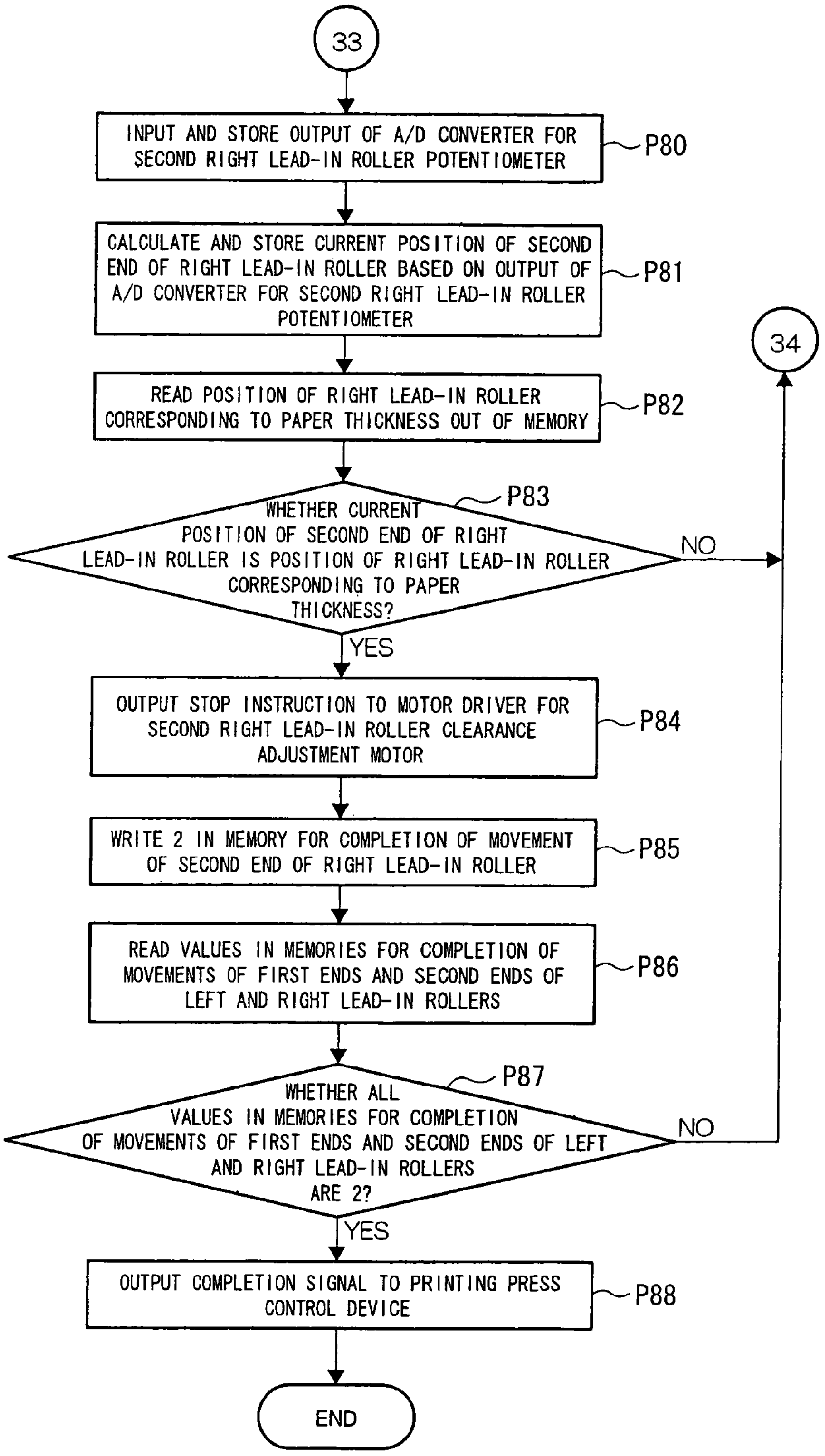
FIG. 17*d* is still another operation flowchart of the control device for the automated paper threading device and for the lead-in roller clearance adjustment mechanism.

As shown in FIG. 14*a* and FIG. 14*b*, in addition to a CPU 31, a ROM 32 and a RAM 33, a control device 30 for an automated paper threading device and for the clearance adjustment between the lead-in rollers of this embodiment include a memory 34 for storing paper thickness data, a memory 35 for storing a stand-by position of a left lead-in roller, a memory 36 for storing a stand-by position of a right lead-in roller, a memory 37 for storing a position of the left lead-in roller corresponding to a paper thickness, a memory 38 for storing a position of the right lead-in roller corresponding to the paper thickness, a memory 39 for completion of a movement of a first end of the left lead-in roller, a memory 40 for completion of a movement of a second end of the left lead-in roller, a memory 41 for completion of a movement of a first end of the right lead-in roller, a memory 42 for completion of a movement of a second end of the right lead-in roller, a memory 43 for completion of a movement of the automated paper threading device, a memory 44 for storing an output of an A/D converter for a first left lead-in roller potentiometer, a memory 45 for storing an output of an A/D converter for a second left lead-in roller potentiometer, a memory 46 for storing an output of an A/D converter for a first right lead-in roller potentiometer, a memory 47 for storing an output of an A/D converter for a second right lead-in roller potentiometer, a memory 48 for storing a current position of the first end of the left lead-in roller, a memory 49 for storing a current position of the second end of the left lead-in roller, a memory 50 for storing a current position of the first end of the right lead-in roller, a memory 51 for storing a current position of the second end of the right lead-in roller, a memory 76 for storing a counted value of a counter at the time of arrival of the automated paper threading tow portion upstream of a lead-in roller unit, a memory 77 for storing a counted value of the counter at the time of completion of paper threading by the automated paper threading tow portion, a memory 78 for storing a counted value of a first current position detection counter for the automated paper threading device, and a memory 79 for storing a counted value by a second current position detection counter for the automated paper threading device, which are connected to one another by use of a bus (BUS) 61 together with each of input-output devices 52 to 57 and 58-1 to 58-M and 58-N, and an interface 60.

Input devices 62, such as a keyboard, various switches and buttons, display devices 63 such as a CRT and lamps, and output devices 64 such as a printer and an FD drive are connected to the input-output device 52. A detector 16 for detecting arrival of an automated paper threading tow portion upstream of a lead-in roller unit and a detector 18 for detecting completion of paper threading of the automated paper threading tow portion are connected to the input-output device 53. A first left lead-in roller clearance adjustment motor 26*a* is connected to the input-output device 54 via a motor driver 65 for the first left lead-in roller clearance adjustment motor, and a first left lead-in roller potentiometer 28*a* is connected to the input-output device 54 via an A/D converter 66. A second left lead-in roller clearance adjustment motor 26*b* is connected to the input-output device 55 via a motor driver 67 for the second left lead-in roller clearance adjustment motor, and a second left lead-in roller potentiometer 28*b* is connected to the input-output device 55 via an A/D converter 68. A first right lead-in roller clearance adjustment motor 27*a* is connected to the input-output device 56 via a motor driver 69 for the first right lead-in roller clearance adjustment motor, and a first right lead-in roller potentiometer 29*a* is connected to the input-output device 56 via an A/D converter 70. A second right lead-in roller clearance adjustment motor 27*b* is connected to the input-output device 57 via a motor driver 71 for the second right lead-in roller clearance adjustment motor, and a second right lead-in roller potentiometer 29*b* is connected to the input-output device 57 via an A/D converter 72.

Furthermore, a first automated paper threading tow portion drive motor 14-1 and a rotary encoder 15-1 for the first automated paper threading tow portion drive motor are connected to the input-output device 58-1 via a motor driver 73-1 for the first automated paper threading tow portion drive motor. An M-th automated paper threading tow portion drive motor 14-M and a rotary encoder 15-M for the M-th automated paper threading tow portion drive motor are connected to the input-output device 58-M via a motor driver 73-M for the M-th automated paper threading tow portion drive motor. Moreover, a first current position detection counter 80 for the automated paper threading device is connected to the input-output device 58-M, and this counter 80 is connected to the rotary encoder 15-M for the M-th automated paper threading tow portion drive motor. An N-th automated paper threading tow portion drive motor 14-N and a rotary encoder 15-N for the N-th automated paper threading tow portion drive motor are connected to the input-output device 58-N via a motor driver 73-N for the N-th automated paper threading tow portion drive motor. Moreover, a second current position detection counter 81 for the automated paper threading device is connected to the input-output device 58-N, and this counter 80 is connected to the rotary encoder 15-N for the N-th automated paper threading tow portion drive motor. In addition, a printing press control device 75 is connected to the interface 60.

Being configured in this way, the control device 30 for the automated paper threading device and for the clearance adjustment between the lead-in rollers are operated in accordance with operation flows shown in FIG. 15, FIG. 16A to FIG. 16D, and FIG. 17A to FIG. 17D.

Specifically, a judgment is made in Step P1 as to whether or not paper thickness data for a web W are inputted. If yes, the inputted paper thickness data are stored in the memory 34 in Step P2. If no, the operation proceeds to Step P5 to be described later. Next, if an error message for a paper thickness input error is displayed on the display device 63 in Step P3, the error message for the paper thickness input error on the display device 63 is deleted in Step P4, and the operation proceeds to Step P5.

Next, a judgment is made in Step P5 as to whether or not an automated paper threading start switch is turned on. If yes, the paper thickness data are read out of the memory 34 for storing paper thickness data in Step P6. If no, the operation returns to Step P1. Next, a judgment is made in Step P7 whether or not there are no paper thickness data or the paper thickness data=0. If yes, an error message for a paper thickness input error is displayed on the display device 63 in Step P8, and the operation returns to Step P1. If no, a position of the left lead-in roller 9A corresponding to the paper thickness is calculated based on the paper thickness data, and is stored in the memory 37 in Step P9.

Accordingly, in a case where the automated paper threading start switch is turned on without inputting the paper thickness data, the error message is displayed and informed to an operator, and the automated paper threading device is not driven. Therefore, the tow portion of the automated paper threading device is prevented from erroneously clashing with the lead-in roller 9 and being damaged. At the same time, it is explicitly instructed to the user that the paper thickness data input is required.

Next, a position of the right lead-in roller 9B corresponding to the paper thickness is calculated based on the paper thickness data, and is stored in the memory 38 in Step P10. Then, 0 is written in the memory 39 for completion of a movement of a first end of the left lead-in roller 9A in Step P11, and 0 is written in the memory 40 for completion of a movement of a second end of the left lead-in roller 9A in Step P12. Next, 0 is written in the memory 41 for completion of a movement of a first end of the right lead-in roller 9B in Step P13, and 0 is written in the memory 42 for completion of a movement of a second end of the right lead-in roller 9B in Step P14. Thereafter, 0 is written in the memory 43 for completion of a movement of the automated paper threading device in Step P15.

Next, drive instructions are outputted to all the motor drivers 73-1 to 73-N for the automated paper threading tow portion drive motors in Step P16. Thereafter, normal rotation instructions are outputted to the motor drivers 65, 67, 69 and 71 for the left and right lead-in roller clearance adjustment motors in Step P17. Next, in Step P18, an output of the A/D converter 66 for the first left lead-in roller potentiometer 28*a* is inputted and stored in the memory 44. Then, in Step P19, the current position of the first end of the left lead-in roller 9A is calculated based on the output of the A/D converter 66 for the first left lead-in roller potentiometer 28*a*, and is stored in the memory 48.

Next, the stand-by position of the left lead-in roller 9A is read out of the memory 35 in Step P20. Then, a judgment is made in Step P21 as to whether or not the current position of the first end of the left lead-in roller 9A is equal to the stand-by position of the left lead-in roller 9A. If yes, a stop instruction is outputted to the motor driver 65 for the first left lead-in roller clearance adjustment motor in Step P22. If no, the operation proceeds to Step P24 to be described later. Thereafter, a determination is made in Step P23 that the movement of the first end of the left lead-in roller 9A to the stand-by position is completed, and 1 is written in the memory 39 for completion of the movement of the first end of the left lead-in roller.

Next, in Step P24, an output of the A/D converter 68 for the second left lead-in roller potentiometer 28*b* is inputted and stored in the memory 45. Then, in Step P25, the current position of the second end of the left lead-in roller 9A is calculated based on the output of the A/D converter 68 for the second left lead-in roller potentiometer 28*b*, and is stored in the memory 49.

Next, the stand-by position of the left lead-in roller 9A is read out of the memory 35 in Step P26. Then, a judgment is made in Step P27 as to whether or not the current position of the second end of the left lead-in roller 9A is equal to the stand-by position of the left lead-in roller 9A. If yes, a stop instruction is outputted to the motor driver 67 for the second left lead-in roller clearance adjustment motor in Step P28. If no, the operation proceeds to Step P30 to be described later. Thereafter, a determination is made in Step P29 that the movement of the second end of the left lead-in roller 9A to the stand-by position is completed, and 1 is written in the memory 40 for completion of the movement of the second end of the left lead-in roller.

Next, in Step P30, an output of the A/D converter 70 for the first right lead-in roller potentiometer 29*a* is inputted and stored in the memory 46. Then, in Step P31, the current position of the first end of the right lead-in roller 9B is calculated based on the output of the A/D converter 70 for the first right lead-in roller potentiometer 29*a*, and is stored in the memory 50. Thereafter, the stand-by position of the right lead-in roller 9B is read out of the memory 36 in Step P32.

Next, a judgment is made in Step P33 as to whether or not the current position of the first end of the right lead-in roller 9B is equal to the stand-by position of the right lead-in roller 9B. If yes, a stop instruction is outputted to the motor driver 69 for the first right lead-in roller clearance adjustment motor in Step P34. If no, the operation proceeds to Step P36 to be described later. Thereafter, a determination is made in Step P35 that the movement of the first end of the right lead-in roller 9B to the stand-by position is completed, and 1 is written in the memory 41 for completion of the movement of the first end of the right lead-in roller.

Next, in Step P36, an output of the A/D converter 72 for the second right lead-in roller potentiometer 29*b* is inputted and stored in the memory 47. Then, in Step P37, the current position of the second end of the right lead-in roller 9B is calculated based on the output of the A/D converter 72 for the second right lead-in roller potentiometer 29*b*, and is stored in the memory 51.

Next, the stand-by position of the right lead-in roller 9B is read out of the memory 36 in Step P38. Then, a judgment is made in Step P39 as to whether or not the current position of the second end of the right lead-in roller 9B is equal to the stand-by position of the right lead-in roller 9B. If yes, a stop instruction is outputted to the motor driver 71 for the second right lead-in roller clearance adjustment motor in Step P40. If no, the operation proceeds to Step P42 to be described later. Thereafter, a determination is made in Step P41 that the movement of the second end of the right lead-in roller 9B to the stand-by position is completed, and 1 is written in the memory 42 for completion of the second end of the right lead-in roller.

Next, a judgment is made in Step P42 as to whether or not an output of the detector 16 for detecting arrival of the automated paper threading tow portion upstream of the lead-in roller unit is turned on. If yes, a determination is made in Step P43 that the automated paper threading tow portion has arrived at the position of the detector 16 for detecting arrival of the automated paper threading tow portion upstream of the lead-in roller unit of the automated paper threading tow portion, and 1 is written in the memory 43 for completion of the movement of the automated paper threading device. If no, the operation proceeds to Step P45 to be described later. Next, a reset signal is outputted to the first current position detection counter 80 for the automated paper threading device in Step P44, and then a value in the memory 43 for completion of the movement of the automated paper threading device is read out in Step P45. Next, a judgment is made in Step P46 as to whether or not the value in the memory for completion of the movement of the automated paper threading device is equal to 1. If yes, a counted value by the first current position detection counter 80 for the automated paper threading device is read out and stored in the memory 78 in Step P47. If no, a determination is made that the automated paper threading tow portion has not arrived at the position of the detector 16 for detecting arrival of the automated paper threading tow portion upstream of the lead-in roller unit, and the operation returns to Step P18.

Next, the counted value by the counter at the time of arrival of the automated paper threading tow portion upstream of the lead-in roller unit is read out of the memory 76 in Step P48. Thereafter, a judgment is made in Step P49 as to whether or not the counted value by the first current position detection counter 80 for the automated paper threading device is equal to or greater than the counted value by the counter at the time of arrival of the automated paper threading tow portion upstream of the lead-in roller unit. If yes, a determination is made that the automated paper threading tow portion has arrived upstream of the lead-in roller unit, and the values in the memories 39 to 42 for completion of the movements of the first ends and the second ends of the left and right lead-in rollers 9A and 9B are read out in Step P50. If no, a determination is made that the automated paper threading tow portion has not arrived upstream of the lead-in roller unit, and the operation returns to Step P18.

Next, a judgment is made in Step P51 as to whether or not all the values in the memories 39 to 42 for completion of the movements of the first ends and the second ends of the left and right lead-in rollers 9A and 9B are equal to 1. If yes, a determination is made that the movements of both of the left and right lead-in rollers 9A and 9B to the stand-by positions have been completed, and the operation proceeds to Step P52. If no, a determination is made that the movements of both of the left and right lead-in rollers 9A and 9B to the stand-by positions have not been completed, and stop instructions are outputted to all the motor drivers 73-1 to 73-M and 73N for the automated paper threading tow portion drive motors in Step P54. Then, the operation returns to Step P18.

Next, if all the automated paper threading tow portion drive motors 14-1 to 14-M and 14-N are stopped in Step P52, drive instructions are outputted to all the motor drivers 73-1 to 73-M and 73-N for the automated paper threading tow portion drive motors in Step P53. Then, the operation proceeds to Step P55. Next, if an output of the detector 18 for detecting completion of paper threading of the automated paper threading tow portion is turned on in Step P55, a determination is made in Step P56 that the automated paper threading tow portion has arrived at the position of the detector 18 for detecting completion of paper threading of the automated paper threading tow portion, and a reset signal is outputted to the second current position detection counter 81 for the automated paper threading device. Then, a counted value by the second current position detection counter 81 for the automated paper threading device is read out and stored in the memory 79 in Step P57.

Next, the counted value by the counter at the time of completion of paper threading of the automated paper threading tow portion is read out of the memory 77 in Step P58. Thereafter, a judgment is made in Step P59 as to whether or not the counted value by the second current position detection counter 81 for the automated paper threading device is equal to or greater than the counted value by the counter at the time of completion of paper threading of the automated paper threading tow portion. If yes, a determination is made that the automated paper threading is completed, and stop instructions are outputted to all the motor drivers 73-1 to 73-M and 73-N for the automated paper threading tow portion drive motors in Step P60. If no, a determination is made that the automated paper threading has not been completed, and the operation returns to Step P57. Thereafter, reverse rotation instructions are outputted to the motor drivers 65, 67, 69 and 71 for the left and right lead-in roller clearance adjustment motors 26*a*, 26*b*, 27*a* and 27*b* in Step P61.

Next, in Step P62, the output of the A/D converter 66 for the first left lead-in roller potentiometer 28*a* is inputted and stored in the memory 44. Then, in Step P63, the current position of the first end of the left lead-in roller 9A is calculated based on the output of the A/D converter 66 for the first left lead-in roller potentiometer 28*a*, and is stored in the memory 48. Thereafter, the position of the left lead-in roller 9A corresponding to the paper thickness is read out of the memory 37 in Step P64.

Next, a judgment is made in Step P65 as to whether or not the current position of the first end of the left lead-in roller 9A is equal to the position of the left lead-in roller 9A corresponding to the paper thickness. If yes, a stop instruction is outputted to the motor driver 65 for the first left lead-in roller clearance adjustment motor in Step P66. If no, the operation proceeds to Step P68 to be described later. Next, a determination is made in Step P67 that the movement of the first end of the left lead-in roller 9A to the position corresponding to the paper thickness is completed, and 2 is written in the memory 39 for completion of the movement of the first end of the left lead-in roller. Then, in Step P68, the output of the A/D converter 68 for the second left lead-in roller potentiometer 28*b* is inputted and stored in the memory 45.

Next, in Step P69, the current position of the second end of the left lead-in roller 9A is calculated based on the output of the A/D converter 68 for the second left lead-in roller potentiometer 28*b*, and is stored in the memory 49. Thereafter, the position of the left lead-in roller 9A corresponding to the paper thickness is read out of the memory 37 in Step P70. Next, a judgment is made in Step P71 as to whether or not the current position of the second end of the left lead-in roller 9A is equal to the position of the left lead-in roller 9A corresponding to the paper thickness. If yes, a stop instruction is outputted to the motor driver 67 for the second left lead-in roller clearance adjustment motor in Step P72. If no, the operation proceeds to Step P74 to be described later.

Next, a determination is made in Step P73 that the movement of the second end of the left lead-in roller 9A to the position corresponding to the paper thickness is completed, and 2 is written in the memory 40 for completion of the movement of the second end of the left lead-in roller. Then, in Step P74, the output of the A/D converter 70 for the first right lead-in roller potentiometer 29*a* is inputted and stored in the memory 46. Next, in Step P75, the current position of the first end of the right lead-in roller 9B is calculated based on the output of the A/D converter 70 for the first right lead-in roller potentiometer 29*a*, and is stored in the memory 50.

Next, the position of the right lead-in roller 9B corresponding to the paper thickness is read out of the memory 38 in Step P76. Then, a judgment is made in Step P77 as to whether or not the current position of the first end of the right lead-in roller 9B is equal to the position of the right lead-in roller 9B corresponding to the paper thickness. If yes, a stop instruction is outputted to the motor driver 69 for the first right lead-in roller 9B clearance adjustment motor in Step P78. If no, the operation proceeds to Step P80 to be described later.

Next, a determination is made in Step P79 that the movement of the first end of the right lead-in roller 9B to the position corresponding to the paper thickness is completed, and 2 is written in the memory 41 for completion of the movement of the first end of the right lead-in roller. Thereafter, in Step P80, the output of the A/D converter 72 for the second right lead-in roller potentiometer 29*b* is inputted and stored in the memory 47. Next, in Step P81, the current position of the second end of the right lead-in roller 9B is calculated based on the output of the A/D converter 72 for the second right lead-in roller potentiometer 29*b*, and is stored in the memory 51. Then, the position of the right lead-in roller 9B corresponding to the paper thickness is read out of the memory 38 in Step P82.

Next, a judgment is made in Step P83 as to whether or not the current position of the second end of the right lead-in roller 9B is equal to the position of the right lead-in roller 9B corresponding to the paper thickness. If yes, a stop instruction is outputted to the motor driver 71 for the second right lead-in roller clearance adjustment motor in Step P84. If no, the operation returns to Step P62.

Next, a determination is made in Step P85 that the movement of the second end of the right lead-in roller 9B to the position corresponding to the paper thickness is completed, and 2 is written in the memory 42 for completion of the movement of the second end of the right lead-in roller. Then, all the values in the memories 39 to 42 for completion of the movements of the first ends and the second ends of the left and right lead-in rollers 9A and 9B are read out in Step P86. Thereafter, a judgment is made in Step P87 as to whether or not all the values in the memories 39 to 42 for completion of the movements of the first ends and the second ends of the left and right lead-in rollers 9A and 9B are equal to 2. If yes, a completion signal is outputted to the printing press control device 75 to set a web rotary printing press as a normal printable state in Step 88. If no, the operation returns to Step P62.

As described above, in this embodiment, the movements of the left and right lead-in rollers 9A and 9B to the stand-by positions and the movements of the automated paper threading tow portion to the position of completion of paper threading are carried out at the same time. Moreover, the motors 26*a*, 26*b*, 27*a* and 27*b* for the left and right lead-in rollers 9A and 9B and the automated paper threading tow portion drive motors 14-1 to 14-M and 14-N are stopped sequentially upon arrival at the respectively predetermined positions. Thereafter, the motors 26*a*, 26*b*, 27*a* and 27*b* for the left and right lead-in rollers 9A and 9B are driven to move the left and right lead-in rollers 9A and 9B to the positions corresponding to the paper thickness of the web W. It should be noted that the automated paper threading tow portion drive motors 14-1 to 14-N are temporarily stopped in a case where the automated paper threading tow portion reaches the lead-in roller unit before the left and right lead-in rollers 9A and 9B are moved to the stand-by positions. The automated paper threading tow portion drive motors 14-1 to 14-N are restarted when the left and right lead-in rollers 9A and 9B are moved to the stand-by positions. Moreover, in this embodiment, the detector 16 for detecting arrival of the automated paper threading tow portion upstream of the lead-in roller unit and the detector 18 for detecting completion of paper threading of the automated paper threading tow portion are disposed upstream of the actual positions, in order to actually stop the automated paper threading tow portion drive motors 14-1 to 14-M and 14-N when the counted values after detection by these detectors 16 and 18 reached predetermined counted values.

In this embodiment, only the detector 16 for detecting arrival of the automated paper threading tow portion upstream of the lead-in roller unit and the detector 18 for detecting completion of paper threading of the automated paper threading tow portion are disposed upstream of the actual positions, in order to actually stop the automated paper threading tow portion drive motors 14-1 to 14-M and 14-N when the counted values after detection by these detectors 16 and 18 reached predetermined counted values. However, needless to say, it also serves the purpose that the detector 17 for detecting completion of paper threading of the automated paper threading tow portion into the lead-in roller unit is disposed upstream of the actual position, in order to actually output reverse rotation instructions to the motor drivers 65, 67, 69 and 71 for the left and right lead-in roller clearance adjustment motors 26*a*, 26*b*, 27*a* and 27*b* when the counted value after detection by the detector 17 reached a predetermined counted value.

In this way, as in the case of the first embodiment, it is possible to set the amount of clearance between the left and right lead-in rollers 9A and 9B automatically at the predetermined large value when starting the automated web threading device, and to set the amount of clearance between the left and right lead-in rollers 9A and 9B automatically at the optimal value corresponding to the inputted paper thickness of the web W in response to completion of paper threading into the lead-in roller unit. This makes it possible to achieve reduction in a burden on an operator and reduction in wasted paper, and also to achieve reduction in clearance adjustment time. Moreover, in the case of the present invention, the detectors can be disposed more freely.

Moreover, in a case where the movements of the left and right lead-in rollers to the stand-by positions are not completed, when the detector 16 for detecting arrival of the automated paper threading tow portion upstream of the lead-in roller unit detects the tow portion of the automated paper threading device, the drives of the automated paper threading tow portion drive motors 14-1 to 14-N are stopped, and a clash of the tow portion of the automated paper threading device with the lead-in rollers is automatically prevented. Accordingly, it is possible to prevent damage on the tow portion of the automated paper threading device or on the lead-in rollers.

Fourth Embodiment

Figure 18A:
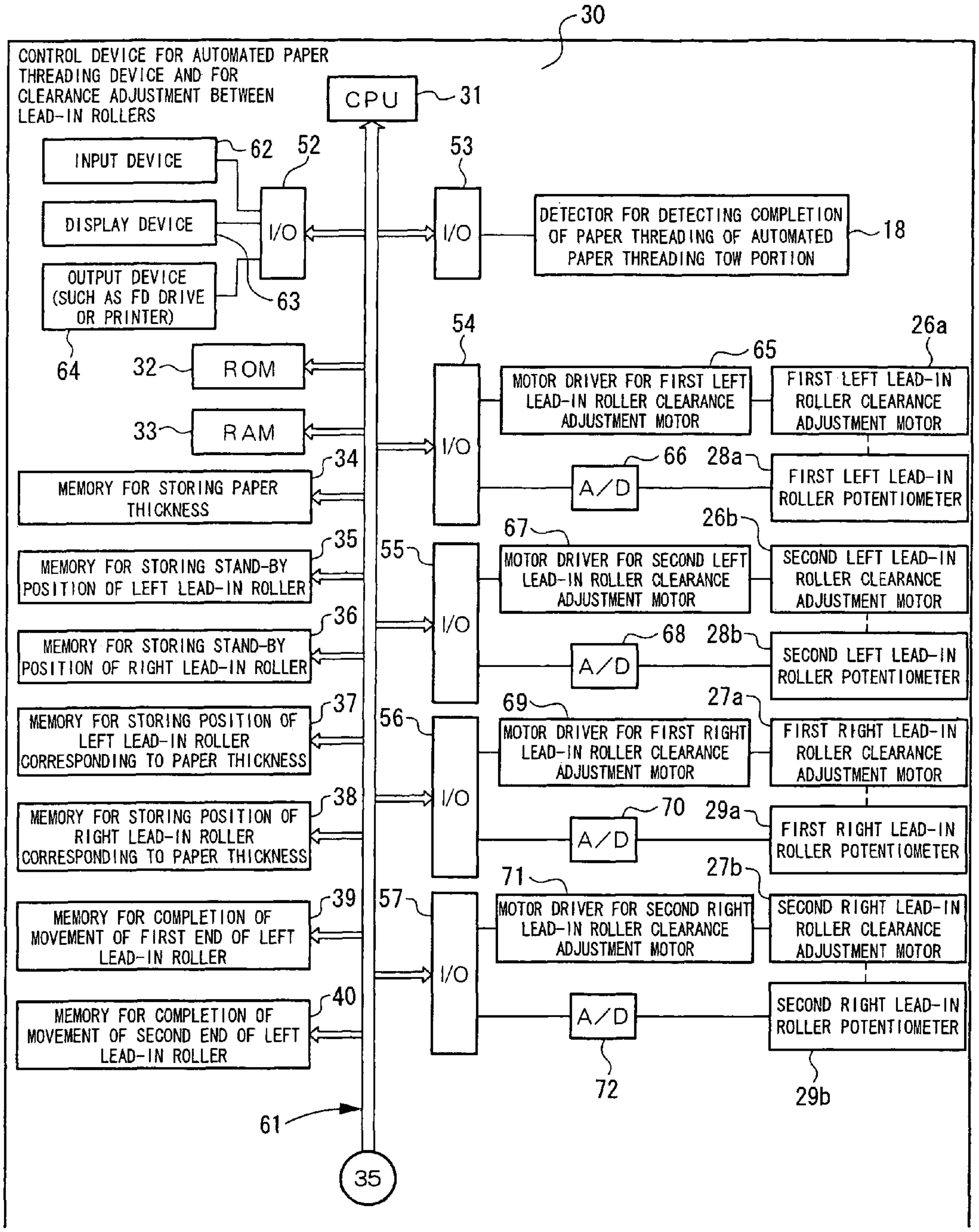
FIG. 18*a* is a block diagram of a control device for an automated paper threading device and for a lead-in roller clearance adjustment mechanism representing a fourth embodiment of the present invention.
Figure 18B:
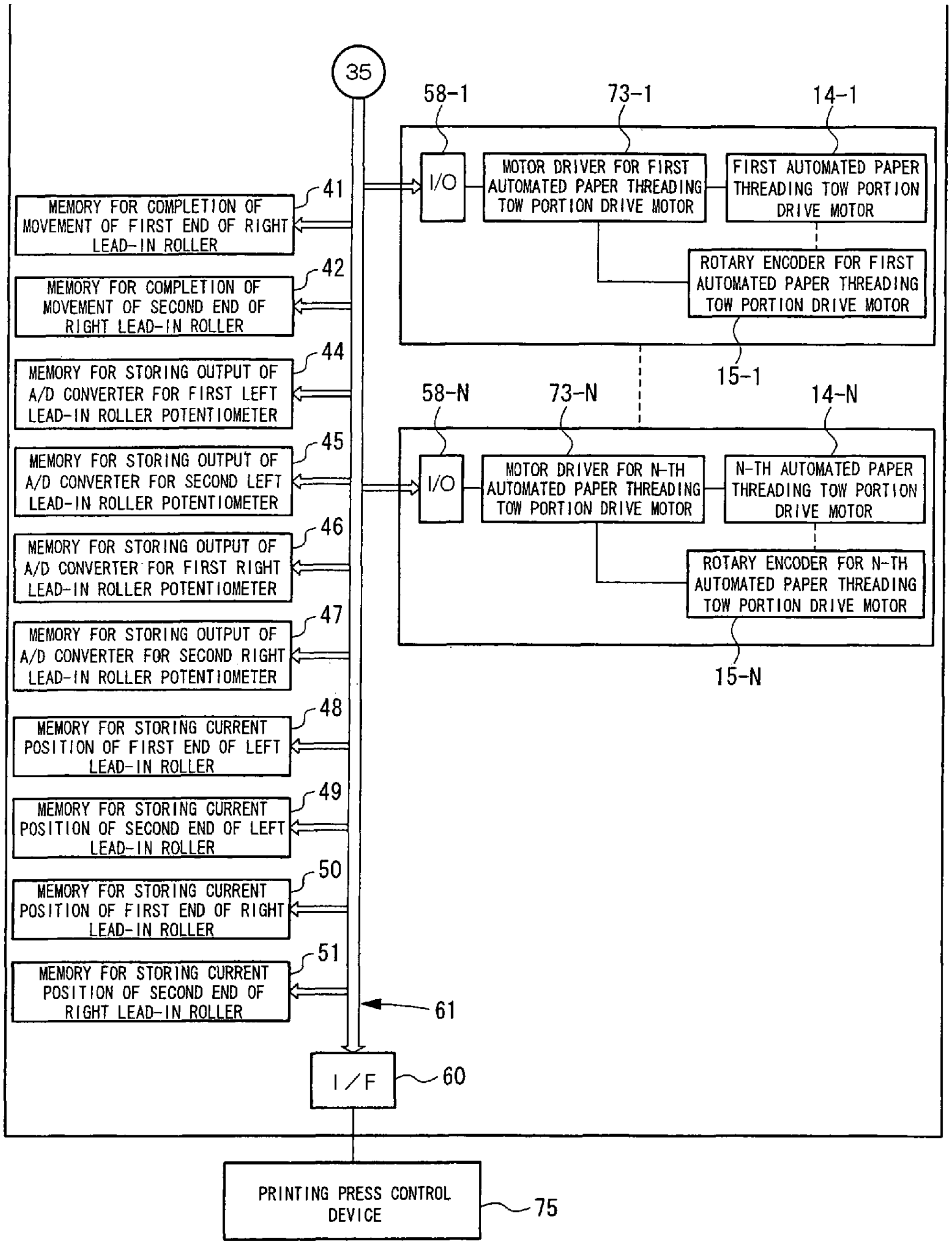
FIG. 18*b* is another block diagram of the control device for the automated paper threading device and for the lead-in roller clearance adjustment mechanism representing the fourth embodiment of the present invention.
Figure 19:
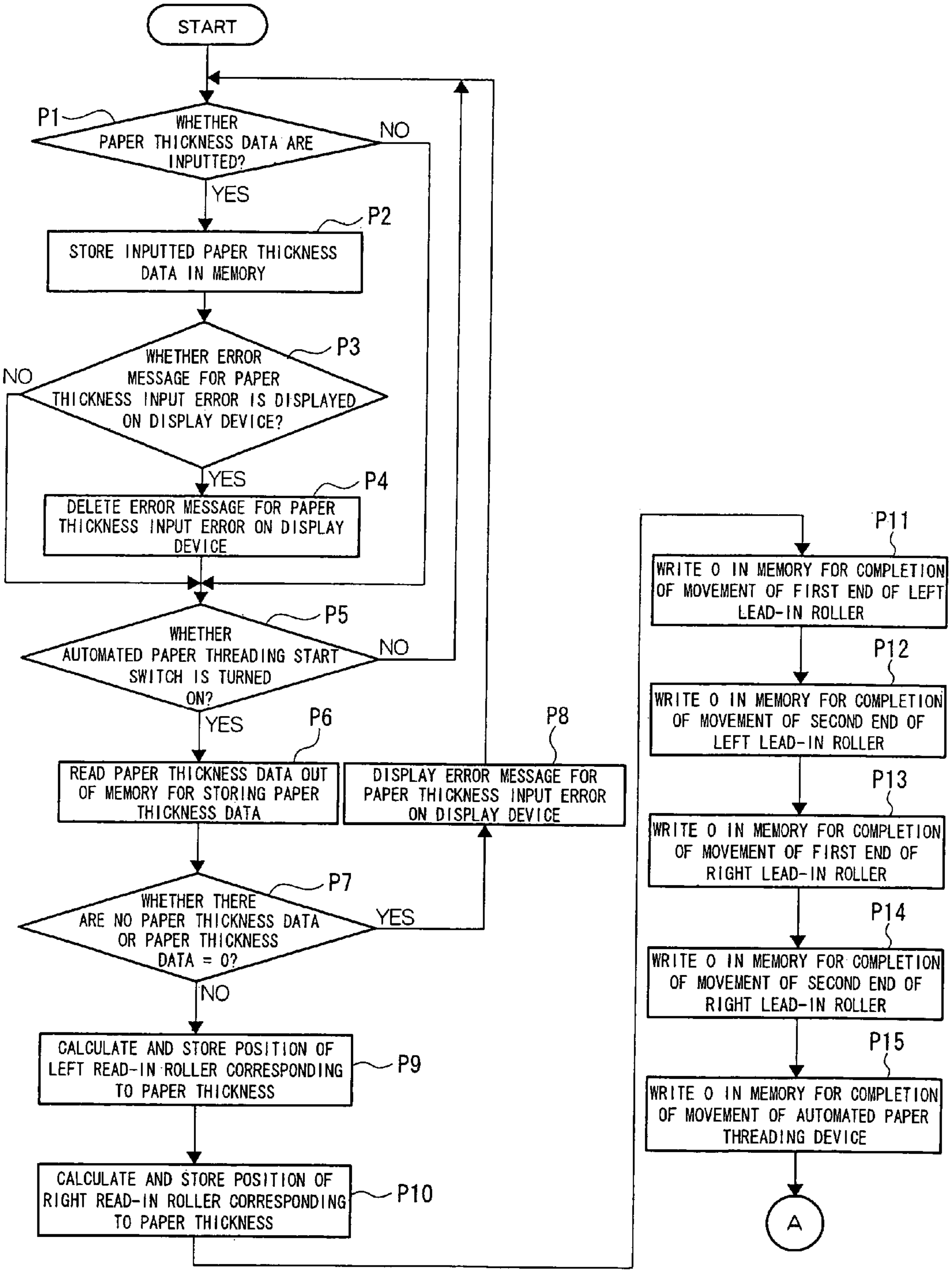
FIG. 19 is an operation flowchart of the control device for the automated paper threading device and for the lead-in roller clearance adjustment mechanism.
Figure 20A:
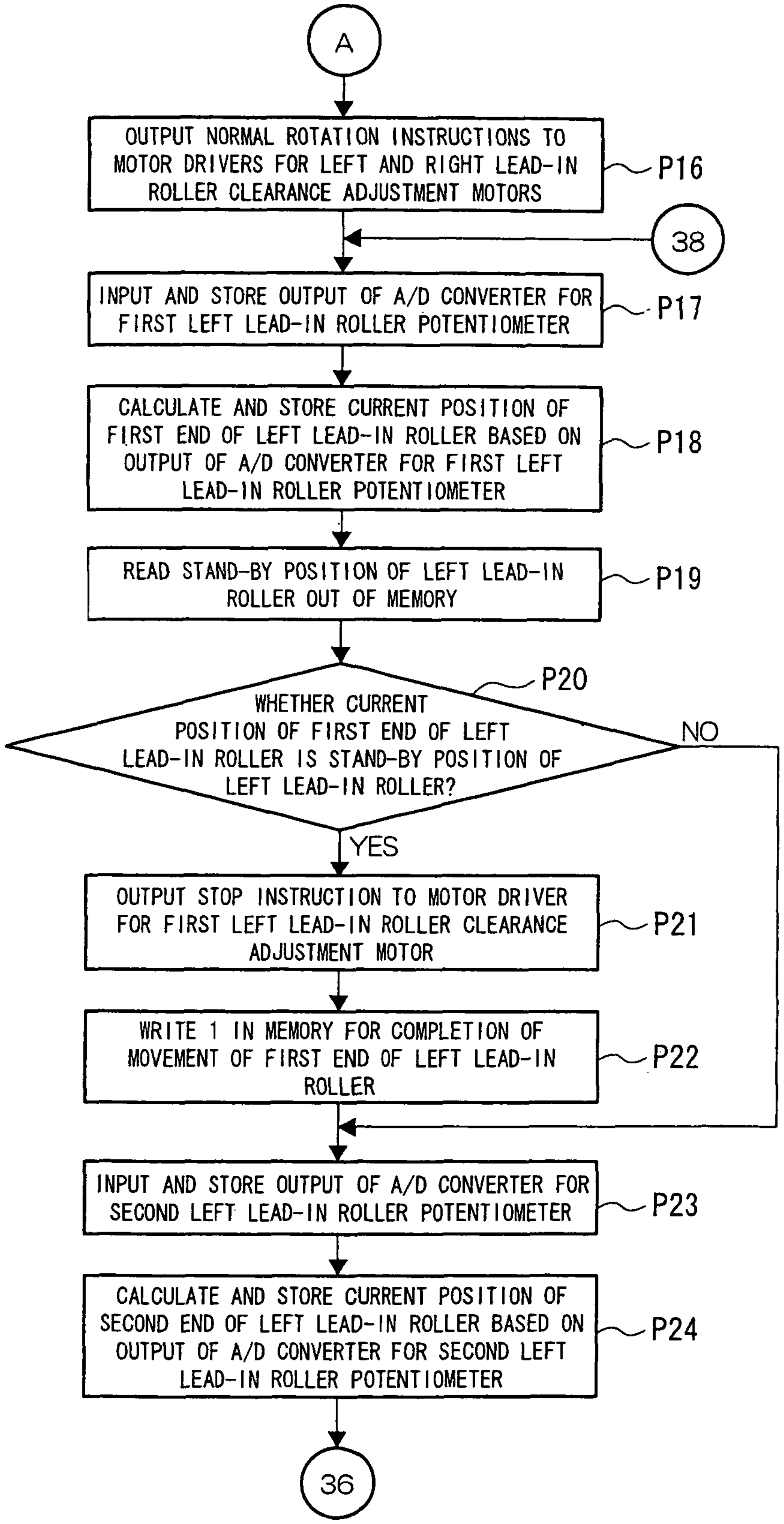
FIG. 20*a* is another operation flowchart of the control device for the automated paper threading device and for the lead-in roller clearance adjustment mechanism.
Figure 20B:
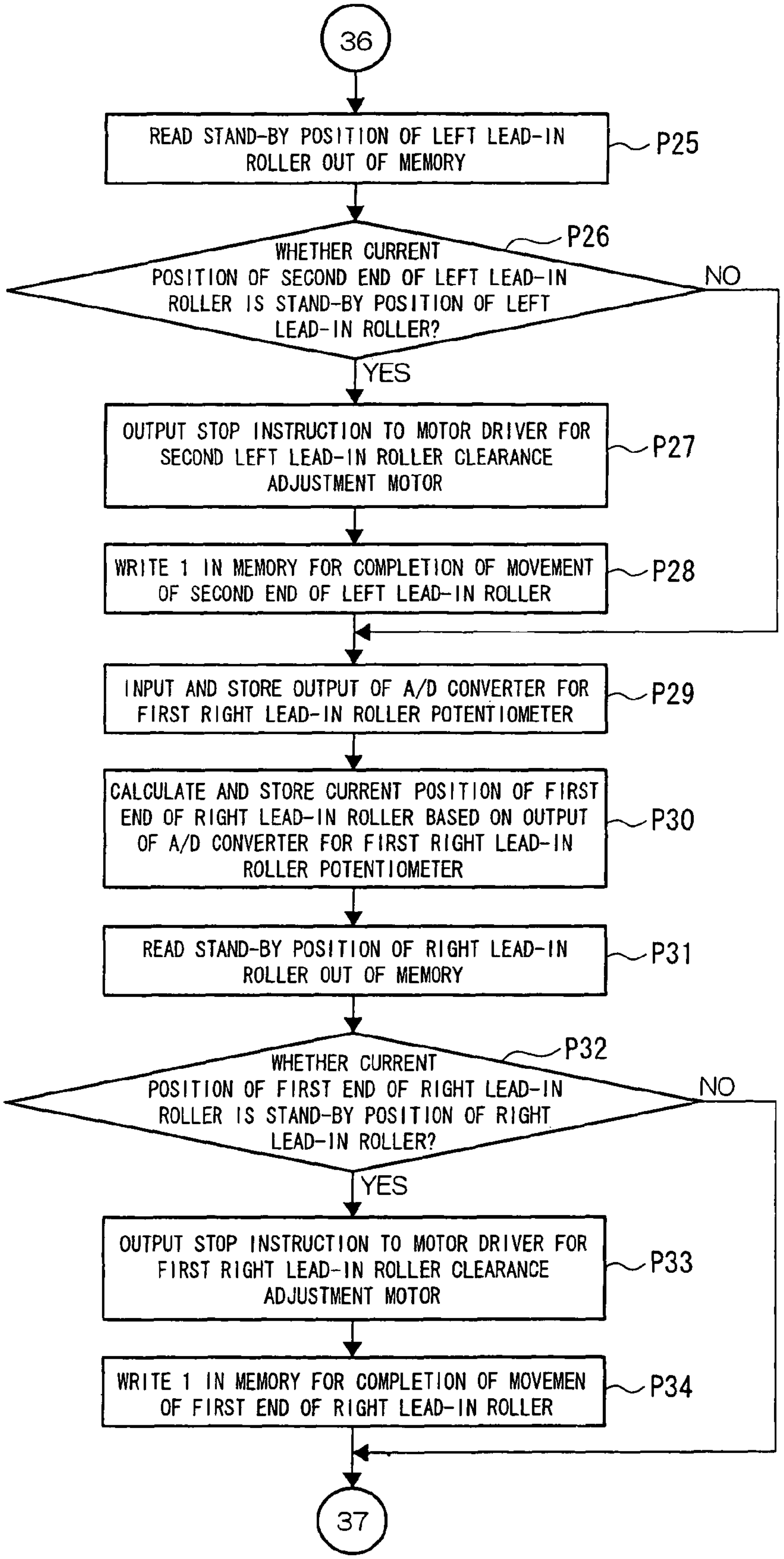
FIG. 20*b* is still another operation flowchart of the control device for the automated paper threading device and for the lead-in roller clearance adjustment mechanism.
Figure 20C:
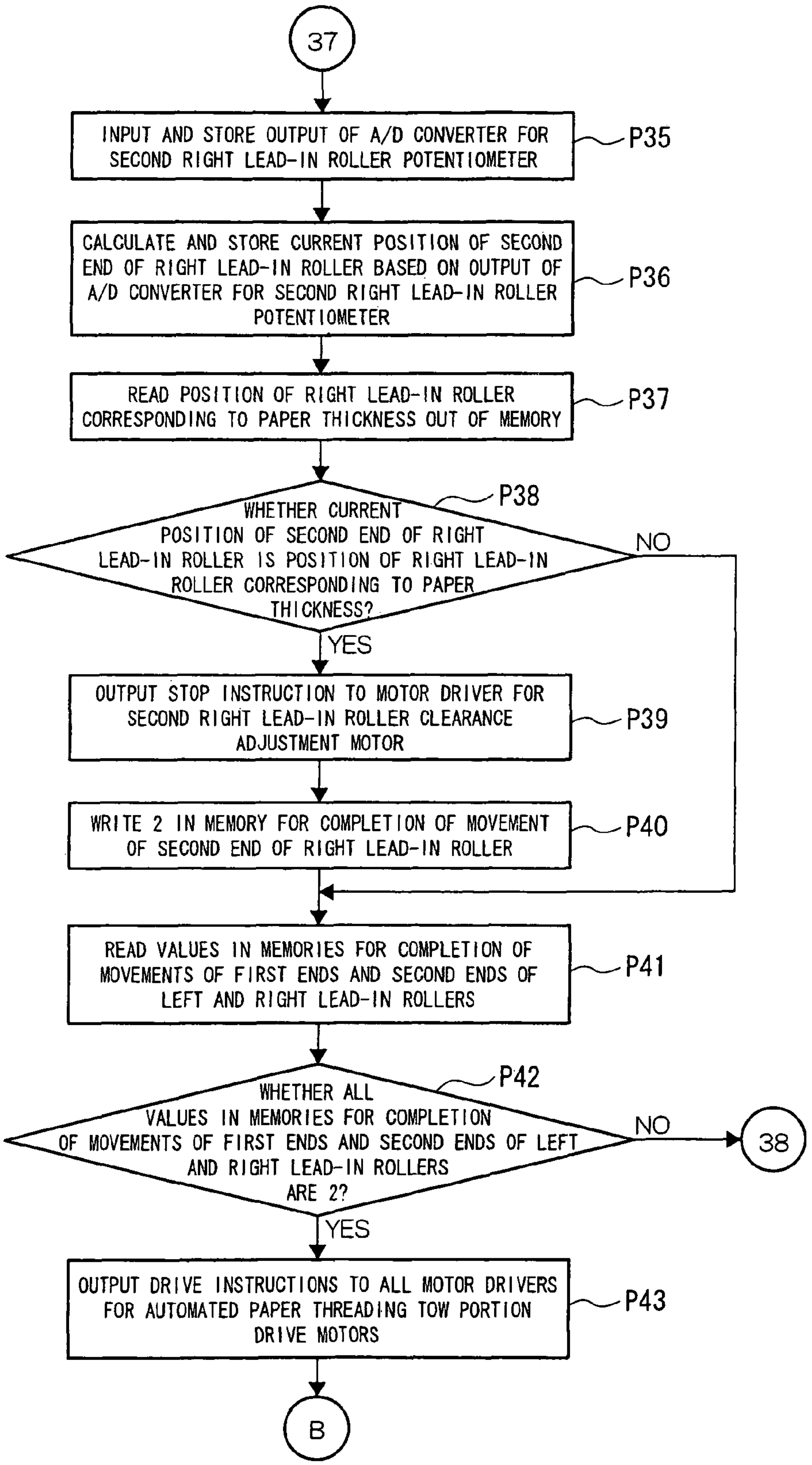
FIG. 20*c* is still another operation flowchart of the control device for the automated paper threading device and for the lead-in roller clearance adjustment mechanism.
Figure 21A:
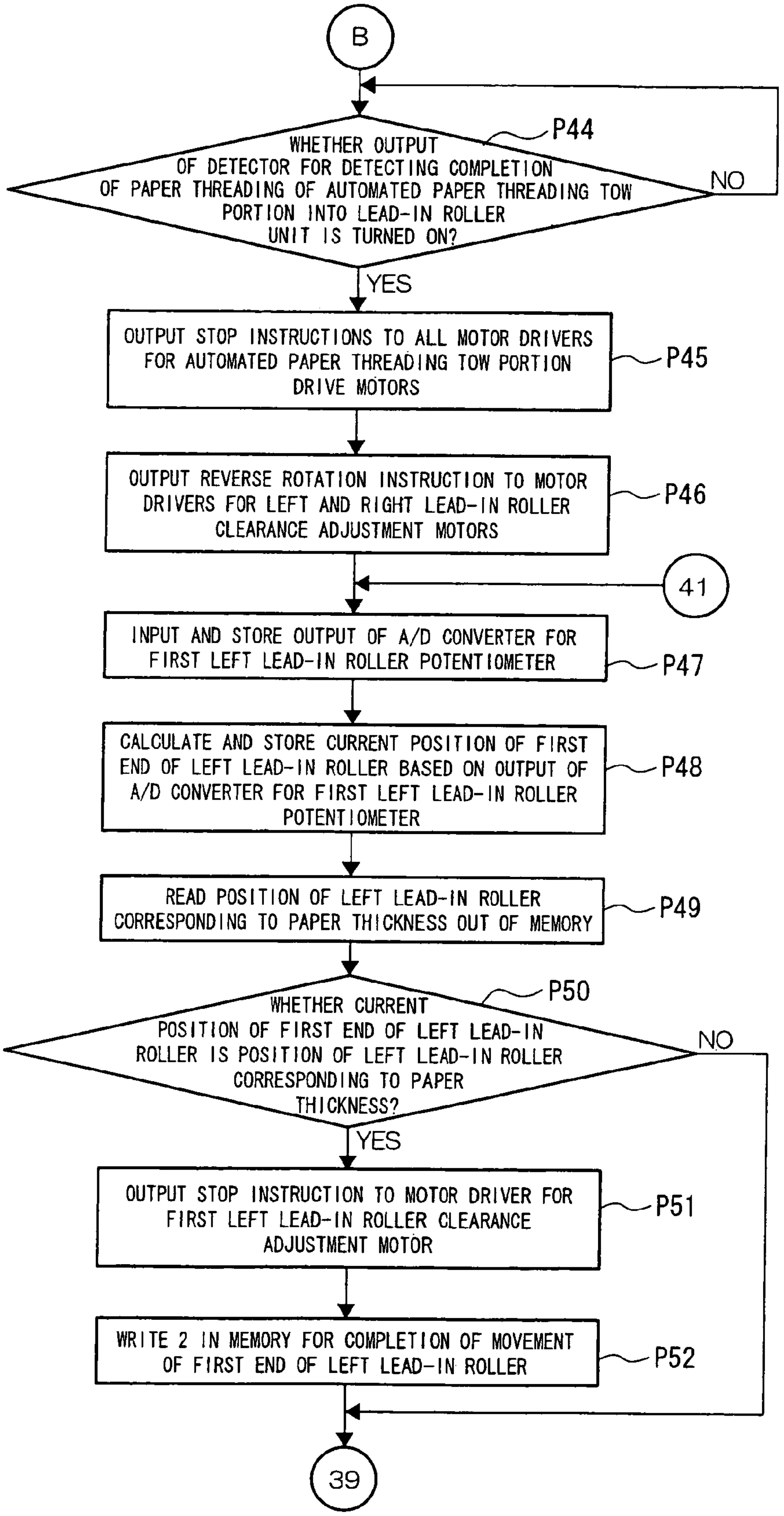
FIG. 21*a* is still another operation flowchart of the control device for the automated paper threading device and for the lead-in roller clearance adjustment mechanism.
Figure 21B:
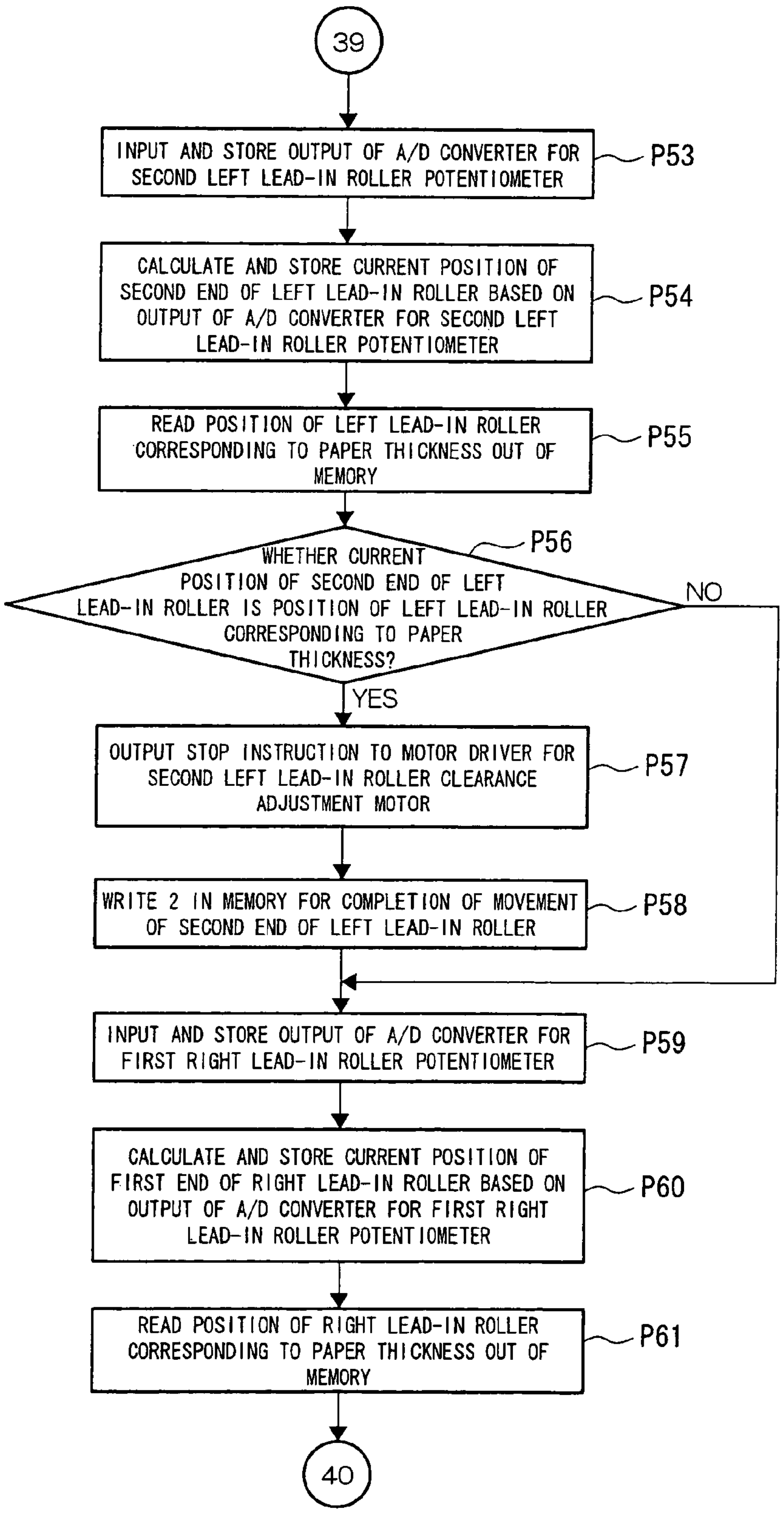
FIG. 21*b* is still another operation flowchart of the control device for the automated paper threading device and for the lead-in roller clearance adjustment mechanism.
Figure 21C:
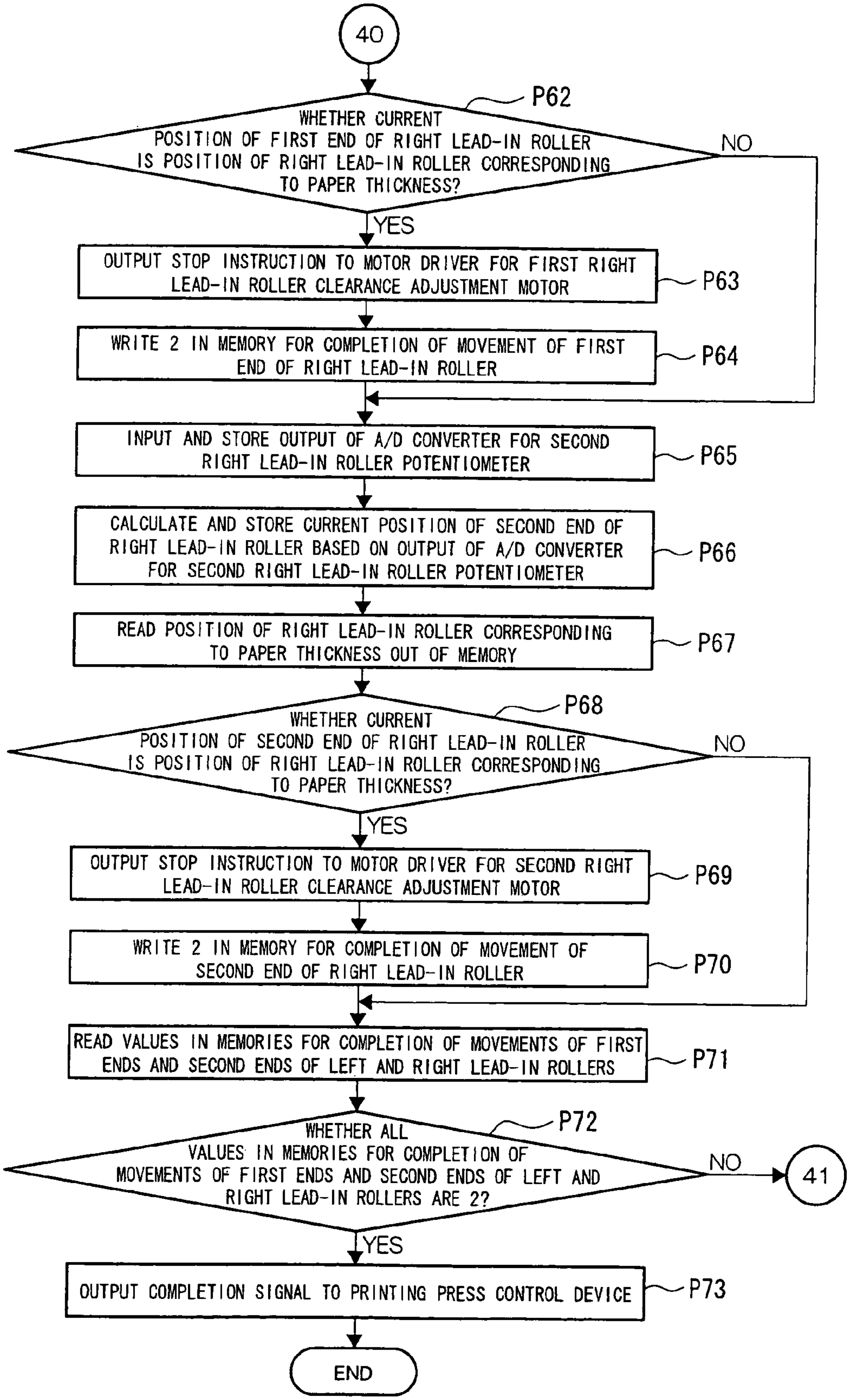
FIG. 21*c* is still another operation flowchart of the control device for the automated paper threading device and for the lead-in roller clearance adjustment mechanism.

As shown in FIGS. 18*a* and 18*b*, in addition to a CPU 31, a ROM 32 and a RAM 33, a control device 30 for an automated paper threading device and for the clearance adjustment between the lead-in rollers of this embodiment include a memory 34 for storing paper thickness data, a memory 35 for storing a stand-by position of a left lead-in roller, a memory 36 for storing a stand-by position of a right lead-in roller, a memory 37 for storing a position of the left lead-in roller corresponding to a paper thickness, a memory 38 for storing a position of the right lead-in roller corresponding to the paper thickness, a memory 39 for completion of a movement of a first end of the left lead-in roller, a memory 40 for completion of a movement of a second end of the left lead-in roller, a memory 41 for completion of a movement of a first end of the right lead-in roller, a memory 42 for completion of a movement of a second end of the right lead-in roller, a memory 44 for storing an output of an A/D converter for a first left lead-in roller potentiometer, a memory 45 for storing an output of an A/D converter for a second left lead-in roller potentiometer, a memory 46 for storing an output of an A/D converter for a first right lead-in roller potentiometer, a memory 47 for storing an output of an A/D converter for a second right lead-in roller potentiometer, a memory 48 for storing a current position of the first end of the left lead-in roller, a memory 49 for storing a current position of the second end of the left lead-in roller, a memory 50 for storing a current position of the first end of the right lead-in roller, and a memory 51 for storing a current position of the second end of the right lead-in roller, which are connected to one another by use of a bus (BUS) 61 together with each of input-output devices 52 to 57 and 58-1 to 58-N, and an interface 60.

Input devices 62 such as a keyboard, various switches and buttons, display devices 63 such as a CRT and lamps, and output devices 64 such as a printer and an FD drive are connected to the input-output device 52. A detector 18 for detecting completion of paper threading of an automated paper threading tow portion is connected to the input-output device 53. A first left lead-in roller clearance adjustment motor 26*a* is connected to the input-output device 54 via a motor driver 65 for the first left lead-in roller clearance adjustment motor, and a first left lead-in roller potentiometer 28*a* is connected to the input-output device 54 via an A/D converter 66. A second left lead-in roller clearance adjustment motor 26*b* is connected to the input-output device 55 via a motor driver 67 for the second left lead-in roller clearance adjustment motor, and a second left lead-in roller potentiometer 28*b* is connected to the input-output device 55 via an A/D converter 68. A first right lead-in roller clearance adjustment motor 27*a* is connected to the input-output device 56 via a motor driver 69 for the first right lead-in roller clearance adjustment motor, and a first right lead-in roller potentiometer 29*a* is connected to the input-output device 56 via an A/D converter 70. A second right lead-in roller clearance adjustment motor 27*b* is connected to the input-output device 57 via a motor driver 71 for the second right lead-in roller clearance adjustment motor, and a second right lead-in roller potentiometer 29*b* is connected to the input-output device 57 via an A/D converter 72.

Furthermore, a first automated paper threading tow portion drive motor 14-1 and a first rotary encoder 15-1 for the first automated paper threading tow portion drive motor are connected to the input-output device 58-1 via a motor driver 73-1 for the first automated paper threading tow portion drive motor. Moreover, an N-th automated paper threading tow portion drive motor 14-N and a rotary encoder 15-N for the N-th automated paper threading tow portion drive motor are connected to the input-output device 58-N via a motor driver 73-N for the N-th automated paper threading tow portion drive motor.

Being configured in this way, the control device 30 for the automated paper threading device and for the clearance adjustment between the lead-in rollers are operated in accordance with operation flows shown in FIG. 19, FIG. 20*a* to FIG. 20*c*, and FIG. 21*a* to FIG. 21*c*.

Specifically, a judgment is made in Step P1 as to whether or not the paper thickness data for the web W are inputted. If yes, the inputted paper thickness data are stored in the memory 34 in Step P2. If no, the operation proceeds to Step P5 to be described later. Next, if an error message for a paper thickness input error is displayed on the display device 63 in Step P3, the error message for the paper thickness input error on the display device 63 is deleted in Step P4, and the operation proceeds to Step P5.

Next, a judgment is made in Step P5 as to whether or not an automated paper threading start switch is turned on. If yes, the paper thickness data are read out of the memory 34 for storing paper thickness data in Step P6. If no, the operation returns to Step P1. Next, a judgment is made in Step P7 whether or not there are no paper thickness data or the paper thickness data=0. If yes, an error message for a paper thickness input error is displayed on the display device 63 in Step P8, and the operation returns to Step P1. If no, a position of the left lead-in roller 9A corresponding to the paper thickness is calculated based on the paper thickness data, and is stored in the memory 37 in Step P9.

Accordingly, in a case where the automated paper threading start switch is turned on without inputting the paper thickness data, the error message is displayed and informed to an operator, and the automated paper threading device is not driven. Therefore, the tow portion of the automated paper threading device is prevented from erroneously clashing with the lead-in roller 9 and being damaged. At the same time, it is explicitly instructed to the user that the paper thickness data input is required.

Next, a position of the right lead-in roller 9B corresponding to the paper thickness is calculated based on the paper thickness data, and is stored in the memory 38 in Step P10. Then, 0 is written in the memory 39 for completion of a movement of a first end of the left lead-in roller 9A in Step P11, and 0 is written in the memory 40 for completion of a movement of a second end of the left lead-in roller 9A in Step P12. Next, 0 is written in the memory 41 for completion of a movement of a first end of the right lead-in roller 9B in Step P13, and 0 is written in the memory 42 for completion of a movement of a second end of the right lead-in roller 9B in Step P14. Thereafter, 0 is written in the memory 43 for completion of a movement of the automated paper threading device in Step P15.

Next, normal rotation instructions are outputted to the motor drivers 65, 67, 69 and 71 for the left and right lead-in roller clearance adjustment motors in Step P16. Next, in Step P17, an output of the A/D converter 66 for the first left lead-in roller potentiometer 28*a* is inputted and stored in the memory 44. Then, in Step P18, the current position of the first end of the left lead-in roller 9A is calculated based on the output of the A/D converter 66 for the first left lead-in roller potentiometer 28*a*, and is stored in the memory 48.

Next, the stand-by position of the left lead-in roller 9A is read out of the memory 35 in Step P19. Then, a judgment is made in Step P20 as to whether or not the current position of the first end of the left lead-in roller 9A is equal to the stand-by position of the left lead-in roller 9A. If yes, a stop instruction is outputted to the motor driver 65 for the first left lead-in roller clearance adjustment motor in Step P21. If no, the operation proceeds to Step P23 to be described later. Thereafter, a determination is made in Step P22 that the movement of the first end of the left lead-in roller 9A to the stand-by position is completed, and 1 is written in the memory 39 for completion of the movement of the first end of the left lead-in roller.

Next, in Step P23, an output of the A/D converter 68 for the second left lead-in roller potentiometer 28*b* is inputted and stored in the memory 45. Then, in Step P24, the current position of the second end of the left lead-in roller 9A is calculated based on the output of the A/D converter 68 for the second left lead-in roller potentiometer 28*b*, and is stored in the memory 49.

Next, the stand-by position of the left lead-in roller 9A is read out of the memory 35 in Step P25. Then, a judgment is made in Step P26 as to whether or not the current position of the second end of the left lead-in roller 9A is equal to the stand-by position of the left lead-in roller 9A. If yes, a stop instruction is outputted to the motor driver 67 for the second left lead-in roller clearance adjustment motor in Step P27. If no, the operation proceeds to Step P29 to be described later. Thereafter, a determination is made in Step P28 that the movement of the second end of the left lead-in roller 9A to the stand-by position is completed, and 1 is written in the memory 40 for completion of the movement of the second end of the left lead-in roller.

Next, in Step P29, an output of the A/D converter 70 for the first right lead-in roller potentiometer 29*a* is inputted and stored in the memory 46. Then, in Step P30, the current position of the first end of the right lead-in roller 9B is calculated based on the output of the A/D converter 70 for the first right lead-in roller potentiometer 29*a*, and is stored in the memory 50. Thereafter, the stand-by position of the right lead-in roller 9B is read out of the memory 36 in Step P31.

Next, a judgment is made in Step P32 as to whether or not the current position of the first end of the right lead-in roller 9B is equal to the stand-by position of the right lead-in roller 9B. If yes, a stop instruction is outputted to the motor driver 69 for the first right lead-in roller clearance adjustment motor in Step P33. If no, the operation proceeds to Step P35 to be described later. Thereafter, a determination is made in Step P34 that the movement of the first end of the right lead-in roller 9B to the stand-by position is completed, and 1 is written in the memory 41 for completion of the movement of the first end of the right lead-in roller.

Next, in Step P35, an output of the A/D converter 72 for the second right lead-in roller potentiometer 29*b* is inputted and stored in the memory 47. Then, in Step P36, the current position of the second end of the right lead-in roller 9B is calculated based on the output of the A/D converter 72 for the second right lead-in roller potentiometer 29*b*, and is stored in the memory 51.

Next, the stand-by position of the right lead-in roller 9B is read out of the memory 36 in Step P37. Then, a judgment is made in Step P38 as to whether or not the current position of the second end of the right lead-in roller 9B is equal to the stand-by position of the right lead-in roller 9B. If yes, a stop instruction is outputted to the motor driver 71 for the second right lead-in roller clearance adjustment motor in Step P39. If no, the operation proceeds to Step P41 to be described later. Thereafter, a determination is made in Step P40 that the movement of the second end of the right lead-in roller 9B to the stand-by position is completed, and 1 is written in the memory 42 for completion of the movement of the second end of the right lead-in roller.

Next, values in the memories 39 to 42 for completion of the movements of the first ends and the second ends of the left and right lead-in rollers 9A and 9B are read out in Step P41. Then, a judgment is made in Step P42 as to whether or not all the values in the memories 39 to 42 for completion of the movements of the first ends and the second ends of the left and right lead-in rollers 9A and 9B are equal to 1. If yes, a determination is made that the movements of both of the left and right lead-in rollers 9A and 9B to the stand-by positions have been completed, and drive instructions are outputted to all the motor drivers 73-1 to 73-N for the automated paper threading tow portion drive motors in Step P43. If no, a determination is made that the movements of both of the left and right lead-in rollers 9A and 9B to the stand-by positions have not been completed, and the operation proceeds to Step P17.

Next, if an output of the detector 18 for detecting completion of paper threading of the automated paper threading tow portion is turned on in Step P44, stop instructions are outputted to all the motor drivers 73-1 to 73-N for the automated paper threading tow portion drive motors in Step P45. Thereafter, reverse rotation instructions are outputted to the motor drivers 65, 67, 69 and 71 for the left and right lead-in roller clearance adjustment motors 26*a*, 26*b*, 27*a* and 27*b* in Step P46.

Next, in Step P47, the output of the A/D converter 66 for the first left lead-in roller potentiometer 28*a* is inputted and stored in the memory 44. Then, in Step P48, the current position of the first end of the left lead-in roller 9A is calculated based on the output of the A/D converter 66 for the first left lead-in roller potentiometer 28*a*, and is stored in the memory 48. Thereafter, the position of the left lead-in roller 9A corresponding to the paper thickness is read out of the memory 37 in Step P49.

Next, a judgment is made in Step P50 as to whether or not the current position of the first end of the left lead-in roller 9A is equal to the position of the left lead-in roller 9A corresponding to the paper thickness. If yes, a stop instruction is outputted to the motor driver 65 for the first left lead-in roller clearance adjustment motor in Step P51. If no, the operation proceeds to Step P53 to be described later. Next, a determination is made in Step P52 that the movement of the first end of the left lead-in roller 9A to the position corresponding to the paper thickness is completed, and 2 is written in the memory 39 for completion of the movement of the first end of the left lead-in roller. Then, in Step P53, the output of the A/D converter 68 for the second left lead-in roller potentiometer 28*b* is inputted and stored in the memory 45.

Next, in Step P54, the current position of the second end of the left lead-in roller 9A is calculated based on the output of the A/D converter 68 for the second left lead-in roller potentiometer 28*b*, and is stored in the memory 49. Thereafter, the position of the left lead-in roller 9A corresponding to the paper thickness is read out of the memory 37 in Step P55. Next, a judgment is made in Step P56 as to whether or not the current position of the second end of the left lead-in roller 9A is equal to the position of the left lead-in roller 9A corresponding to the paper thickness. If yes, a stop instruction is outputted to the motor driver 67 for the second left lead-in roller clearance adjustment motor in Step P57. If no, the operation proceeds to Step P59 to be described later.

Next, a determination is made in Step P58 that the movement of the second end of the left lead-in roller 9A to the position corresponding to the paper thickness is completed, and 2 is written in the memory 40 for completion of the movement of the second end of the left lead-in roller. Then, in Step P59, the output of the A/D converter 70 for the first right lead-in roller potentiometer 29*a* is inputted and stored in the memory 46. Next, in Step P60, the current position of the first end of the right lead-in roller 9B is calculated based on the output of the A/D converter 70 for the first right lead-in roller potentiometer 29*a*, and is stored in the memory 50.

Next, the position of the right lead-in roller 9B corresponding to the paper thickness is read out of the memory 38 in Step P61. Then, a judgment is made in Step P62 as to whether or not the current position of the first end of the right lead-in roller 9B is equal to the position of the right lead-in roller 9B corresponding to the paper thickness. If yes, a stop instruction is outputted to the motor driver 69 for the first right lead-in roller 9B clearance adjustment motor in Step P63. If no, the operation proceeds to Step P65 to be described later.

Next, a determination is made in Step P64 that the movement of the first end of the right lead-in roller 9B to the position corresponding to the paper thickness is completed, and 2 is written in the memory 41 for completion of the movement of the first end of the right lead-in roller. Thereafter, in Step P65, the output of the A/D converter 72 for the second right lead-in roller potentiometer 29*b* is inputted and stored in the memory 47. Next, in Step P66, the current position of the second end of the right lead-in roller 9B is calculated based on the output of the A/D converter 72 for the second right lead-in roller potentiometer 29*b*, and is stored in the memory 51. Then, the position of the right lead-in roller 9B corresponding to the paper thickness is read out of the memory 38 in Step P67.

Next, a judgment is made in Step P68 as to whether or not the current position of the second end of the right lead-in roller 9B is equal to the position of the right lead-in roller 9B corresponding to the paper thickness. If yes, a stop instruction is outputted to the motor driver 71 for the second right lead-in roller 9B clearance adjustment motor in Step P69. If no, the operation proceeds to Step P71 to be described later.

Next, a determination is made in Step P70 that the movement of the second end of the right lead-in roller 9B to the position corresponding to the paper thickness is completed, and 2 is written in the memory 42 for completion of the movement of the second end of the right lead-in roller. Thereafter, the values in the memories 39 to 42 for completion of the movements of the first ends and the second ends of the left and right lead-in rollers 9A and 9B are read out in Step P71.

Next, a judgment is made in Step P72 as to whether or not all the values in the memories 39 to 42 for completion of the movements of the first ends and the second ends of the left and right lead-in rollers 9A and 9B are equal to 2. If yes, a determination is made that the movements of both of the left and right lead-in rollers to the positions corresponding to the paper thickness have been completed, and a completion signal is outputted to a printing press control device 75 to set a web rotary printing press as a normal printable state in Step P73. If no, a determination is made that the movements of both of the left and right lead-in rollers to the positions corresponding to the paper thickness have not been completed, and the operation returns to Step P47.

As described above, in this embodiment, first, the left and right lead-in rollers 9A and 9B are moved to the stand-by positions by use of the motors 26*a*, 26*b*, 27*a* and 27*b*, then the automated paper threading tow portion is moved to a position of completion of paper threading by use of the motors 14-1 to 14-N, and then the motors 26*a*, 26*b*, 27*a* and 27*b* are restarted to move the left and right lead-in rollers 9A and 9B to the positions corresponding to the paper thickness of the web W.

In this way, as in the case of the first embodiment, it is possible to set the amount of clearance between the left and right lead-in rollers 9A and 9B automatically at the predetermined large value when starting the automated web threading device, and to set the amount of clearance between the left and right lead-in rollers 9A and 9B automatically at the optimal value corresponding to the inputted paper thickness of the web W in response to completion of paper threading into the lead-in roller unit. This makes it possible to achieve reduction in a burden on an operator and reduction in wasted paper, and also to achieve reduction in clearance adjustment time.

Moreover, in a case where the movements of the left and right lead-in rollers to the stand-by positions are not completed, when the detector 16 for detecting arrival of the automated paper threading tow portion upstream of the lead-in roller unit detects the tow portion of the automated paper threading device, the drives of the automated paper threading tow portion drive motors 14-1 to 14-N are stopped, and a clash of the tow portion of the automated paper threading device with the lead-in rollers is automatically prevented. Accordingly, it is possible to prevent damage on the tow portion of the automated paper threading device or on the lead-in rollers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clearance adjustment method for a lead-in roller clearance adjustment mechanism including a pair of lead-in rollers for guiding a web with a clearance therebetween, a clearance adjustment mechanism for adjusting an amount of clearance between the pair of lead-in rollers, a drive source for driving the clearance adjustment mechanism, and a first detector for detecting any one of a corresponding one of output position of the drive source and the amount of clearance, and the lead-in roller clearance adjustment mechanism being configured to adjust the amount of clearance automatically, the method comprising:

inputting a web thickness of the web;

setting the amount of clearance at a value to prevent a tow portion of an automated paper threading device from clashing with the lead-in rollers before the automated paper threading device threads the web into a lead-in roller unit; and setting the amount of clearance at a value corresponding to the inputted web thickness of the web after the automated paper threading device threads the web into the lead-in roller unit.

2. The clearance adjustment method for the lead-in roller clearance adjustment mechanism as recited in claim 1, wherein the mechanism further includes an automated web threading device, and the method further includes, setting the amount of clearance at the predetermined value by turning on a start button of the automated web threading device.

3. The clearance adjustment method for the lead-in roller clearance adjustment mechanism as recited in claim 1, wherein the mechanism further includes:

an automated web threading device; and a second detector for detecting completion of threading the web into the lead-in roller unit by the automated web threading device, and the method further includes, setting the amount of clearance at the value corresponding to the inputted web thickness of the web in response to the detection of the completion of threading the web into the lead-in roller unit by the second detector.

4. The clearance adjustment method for the lead-in roller clearance adjustment mechanism as recited in claim 3, wherein the second detector detects any one of a lead and a chain tip of the automated web threading device.

5. The clearance adjustment method for the lead-in roller clearance adjustment mechanism as recited in claim 3, wherein the second detector generates a pulse synchronously with a movement of the automated web threading device.

6. The clearance adjustment method for the lead-in roller clearance adjustment mechanism as recited in claim 1, wherein the mechanism further includes an automated web threading device, and the method further includes, setting the amount of clearance at the value corresponding to the inputted web thickness of the web after completion of threading the web by the automated web threading device.

7. The clearance adjustment method for the lead-in roller clearance adjustment mechanism as recited in claim 6, wherein the mechanism further includes a third detector for detecting completion of threading the web by the automated web threading device, and the method further includes, setting the amount of clearance at the value corresponding to the inputted web thickness of the web in response to the detection of the completion of threading the web by the third detector.

8. The clearance adjustment method for the lead-in roller clearance adjustment mechanism as recited in claim 7, wherein the third detector detects any one of a lead and a chain tip of the automated web threading device.

9. The clearance adjustment method for the lead-in roller clearance adjustment mechanism as recited in claim 7, wherein the third detector generates a pulse synchronously with a movement of the automated web threading device.

10. The clearance adjustment method for the lead-in roller clearance adjustment mechanism as recited in claim 1, wherein the mechanism further includes:

an automated web threading device; and a fourth detector for detecting arrival of the automated web threading device upstream of the lead-in roller unit, and the automated web threading device is stopped in a case where the amount of clearance between the pair of lead-in rollers is not equal to the predetermined value when the fourth detector detects the automated web threading device.

11. The clearance adjustment method for the lead-in roller clearance adjustment mechanism as recited in claim 10, wherein the fourth detector detects any one of a lead and a chain tip of the automated web threading device.

12. The clearance adjustment method for the lead-in roller clearance adjustment mechanism as recited in claim 10, wherein the fourth detector generates a pulse synchronously with a movement of the automated web threading device.

13. A clearance adjustment device for a lead-in roller clearance adjustment mechanism including a pair of lead-in rollers for guiding a web with a clearance therebetween, a clearance adjustment mechanism for adjusting an amount of clearance between the pair of lead-in rollers, a drive source for driving the clearance adjustment mechanism, and a first detector for detecting any one of a corresponding one of output position of the drive source and the amount of clearance, and the lead-in roller clearance adjustment mechanism being configured to adjust the amount of clearance automatically, the device comprising:

a control device, to which a web thickness of the web is inputted, and which controls the drive source in order that the amount of clearance can be set at a value to prevent a tow portion of an automated paper threading device from clashing with the lead-in rollers before the automated paper threading device threads the web into a lead-in roller unit, and that the amount of clearance is set at a value corresponding to the inputted web thickness of the web after the automated paper threading device threads the web into the lead-in roller unit.

14. The clearance adjustment device for the lead-in roller clearance adjustment mechanism as recited in claim 13, further comprising:

an automated web threading device, wherein the control device controls the drive source in order that the amount of clearance can be set at the predetermined value by turning on a start button of the automated web threading device.

15. The clearance adjustment device for the lead-in roller clearance adjustment mechanism as recited in claim 13, further comprising:

an automated web threading device; and a second detector for detecting completion of threading the web into the lead-in roller unit by the automated web threading device, wherein the control device controls the drive source in order that the amount of clearance can be set at the value corresponding to the inputted web thickness of the web in response to the detection of the completion of threading the web into the lead-in roller unit by the second detector.

16. The clearance adjustment device for the lead-in roller clearance adjustment mechanism as recited in claim 15, wherein the second detector is a detector for detecting any one of a lead and a chain tip of the automated web threading device.

17. The clearance adjustment device for the lead-in roller clearance adjustment mechanism as recited in claim 15, wherein the second detector is a pulse generator for generating a pulse synchronously with a movement of the automated web threading device.

18. The clearance adjustment device for the lead-in roller clearance adjustment mechanism as recited in claim 13, further comprising:

an automated web threading device, wherein the control device controls the drive source in order that the amount of clearance can be set at the value corresponding to the inputted web thickness of the web after completion of threading the web by the automated web threading device.

19. The clearance adjustment device for the lead-in roller clearance adjustment mechanism as recited in claim 18, further comprising:

a third detector for detecting completion of threading the web by the automated web threading device, wherein the control device controls the drive source in order that the amount of clearance can be set at the value corresponding to the inputted web thickness of the web in response to the detection of the completion of threading the web by the third detector.

20. The clearance adjustment device for the lead-in roller clearance adjustment mechanism as recited in claim 19, wherein the third detector is a detector for detecting any one of a lead and a chain tip of the automated web threading device.

21. The clearance adjustment device for the lead-in roller clearance adjustment mechanism as recited in claim 19, wherein the third detector is a pulse generator for generating a pulse synchronously with a movement of the automated web threading device.

22. The clearance adjustment device for the lead-in roller clearance adjustment mechanism as recited in claim 13, further comprising:

an automated web threading device; and a fourth detector for detecting arrival of the automated web threading device upstream of the lead-in roller unit, wherein the control device outputs a stop signal to the automated web threading device in a case where the amount of clearance between the pair of lead-in rollers is not equal to the predetermined value when the fourth detector detects the automated web threading device.

23. The clearance adjustment device for the lead-in roller clearance adjustment mechanism as recited in claim 22, wherein the fourth detector is a detector for detecting any one of a lead and a chain tip of the automated web threading device.

24. The clearance adjustment device for the lead-in roller clearance adjustment mechanism as recited in claim 22, wherein the fourth detector is a pulse generator for generating a pulse synchronously with a movement of the automated web threading device.

* * * * *